United States Patent
Mori et al.

(10) Patent No.: US 10,528,150 B2
(45) Date of Patent: Jan. 7, 2020

(54) IN-VEHICLE DEVICE

(71) Applicant: Clarion Co., Ltd., Saitama-shi, Saitama (JP)

(72) Inventors: Naoki Mori, Tokyo (JP); Takashi Matsubara, Tokyo (JP); Shintaro Takada, Tokyo (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 16/065,040

(22) PCT Filed: Oct. 24, 2016

(86) PCT No.: PCT/JP2016/081485
§ 371 (c)(1),
(2) Date: Jun. 21, 2018

(87) PCT Pub. No.: WO2017/110233
PCT Pub. Date: Jun. 29, 2017

(65) Prior Publication Data
US 2019/0004614 A1 Jan. 3, 2019

(30) Foreign Application Priority Data

Dec. 22, 2015 (JP) .................. 2015-249369

(51) Int. Cl.
*G06F 3/01* (2006.01)
*G06K 9/00* (2006.01)
(Continued)

(52) U.S. Cl.
CPC ......... *G06F 3/017* (2013.01); *G06K 9/00355* (2013.01); *B60R 16/0373* (2013.01);
(Continued)

(58) Field of Classification Search
CPC .......... G06F 3/017; G06F 3/01; G06F 3/0482; G06K 9/00355; G01C 21/36;
(Continued)

(56) References Cited

U.S. PATENT DOCUMENTS 9,939,912 B2 * 4/2018 Tsuda ................. B60K 37/06
2010/0238280 A1 9/2010 Ishii
(Continued)

FOREIGN PATENT DOCUMENTS

JP 2010-215194 A 9/2010
JP 2012-117846 A 6/2012
(Continued)

OTHER PUBLICATIONS

International Search Report (PCT/ISA/210) issued in PCT Application No. PCT/JP2016/081485 dated Jan. 24, 2017 with English translation (five (5) pages).
(Continued)

*Primary Examiner* — Rodney Amadiz
(74) *Attorney, Agent, or Firm* — Crowell & Moring LLP

(57) ABSTRACT

An in-vehicle device comprises a gesture defection unit, which recognizes a user's hand position located within a predetermined range, a driving state recognition unit which detects a driving state of a vehicle, and a gesture control unit which controls a state of a gesture operation based on a recognition result of the hand position by the gesture detection unit, wherein the gesture control unit disables the gesture operation when the driving state of the vehicle detected by the driving state recognition unit is in a predetermined disabling state.

10 Claims, 71 Drawing Sheets

(51) Int. Cl.
 *B60R 16/037* (2006.01)
 *B62D 1/04* (2006.01)
 *G01C 21/36* (2006.01)
 *G06F 3/0482* (2013.01)

(52) U.S. Cl.
 CPC .......... *B62D 1/046* (2013.01); *G01C 21/3664* (2013.01); *G06F 3/0482* (2013.01)

(58) Field of Classification Search
 CPC . G01C 21/3664; B60R 16/02; B60R 16/0373; B60K 37/06; B60K 35/00; B62D 1/046
 See application file for complete search history.

(56) References Cited

U.S. PATENT DOCUMENTS

| 2013/0076615 | A1 | 3/2013 | Iao |
| 2013/0328766 | A1 | 12/2013 | Igarashi et al. |
| 2015/0088336 | A1* | 3/2015 | Shin ........................ G06F 3/017 701/1 |
| 2016/0090103 | A1* | 3/2016 | Tan ........................ B60W 50/10 345/156 |
| 2017/0017392 | A1* | 1/2017 | Castaneda ............. G06F 3/0488 |

FOREIGN PATENT DOCUMENTS

| JP | 2013-257686 A | 12/2013 |
| JP | 2015-132905 A | 7/2015 |
| WO | WO 2013/105251 A1 | 7/2013 |

OTHER PUBLICATIONS

Japanese-language Written Opinion (PCT/ISA/237) issued in PCT Application No. PCT/JP2016/081485 dated Jan. 24, 2017 (five (5) pages).

Extended European Search Report issued in counterpart European Application No. 16878131.8 dated Jul. 25, 2019 (seven pages).

* cited by examiner

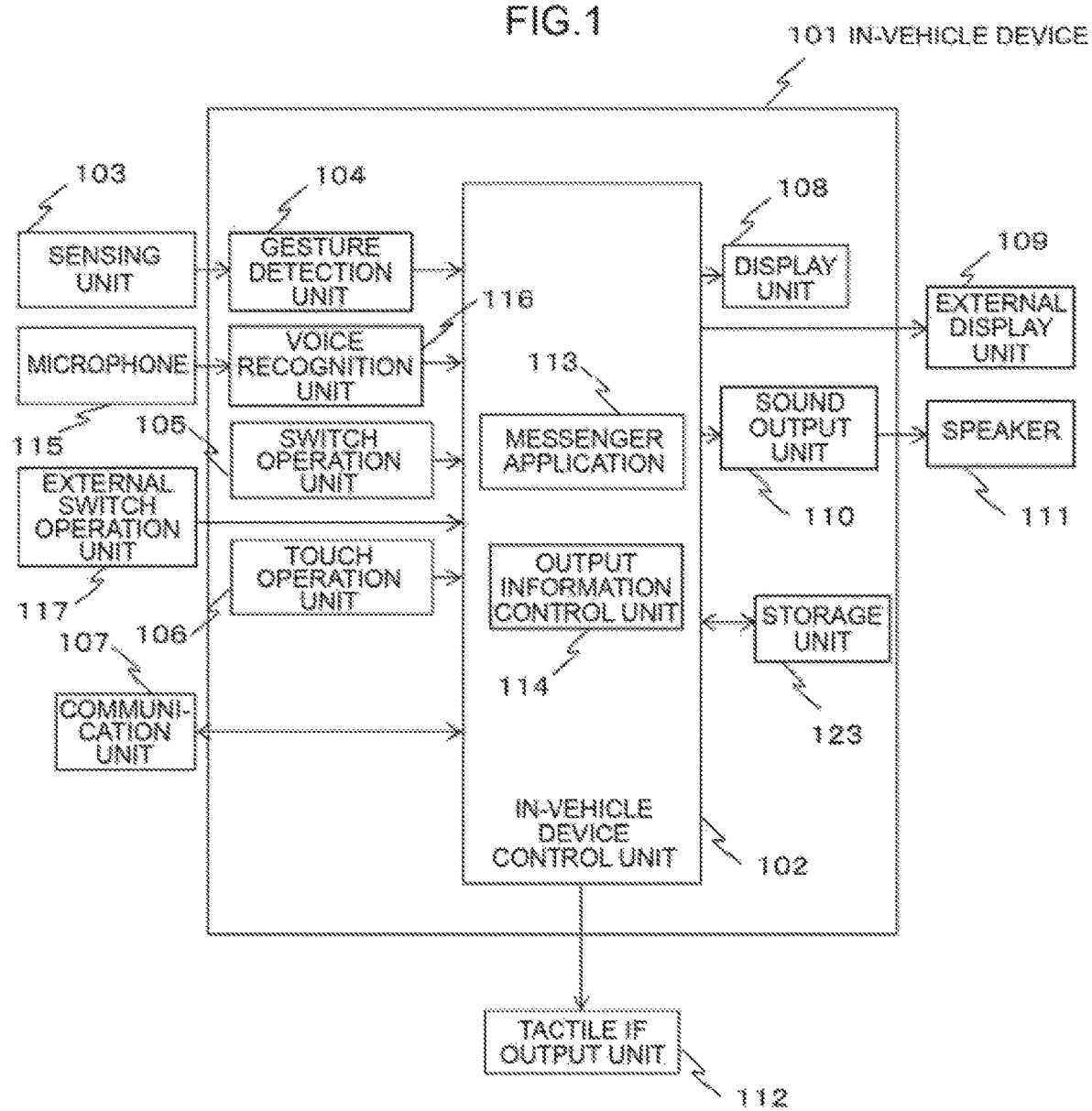

FIG.2(a)
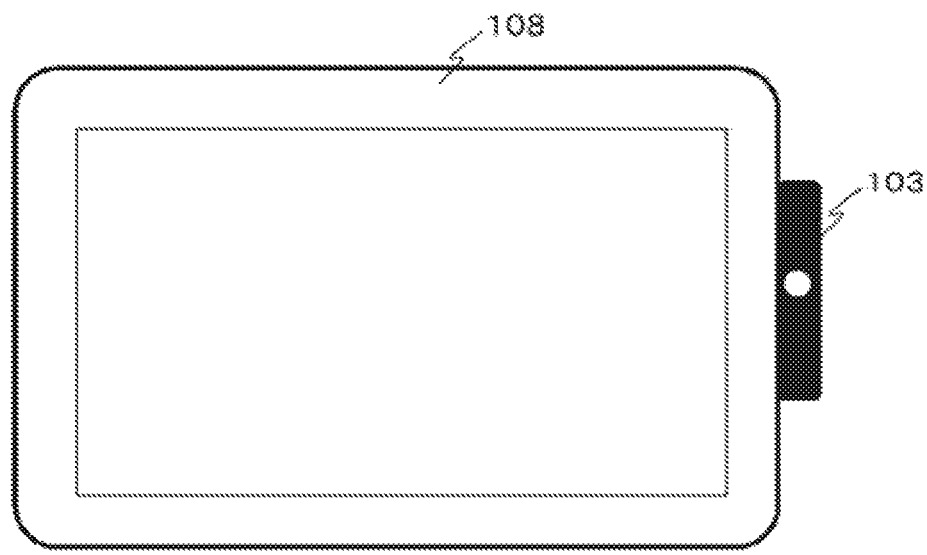
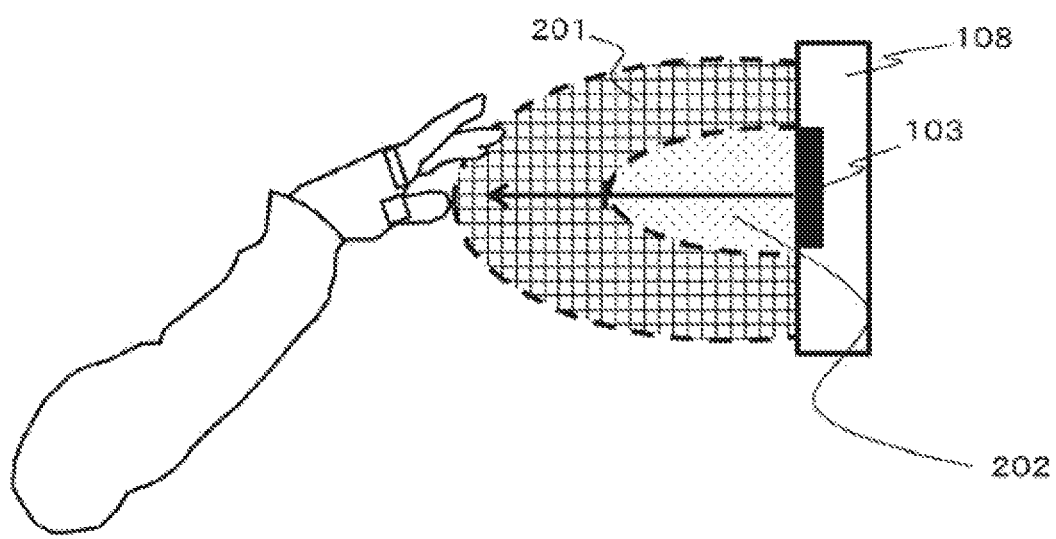

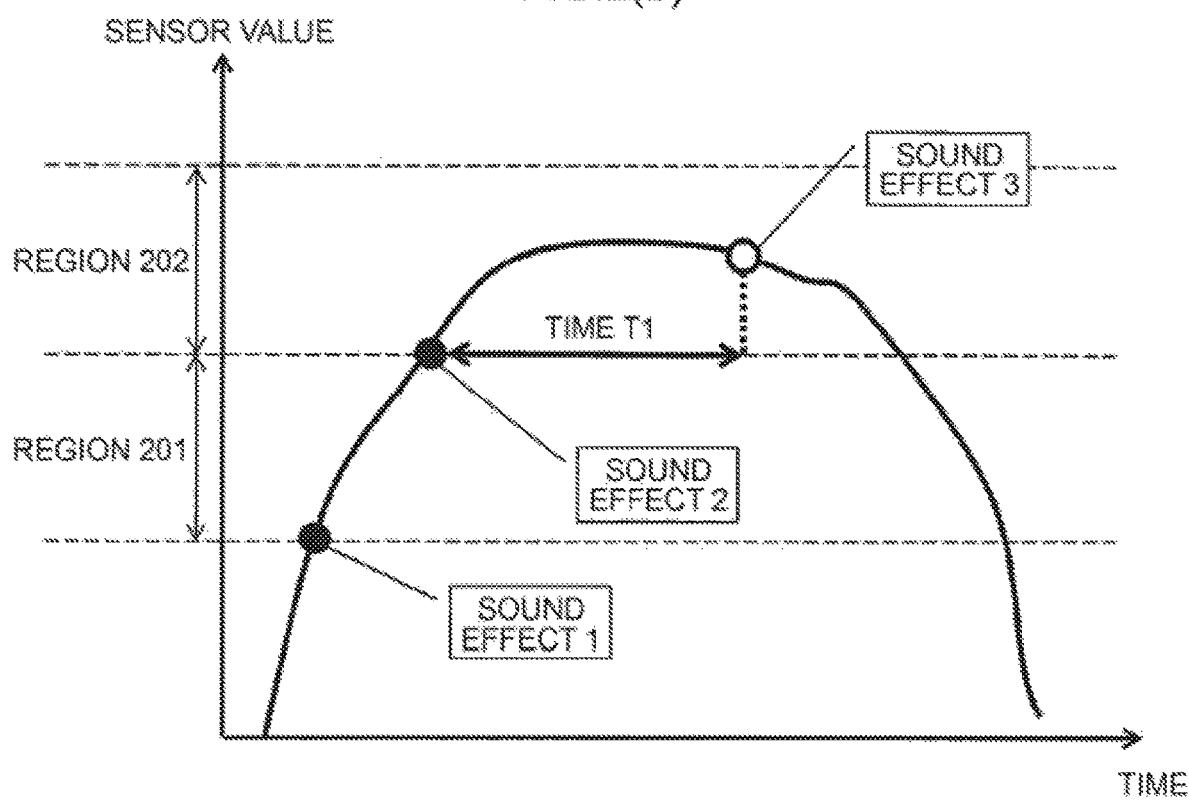

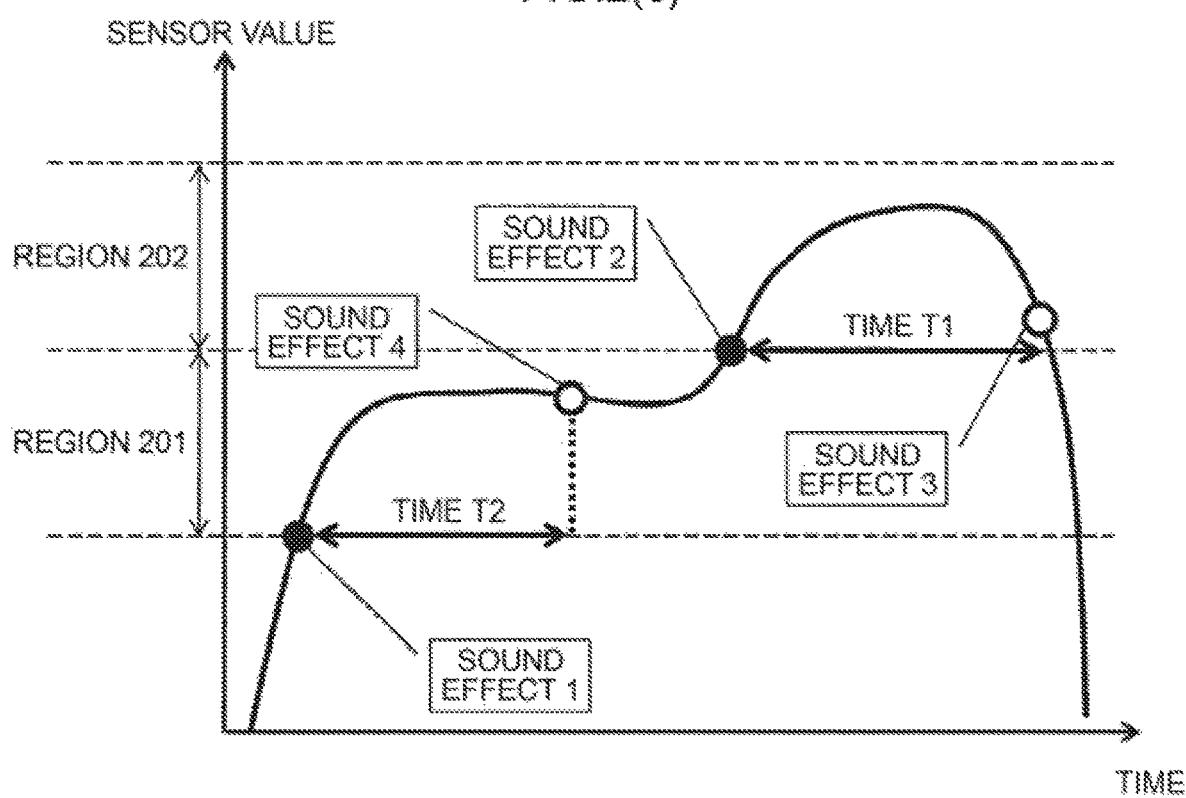

FIG.4(d)
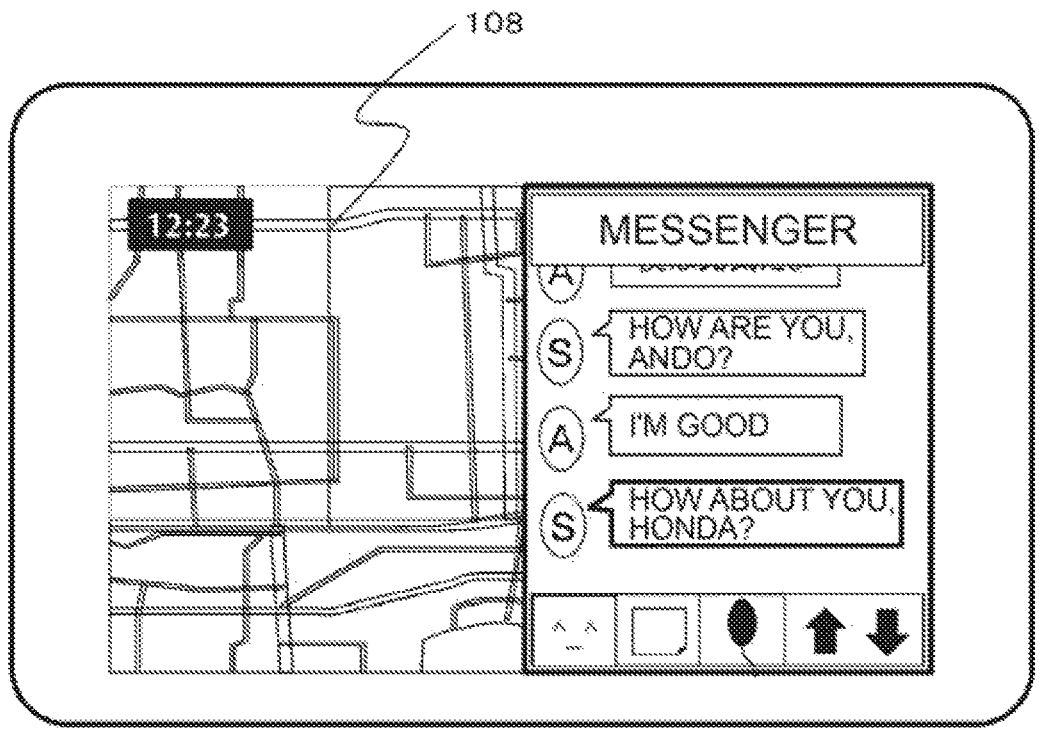
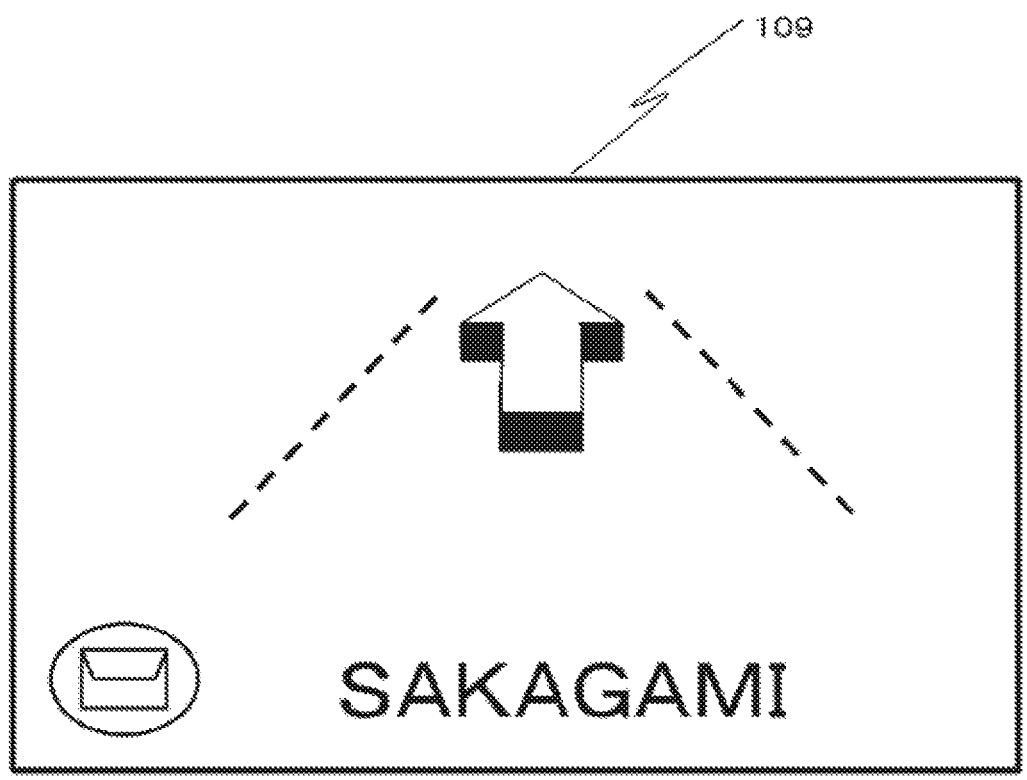

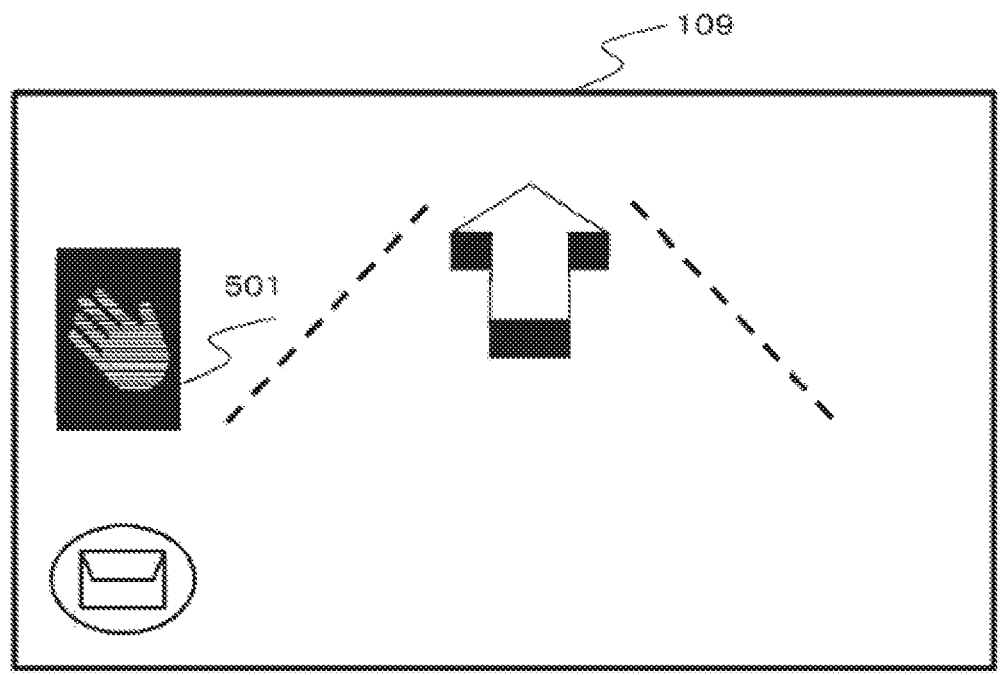

FIG.6
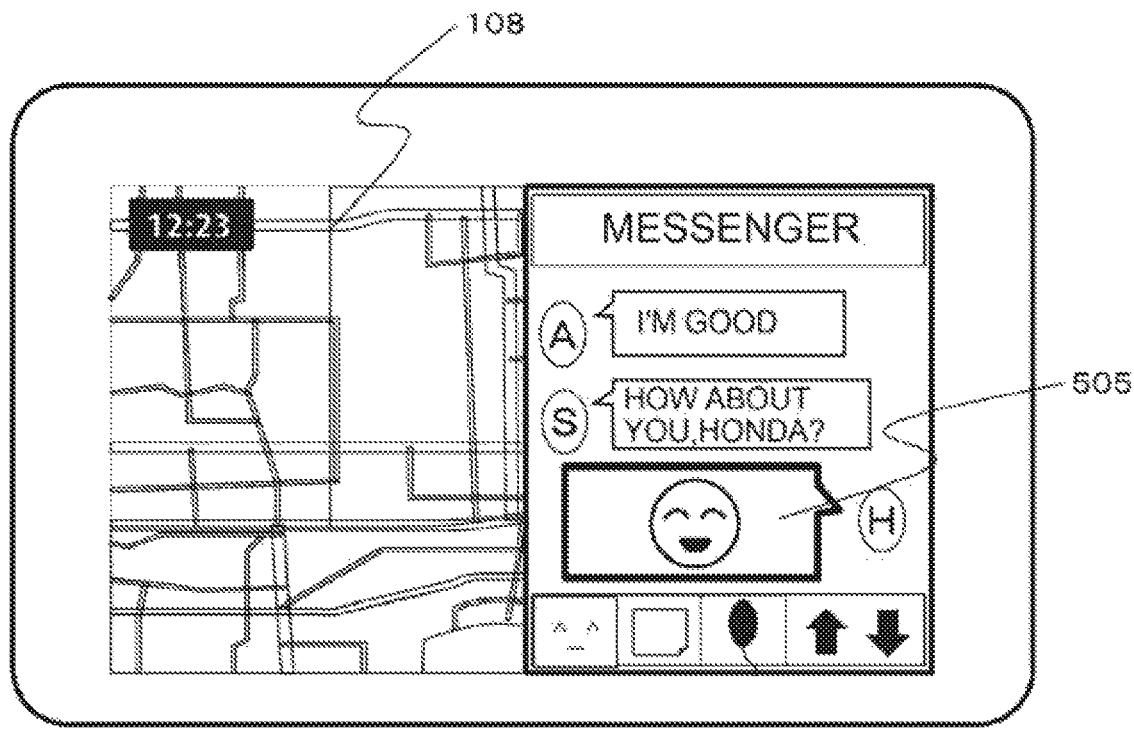
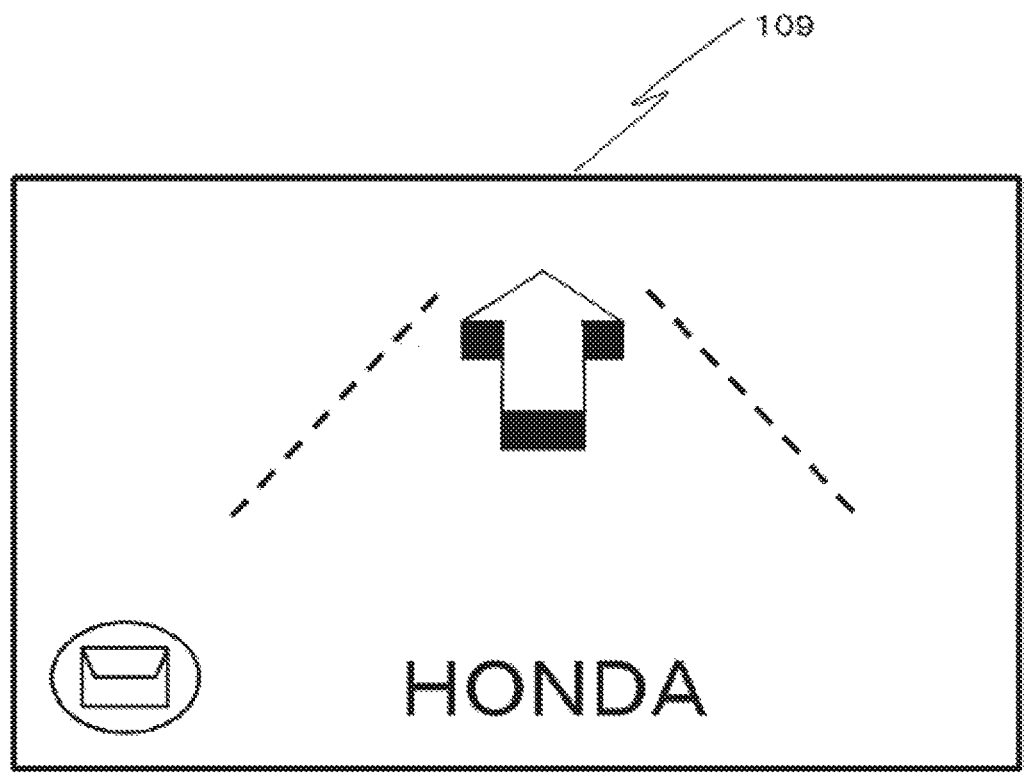

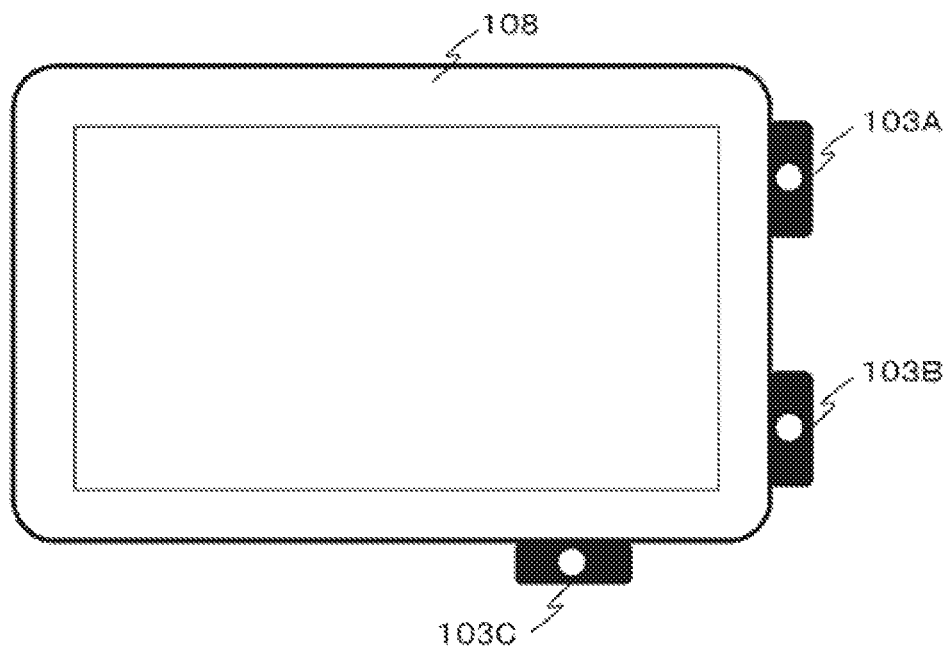

FIG.8(b)

| LOCK POSITION | 103A | 103B | 103C |
|---|---|---|---|
| START OPERATION | RETURN STAMP | RETURN FIXED PHRASE | RETURN FREE SPEECH |

FIG.9
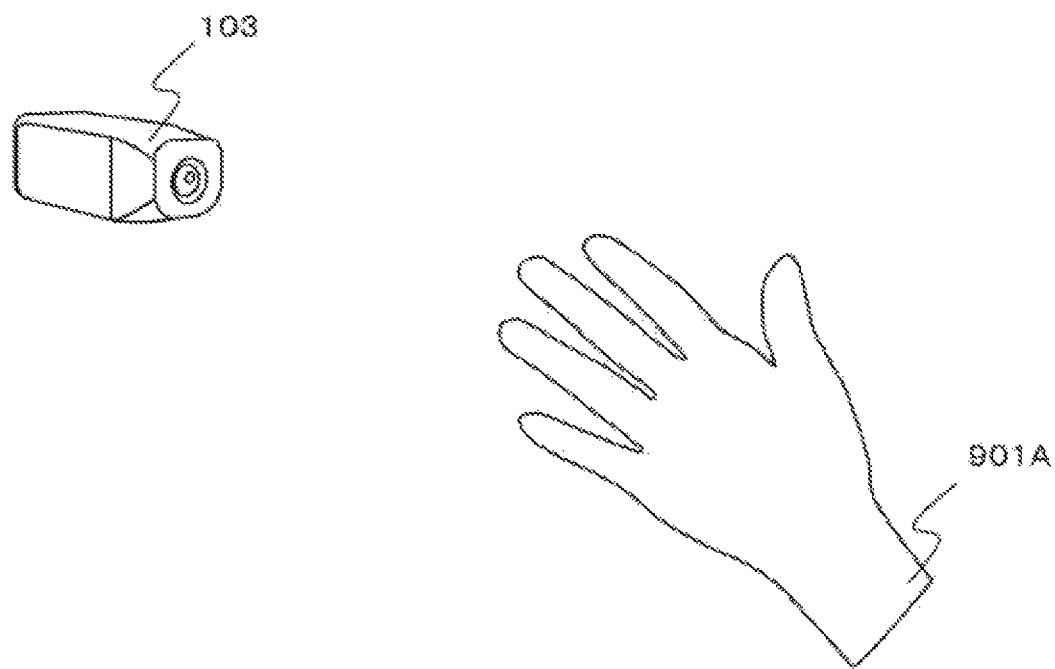
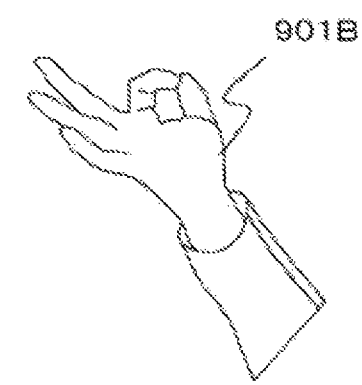
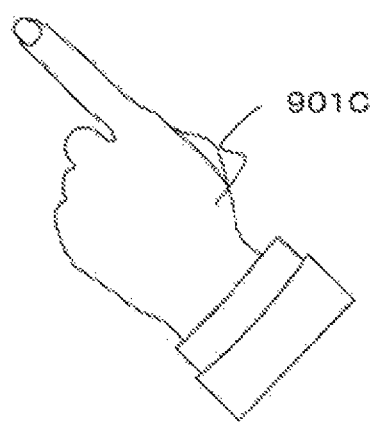

FIG.11(b)

| DISPLAY | HUD | METER DISPLAY | CENTER DISPLAY |
|---|---|---|---|
| INSTALLATION POSITION | FRONT WINDSHIELD | METER | CENTER DISPLAY |
| CONNECTION STATUS | ○ | ○ | ○ |
| PRIORITY | 1 | 2 | 3 |

FIG.11(c)

| DISPLAY | HUD | SMART PHONE | METER DISPLAY | CENTER DISPLAY |
|---|---|---|---|---|
| INSTALLATION POSITION | FRONT WINDSHIELD | FRONT PART | METER | CENTER DISPLAY |
| CONNECTION STATUS | × | ○ | ○ | ○ |
| PRIORITY | — | 1 | 2 | 3 |

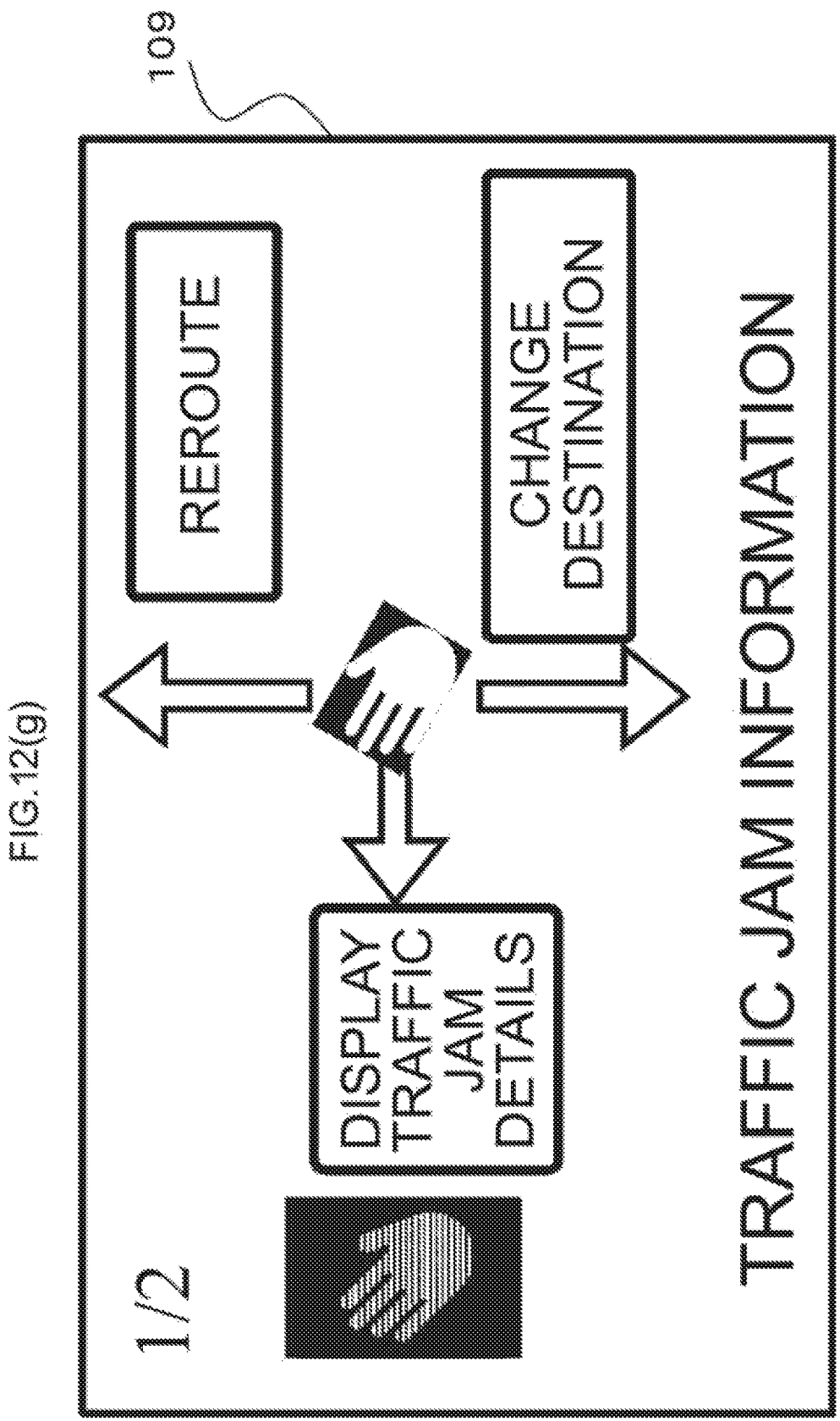

FIG.14(a)

AVAILABILITY OF RESPECTIVE OPERATION MEANS
AT RESPECTIVE OPERATING LOAD LEVELS

|  |  | OPERATING LOAD LEVEL | | | |
|---|---|---|---|---|---|
|  |  | NONE | LOW | MEDIUM | HIGH |
| OPERATION MEANS | HAND GESTURE | ○ | ○ | ○ | × |
|  | HAND PLACEMENT | ○ | ○ | × | × |
|  | GESTURE (AFTER HAND PLACEMENT) | ○ | ○ | × | × |
|  | SELECTION OF OPTION BASED ON SWITCH OPERATION | ○ | ○ | ○(ONLY MIDWAY DURING OPERATION) | × |
|  | SELECTION OF OPTION BASED ON VOICE RECOGNITION | ○ | ○ | ○(ONLY MIDWAY DURING OPERATION) | × |
|  | FREE SPEECH REPLY BASED ON VOICE RECOGNITION | ○ | ○ | ○ | × |

FIG.14(b)

CONTENTS PRESENTED ON CENTER DISPLAY

| | | OPERATING LOAD LEVEL | | | |
|---|---|---|---|---|---|
| | | NONE | LOW | MEDIUM | HIGH |
| APPLICATION STATUS | UPON DISPLAYING AND READING MESSAGE | SENDER AND MESSAGE | ONLY SENDER | ONLY SENDER | × |
| | UPON REPLY OPERATION | DISPLAY OPTION | × | × | × |

FIG.14(c)

CONTENTS PRESENTED ON HUD

| | | OPERATING LOAD LEVEL | | | |
|---|---|---|---|---|---|
| | | NONE | LOW | MEDIUM | HIGH |
| APPLICATION STATUS | UPON DISPLAYING AND READING MESSAGE | SENDER AND MESSAGE | ONLY SENDER | ONLY SENDER | × |
| | UPON REPLY OPERATION | DISPLAY OPTION | DISPLAY OPTION | ·DISPLAY OPTION (ONLY MIDWAY DURING OPERATION)<br>·OPERATION PROHIBITED | × |

FIG.14(d)

CONTENTS PRESENTED FROM SPEAKER

| | | OPERATING LOAD LEVEL | | | |
|---|---|---|---|---|---|
| | | NONE | LOW | MEDIUM | HIGH |
| APPLICATION STATUS | UPON DISPLAYING AND READING MESSAGE | SENDER AND MESSAGE | SENDER AND MESSAGE | SENDER AND MESSAGE | WARNING TONE |
| | UPON REPLY OPERATION | OPERATION TONE | OPERATION TONE | OPERATION TONE | WARNING TONE |

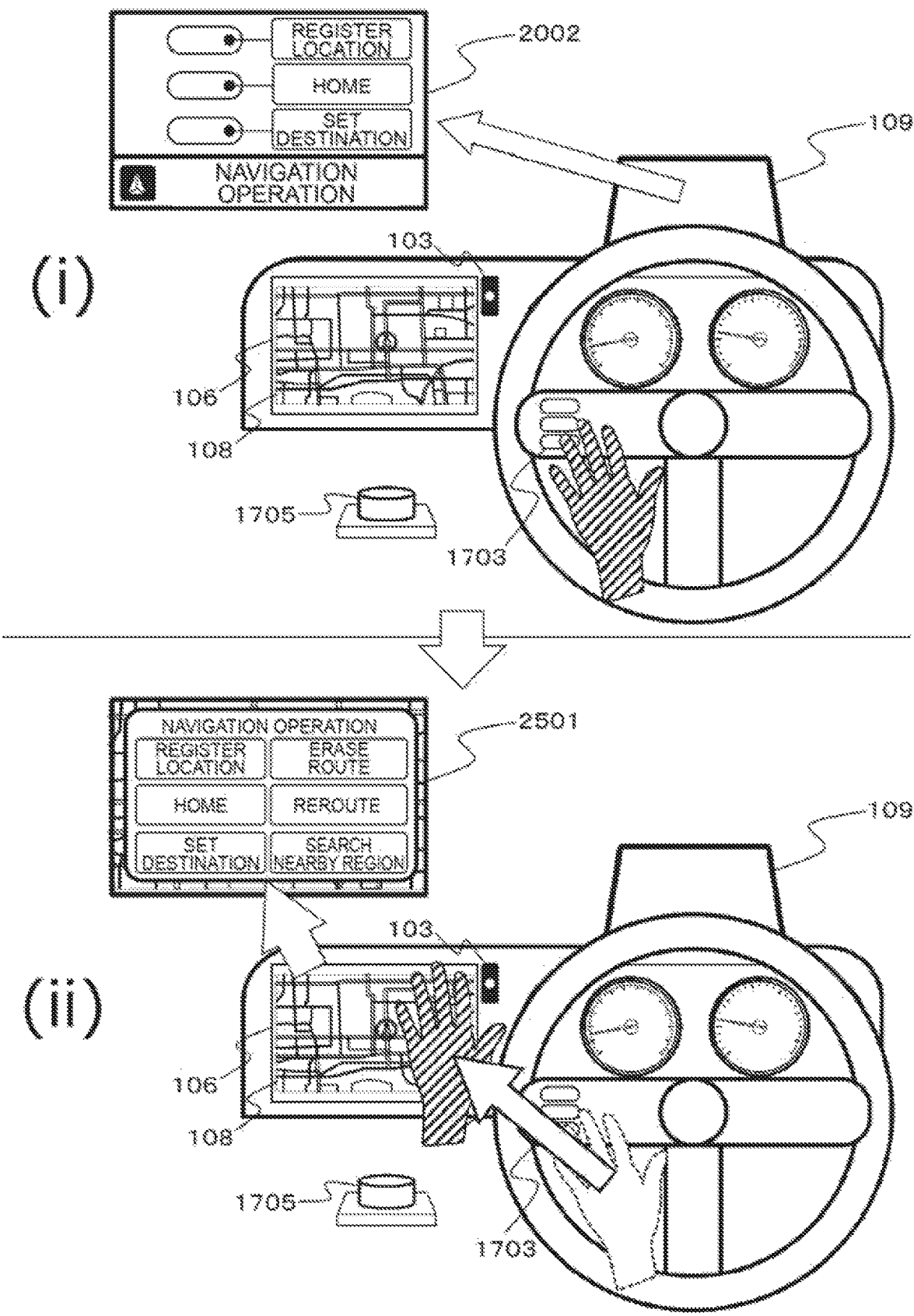

FIG.26(a)

SELECTION OF OPERATION DEVICE ACCORDING TO
APPROACH OF HAND TO SPECIFIC DEVICE

|  |  | OPERATION DEVICE | | |
|---|---|---|---|---|
|  |  | GESTURE | STEERING CONTROLLER | COMMANDER CONTROLLER |
| GESTURE DETECTION STATUS | HAND IS NEAR SENSING UNIT | ○ | — | — |
|  | HAND IS WITHDRAWN FROM SENSING UNIT | — | ○ (SELECT SPECIFIC DEVICE) | |

FIG.26(b)

SELECTION OF OPERATION DEVICE ACCORDING TO
HAND POSITION/MOVING DIRECTION

| | | OPERATION DEVICE | | |
|---|---|---|---|---|
| | | GESTURE | STEERING CONTROLLER | COMMANDER CONTROLLER |
| GESTURE DETECTION STATUS | HAND IS NEAR SENSING UNIT | ○ | — | — |
| | HAND MOVED TOWARD STEERING CONTROLLER | — | ○ | — |
| | HAND MOVED TOWARD COMMANDER CONTROLLER | — | — | ○ |

FIG.26(c)

SELECTION OF OPERATION DEVICE/DISPLAY DEVICE ACCORDING TO DRIVING/STOPPED STATE

| | | OPERATION DEVICE/DISPLAY DEVICE | | | |
|---|---|---|---|---|---|
| | | TOUCH/ CENTER SCREEN → HIGH OPERABILITY | GESTURE/ HUD → HIGH SAFETY (MINIMAL VISUAL LINE MOVEMENT) | STEERING CONTROLLER/ HUD → HIGH SAFETY (MINIMAL VISUAL LINE MOVEMENT) | COMMANDER/ HUD → HIGH SAFETY (MINIMAL VISUAL LINE MOVEMENT) |
| DRIVING/STOPPED STATE | DRIVING | — | ○ | ○ | ○ |
| | STOPPED | ○ | — | — | — |

FIG. 28
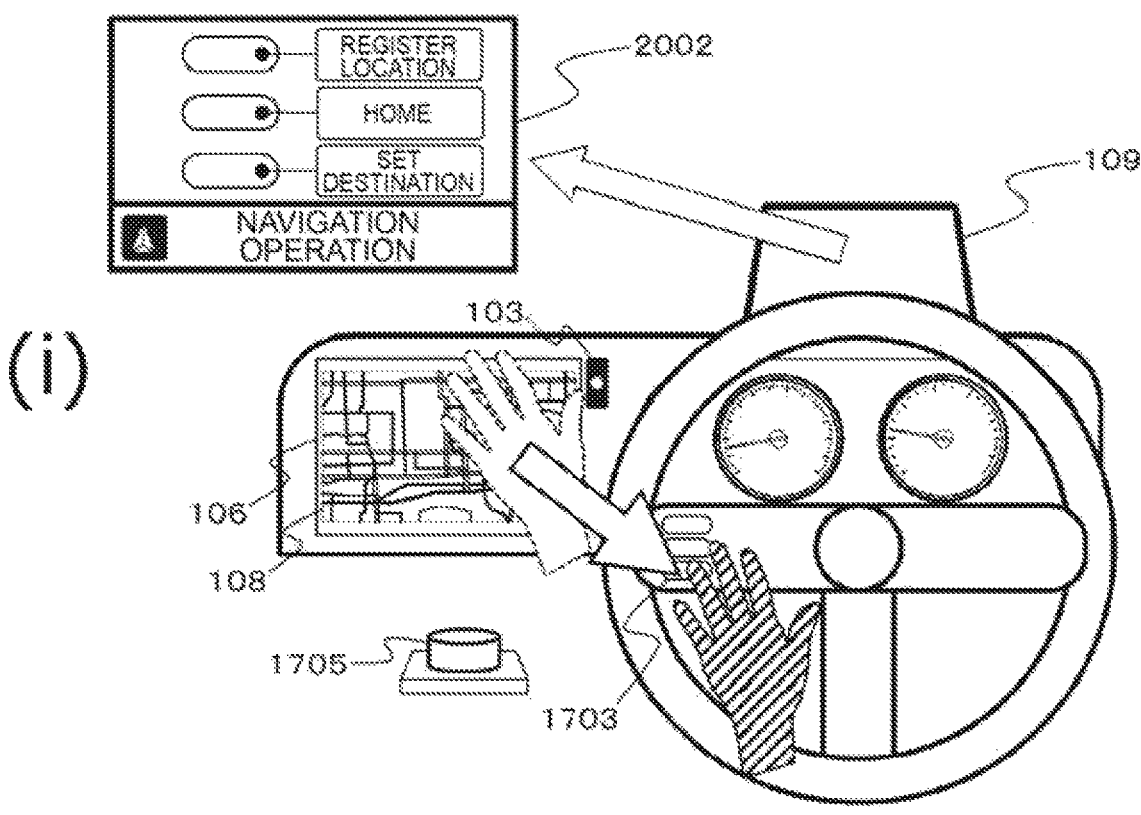
(i)
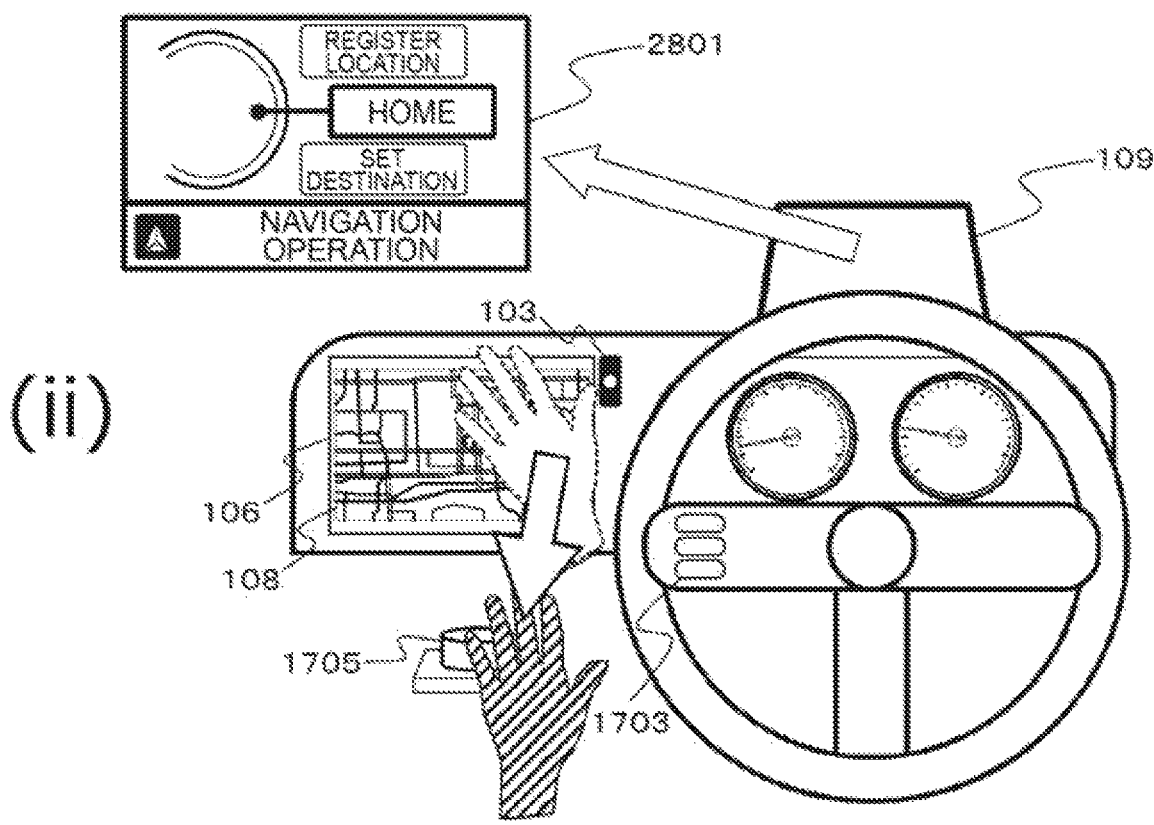
(ii)

FIG.32
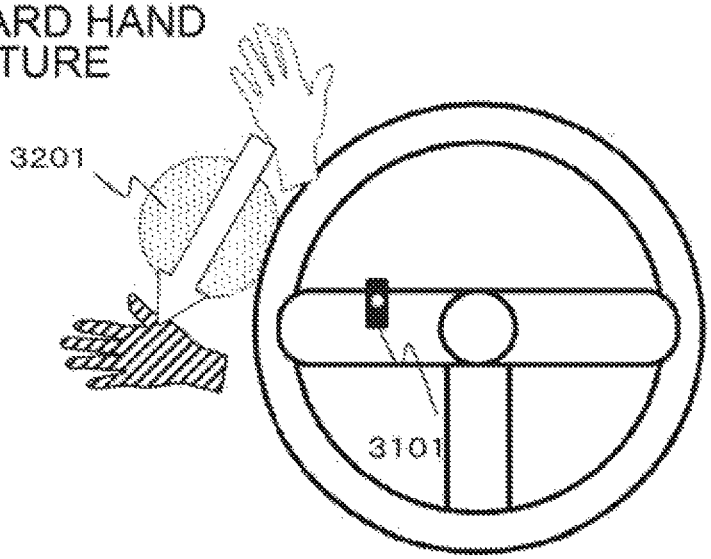
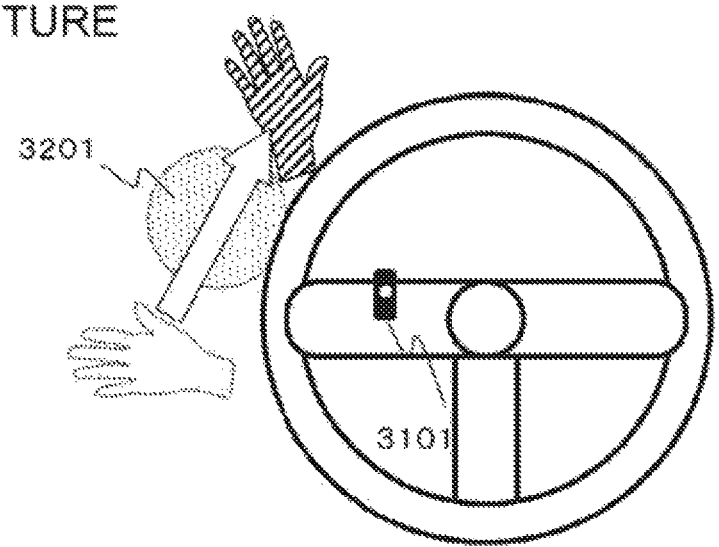

FIG.33
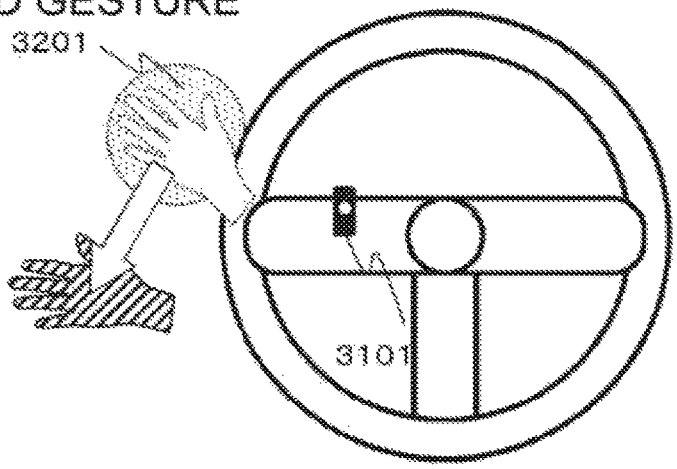
(i) HAND PLACEMENT & DOWNWARD HAND GESTURE
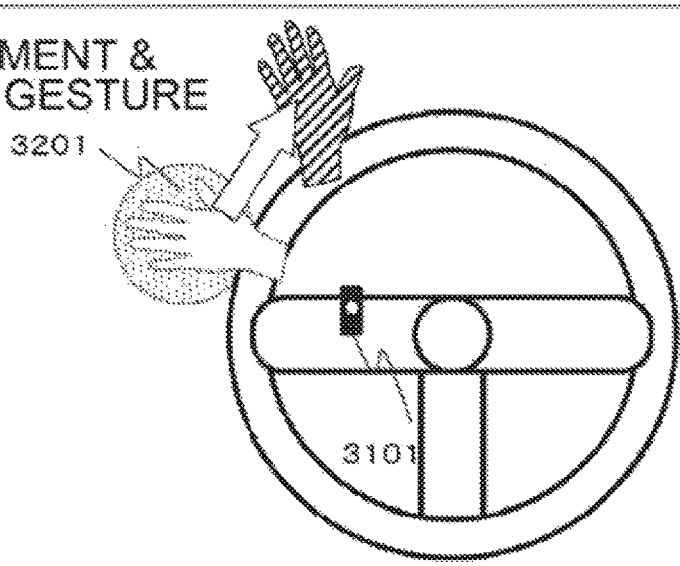
(ii) HAND PLACEMENT & UPWARD HAND GESTURE
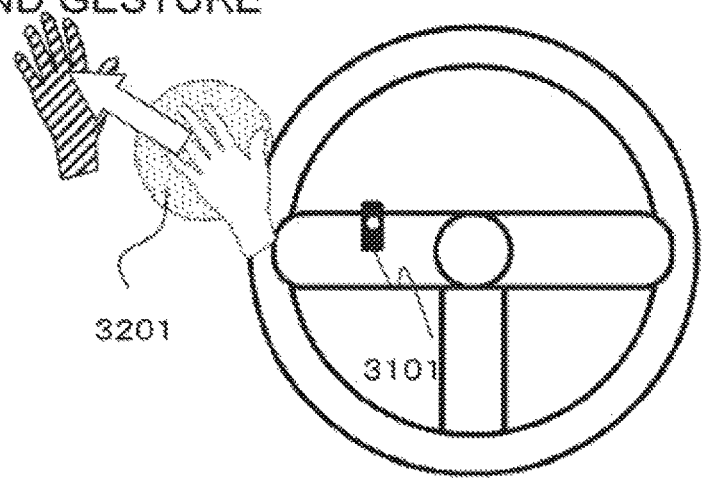
(iii) HAND PLACEMENT & LEFTWARD HAND GESTURE FIG. 34
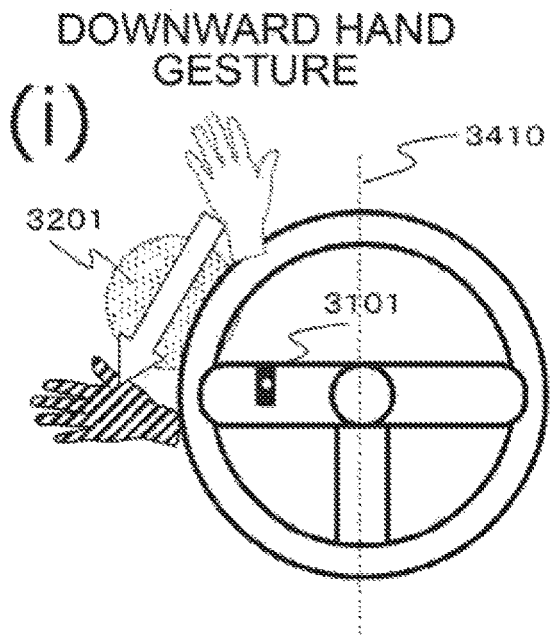
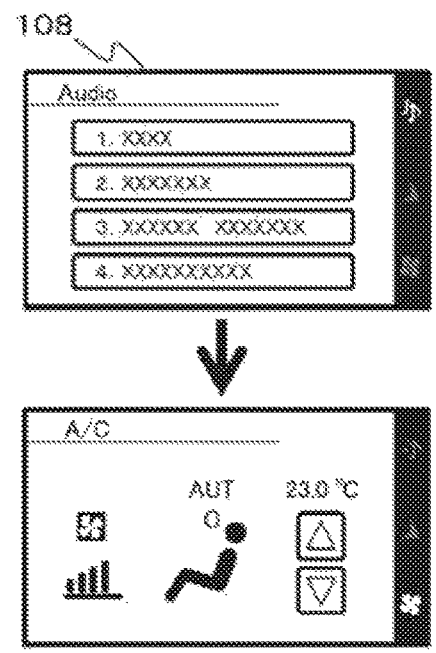
(i) DOWNWARD HAND GESTURE
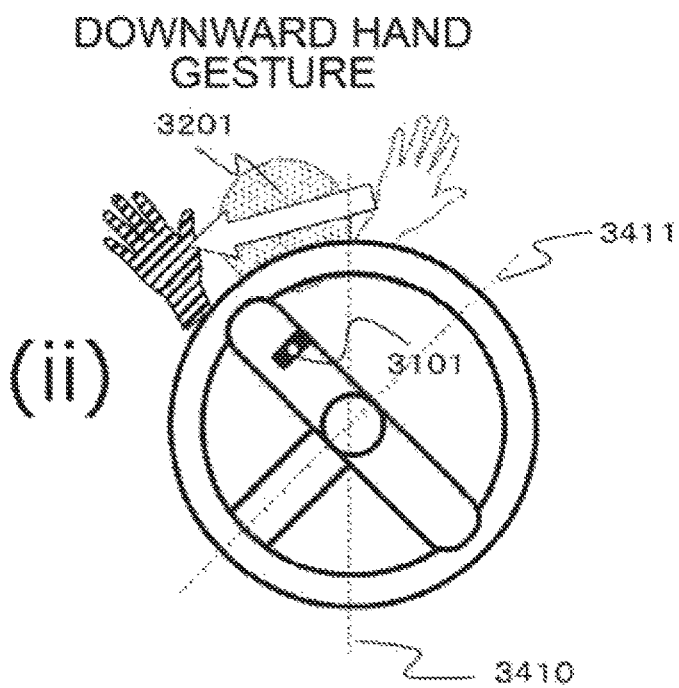
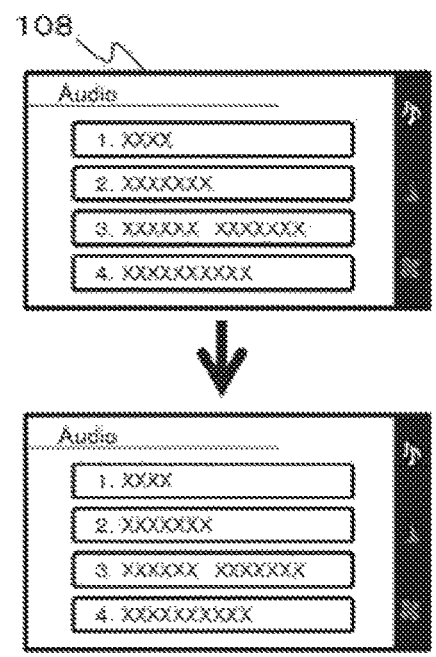
(ii) DOWNWARD HAND GESTURE

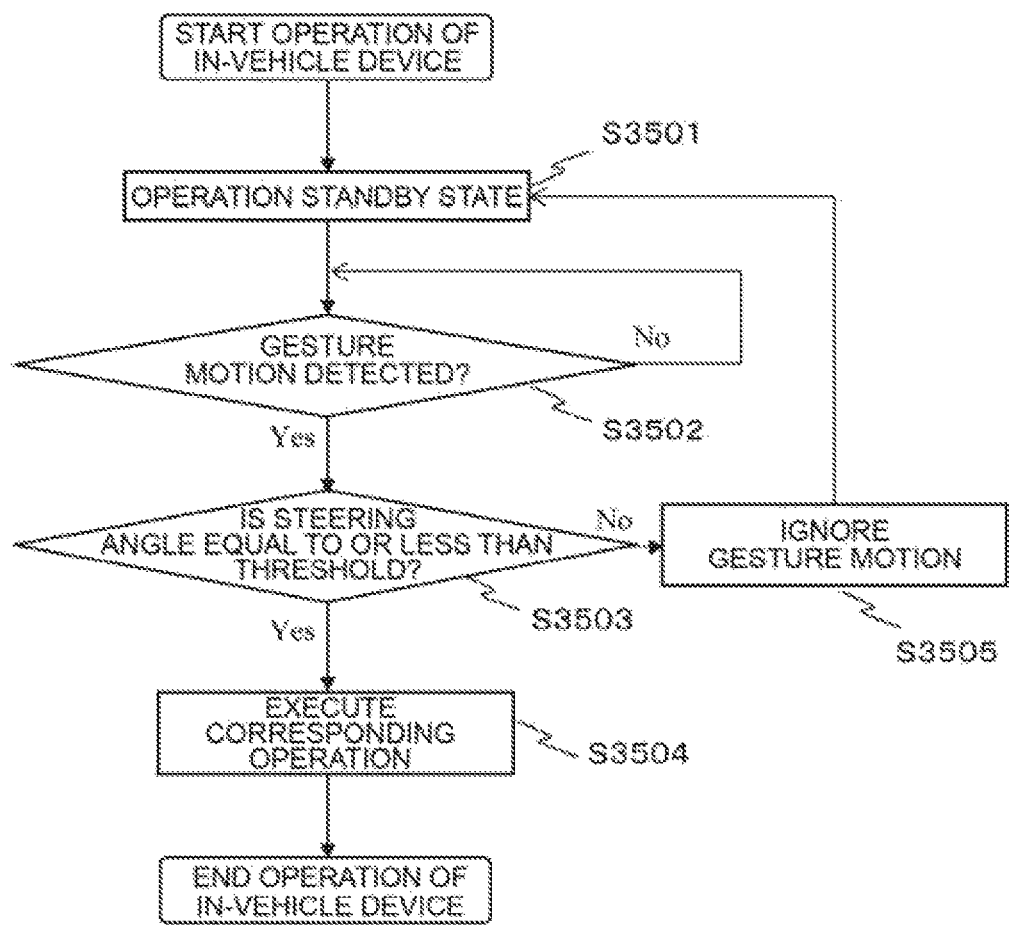

FIG.36(b)

ENABLEMENT/DISABLEMENT DETERMINATION OF GESTURE OPERATION
ACCORDING TO STEERING ANGLE

|  |  | TYPE OF GESTURE OPERATION ||
|---|---|---|---|
|  |  | DIRECT GESTURE | HAND PLACEMENT GESTURE |
| STEERING ANGLE | REGION 3601 (STEERING ANGLE IS EQUAL TO OR GREATER THAN SA00 AND LESS THAN SA01) | ○ | ○ |
| | REGION 3602 (STEERING ANGLE IS EQUAL TO OR GREATER THAN SA01 AND LESS THAN SA02) | ○ | × |
| | REGION 3603 (STEERING ANGLE IS EQUAL TO OR GREATER THAN SA02) | × | × |

FIG.38(b)

ENABLEMENT/DISABLEMENT DETERMINATION OF GESTURE OPERATION
ACCORDING TO STEERING AMOUNT (STEERING ANGLE AND ANGULAR VELOCITY)

|  |  |  | TYPE OF GESTURE OPERATION | |
|---|---|---|---|---|
|  |  |  | DIRECT GESTURE | HAND PLACEMENT GESTURE |
| STEERING AMOUNT | REGION 3601 | AV ≈ 0 | ○ | ○ |
| | | AV < THRESHOLD | ○ | ○ |
| | | THRESHOLD < AV | × | × |
| | REGION 3602 | AV ≈ 0 | ○ | ○ |
| | | AV < THRESHOLD | ○ | × |
| | | THRESHOLD < AV | × | × |
| | REGION 3603 | AV ≈ 0 | × | × |
| | | AV < THRESHOLD | × | × |
| | | THRESHOLD < AV | × | × |

FIG.39
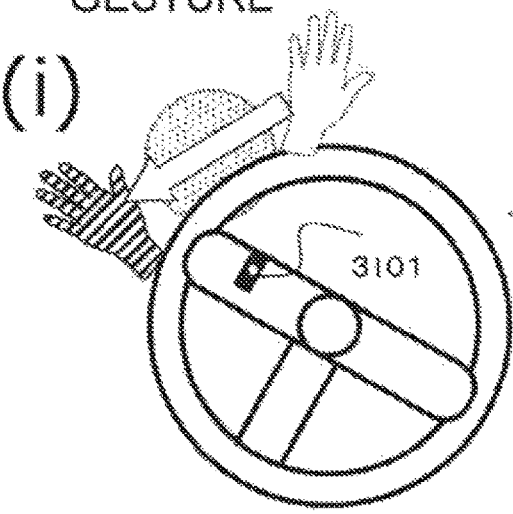
DOWNWARD HAND GESTURE
(i)
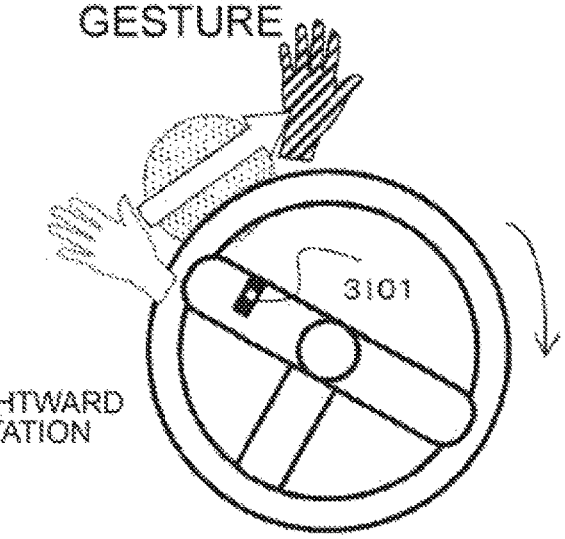
UPWARD HAND GESTURE
RIGHTWARD ROTATION
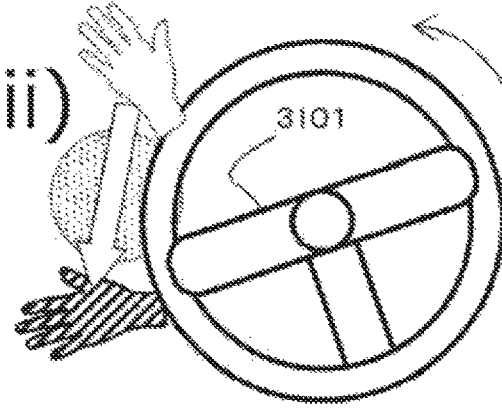
DOWNWARD HAND GESTURE
(ii)
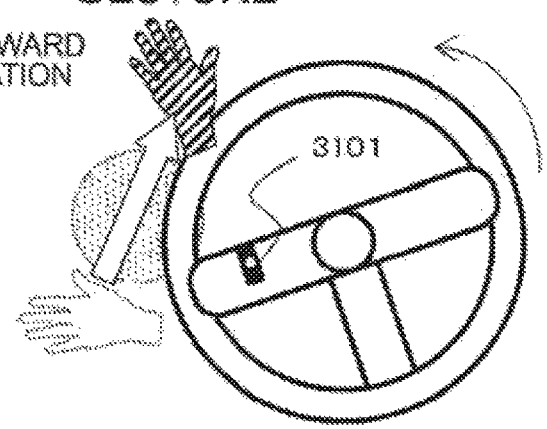
UPWARD HAND GESTURE
LEFTWARD ROTATION

FIG.40

CONTROL OF GESTURE OPERATION ACCORDING TO
STEERING ROTATION DIRECTION

|  |  | DIRECTION OF GESTURE OPERATION ||
|  |  | DOWNWARD HAND GESTURE | UPWARD HAND GESTURE |
| --- | --- | --- | --- |
| STEERING OPERATION | RIGHTWARD ROTATION OF STEERING WHEEL | ○ | × |
| | LEFTWARD ROTATION OF STEERING WHEEL | × | ○ |

FIG.42
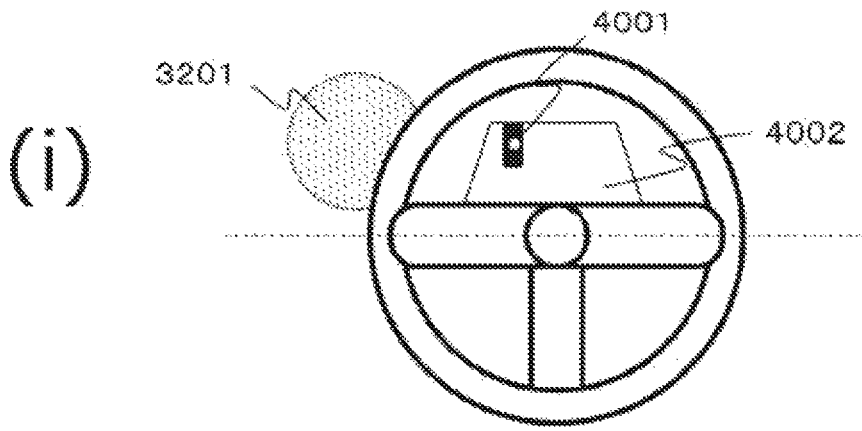
(i)
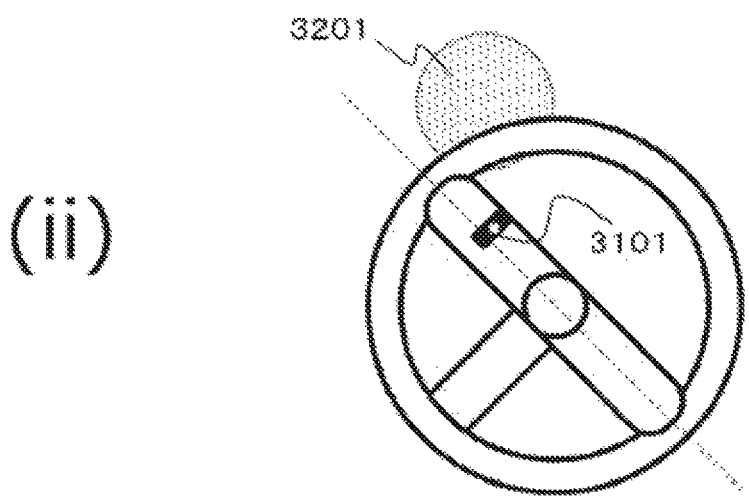
(ii)
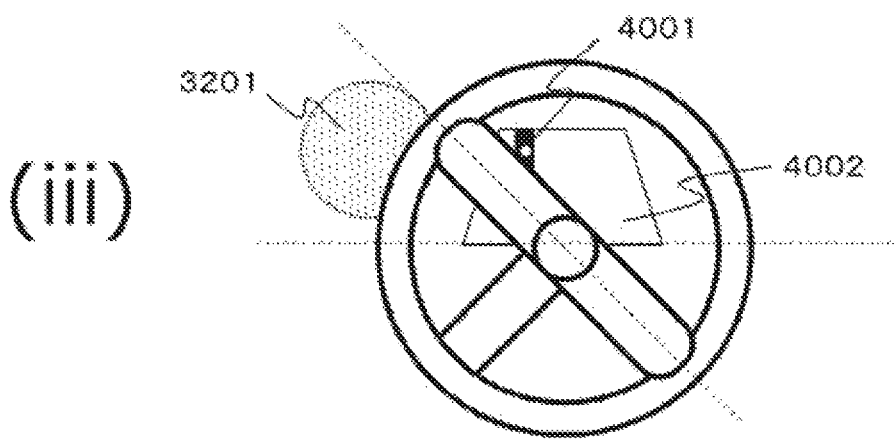
(iii)

IN-VEHICLE DEVICE

TECHNICAL FIELD

The present invention relates to an in-vehicle device.

BACKGROUND ART

PTL 1 describes an operation device of in-vehicle equipment which superimposes and displays, on a head up display (HUD), the operation menu of the in-vehicle equipment and the projected image of the driver's hand placed on the operation unit, and thereby allows the driver to operate the operation unit white viewing the projected image to simplify and facilitate the selection operation of the in-vehicle equipment so that such operation will not interfere with the diving of the vehicle.

CITATION LIST

Patent Literature

[PTL 1] Japanese Patent Application Publication No. 2010-215194

SUMMARY OF THE INVENTION

Problems to be Solved by the Invention

Nevertheless, when operating the in-vehicle equipment while driving a vehicle, with the technology described in PTL 1, because the operation menu is constantly displayed on the HUD, such display of the operation menu may interfere with the diving operation. Moreover, in order to perform operations, a dedicated device for performing operations must be installed somewhere within the vehicle, and, in addition to increased costs, there are restrictions in the mounting of such device. Furthermore, even in cases of using a voice-only interface, processing time of the processing required for voice recognition and time for listening to the emitted voice are required, and the operability and convenience am impaired.

Means to Solve the Problems

According to the first mode of the present invention, an in-vehicle device comprises a gesture detection unit which recognizes a user's hand position located within a predetermined range, a driving state recognition unit which detects a driving state of a vehicle, and a gesture control unit which controls a state of a gesture operation based on a recognition result of the hand position by the gesture detection unit, wherein the gesture control unit disables the gesture operation when the driving state of the vehicle detected by the driving state recognition unit is in a predetermined disabling state.

Advantageous Effects of the Invention

According to the present invention, it is possible to improve the safety and operability of the operation of in-vehicle equipment by a driver who is driving a vehicle.

BRIEF DESCRIPTION OF DRAWINGS

FIG. 1 is a configuration diagram of an in-vehicle device in the first embodiment of the present invention.

FIG. 2(a) shows an example of an installation position of a sensing unit.

FIG. 2(b) shows an example of gesture defection areas.

FIG. 2(c) shows an example of gesture detects areas.

FIG. 4(d) shows a display example of a display unit and an external display unit.

FIG. 5(b) shows a display example of an external display unit.

FIG. 6 shows a display example of a display unit and an external display unit.

FIG. 8(a) shows an installation example of a sensing unit.

FIG. 8(b) shows a correspondence example of operations decoding to the position of a sensing unit.

FIG. 9 shows an example of a sensing unit and shapes of a user's hand.

FIG. 11(b) shows an example of display locations of the displayed contents.

FIG. 11(c) shows an example of display locations of the displayed contents.

FIG. 12(g) shows a display example of an external display unit.

FIG. 14(a) shows an example of a control pattern according to a driving load level.

FIG. 14(b) shows an example of a control pattern according to a driving load level.

FIG. 14(c) shows an example of a control pattern according to a driving bad level.

FIG. 14(d) shows an example of a control pattern according to a driving load level.

FIG. 25 shows an example of an operation method based on a steering controller and a touch panel.

FIG. 26(a) shows a table indicating a selection method of an operation device according to the approach of a user's hand to a specific device.

FIG. 26(b) shows a table indicating a selection method of an operation device according to the position and moving direction of a user's hand.

FIG. 28(c) shows a table indicating a selection method of an operation device and a display device according to the driving/stopped state.

FIG. 28 shows an example of an operation method based on a steering controller and a commander controller.

FIG. 32 shows an example of the gesture detection region and the user's hand motion.

FIG. 33 shows an example of the gesture detection region and the user's hand motion.

FIG. 34 shows a differentiation method of the gesture operation according to the steering angle and a display example of the display unit.

FIG. 36 shows an example of the operational flow.

FIG. 36(b) shows an example of the enablement/disablement determination of the gesture operation according to the steering angle.

FIG. 36(a) shows an example of steering angles and angular velocity in the steering operation.

FIG. 39 shows an example of the gesture operation method according to the rotating direction of the steering wheel.

FIG. 40 shows a table illustrating the control method of the gesture operation according to the rotating direction of the steering wheel.

FIG. 42 shows an example illustrating the relationship of the steering wheel and the gesture detection region.

DESCRIPTION OF EMBODIMENTS

Figure 3A:
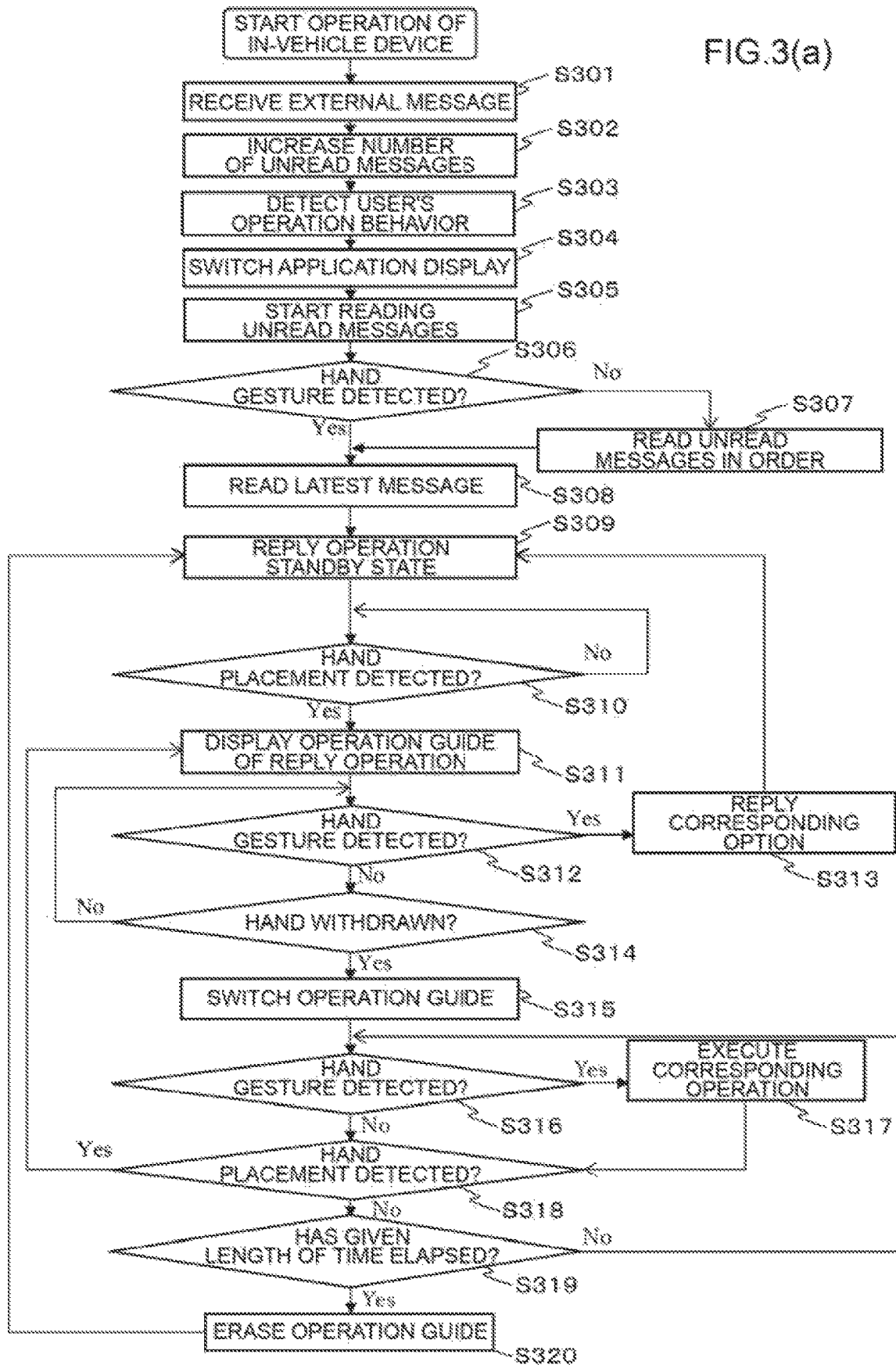
FIG. 3(a) shows an example of an operation flow in the first embodiment.

Embodiments of the present invention are now explained in detail with reference to the appended drawings.

First Embodiment

<<Explanation of Configurations>>

FIG. 1 is a configuration diagram of an in-vehicle device 101 in the first embodiment. An in-vehicle device control unit 102 is the part, that controls the overall operation of the in-vehicle device 101 and realizes the functions as a messenger application 113 and an output information control unit 114 by performing operations according to programs related to the messenger application 113 and the output information control unit 114 stored in a storage unit 123. Note that, the in-vehicle device 101 may also be loaded with applications other than the messenger application 113 and the output information control unit 114, and these programs may also be stored in the storage unit 123 at the time of factory shipment, or may be stored in the storage unit 123 selected by the user via a communication unit 107, or via an externally connected IF (not shown) such as a USB terminal. Moreover, the in-vehicle device control unit 102 controls the basic operation as a car navigation system, and additionally controls the contents to be output based on the various types of input information.

A sensing unit 103 is the pad that detects the distance between the user's hand and a sensor, and detects the waving of the user's hand, and is configured, for example, from a sensor such as an infrared distance sensor, a laser distance sensor, an ultrasonic distance sensor, a distance image sensor, an electrolytic sensor, or an image sensor, a microcomputer which performs data processing, and software that, runs on the microcomputer. There is no particular limitation regarding the sensors to be used in the sensing unit 103, and any sensor may be used so as long as it has a function of being able to obtain a signal for detecting the distance to the user's hand and detecting the waving of the user's hand.

Based on the sensor data obtained from the sensing unit 103, a gesture detection unit 104 detects whether the user placed one's hand at a certain position, or whether a predetermined gesture (for instance, hand waving motion in a vertical/horizontal direction) was performed. For example, the user's hand placement is detected by analyzing whether a predetermined sensor value has continued for a given length of time, and the gesture operation is detected by analyzing the difference between the response times of the hand detection results between a plurality of sensors.

A switch operation unit 105 is a hardware switch for operating the in-vehicle device 101, and may be a button-pressing type, or a jog-dial type.

A touch operation unit 106 sends the touched coordinates to the in-vehicle device control unit 102, and operates the in-vehicle device 101.

A microphone 115 acquires sounds within the vehicle.

A voice recognition unit 118 converts the speech from the input sound data into a text code string.

A communication unit 107 is connected to an outside network, and inputs/outputs various types of information. For example, the communication unit 107 inputs navigation-related information and sends/receives messages.

An external switch operation unit 117 is a switch operation unit installed at a location that is different from the location of the in-vehicle device 101, and considered may be a steering switch mounted near the steering wheel, or a commander switch mounted on the center console of the vehicle.

A display unit 108 is a device for presenting video information to the user, and, for instance, is a device comprising a display device such as an LCD (Liquid Crystal Display), and an arithmetic processing device and a memory which are required for the display processing of video contents and GUI (Graphical User interface).

An external display unit 109 is a display installed at a location within the vehicle that is different from the location of the in-vehicle device 101. For example, the external display unit 109 may be a head up display (HUD) mounted at the anterior of the driver's seat. An HUD can display various types of information while allowing the scenery ahead of the driver (user) to pass therethrough.

A sound output unit 110 is the part that outputs sounds or voices.

A speaker 111 outputs sound from the sound output unit 110.

A tactile IF output unit 112 is the part that conveys some type of tactile information to the user, and, for instance, is configured from an ultrasonic array formed from a plurality of ultrasonic elements, and conveys the spatial pressure to an arbitrary distance of the device. Otherwise, an air blower may be provided to yield the same effect. Moreover, the tactile IF output unit 112 may also be configured from an oscillator mounted near the steering wheel to cause the entire steering wheel to vibrate, and there is no particular limitation regarding the constituent elements.

A messenger application 113 sends and receives messages to and from the communication unit 107, stores the input messages, and outputs such messages. Moreover, when sending a message, the messenger application 113 sends the outbound message to the communication unit 107.

An output information control unit 114 controls the contents to be output to the display unit 108 or the external display unit 109.

FIG. 2(*a*) shows an installation example of the sensing unit 103. The sensing unit 103 is mounted on the driver's side in a right-side steering wheel vehicle relative to the display unit 108, and can detect the distance information of an object from the spot of the sensor element, and the movement of the object. Consequently, as shown in the lower diagram of FIG. 2(*a*), the space between the vehicle device 101 and the user is divided into a plurality of areas, and in which region the user's hand exists can be detected in detail. As shown in the lower diagram, the space is divided into a region 201 that is close to the sensor position, and a region 202 that is even closer to the sensor position. Note that the number of sensor elements, installation position, and areas to be detected are not limited to this example.

<<Main Operational Flow>>

The operation of the in-vehicle device 101 is now explained in detail with reference to the operation flow shown in FIG. 3(*a*). Note that, when the messenger application 113 is to output videos or voices to output units such as the display unit 108, the external display unit 109, and the speaker ill, the messenger application 113 sends video or voice information to the output information control unit 114, and the output information control unit 114 determines whether or not to output the received information to the foregoing output units. However, in order to simplify the ensuing explanation, expressions such as "the messenger application 113 outputs videos to the display unit 108" and "the messenger application 113 outputs voices" will be used.

Figure 4A:
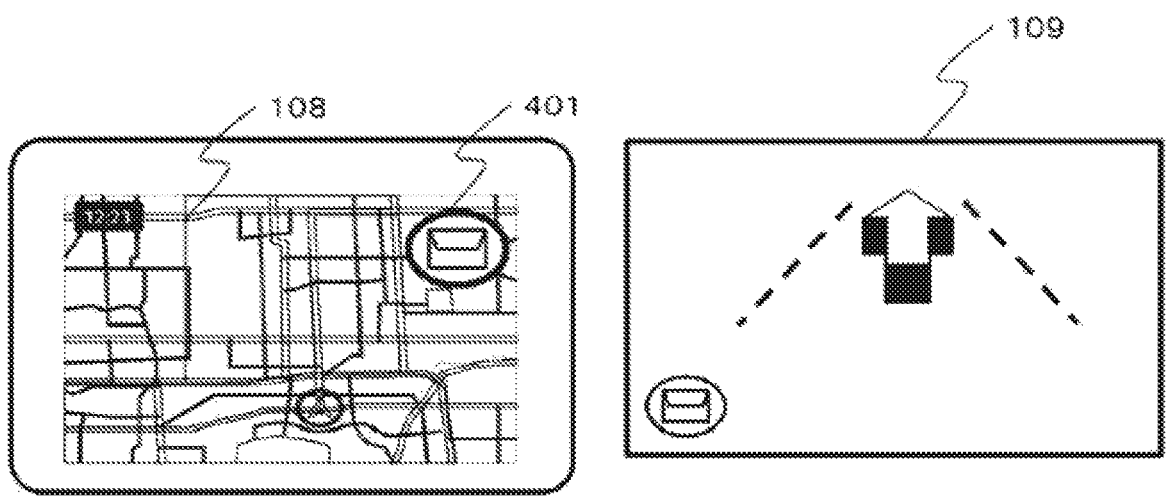
FIG. 4(a) shows a display example of a display unit and an external display unit.
Figure 4B:
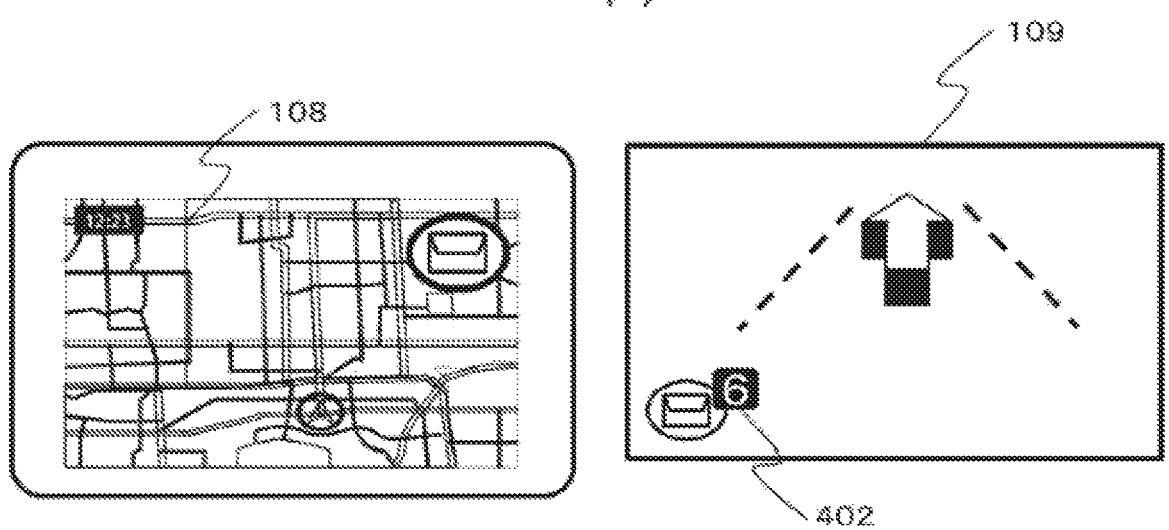
FIG. 4(b) shows a display example of a display unit and an external display unit.
Figure 4C:
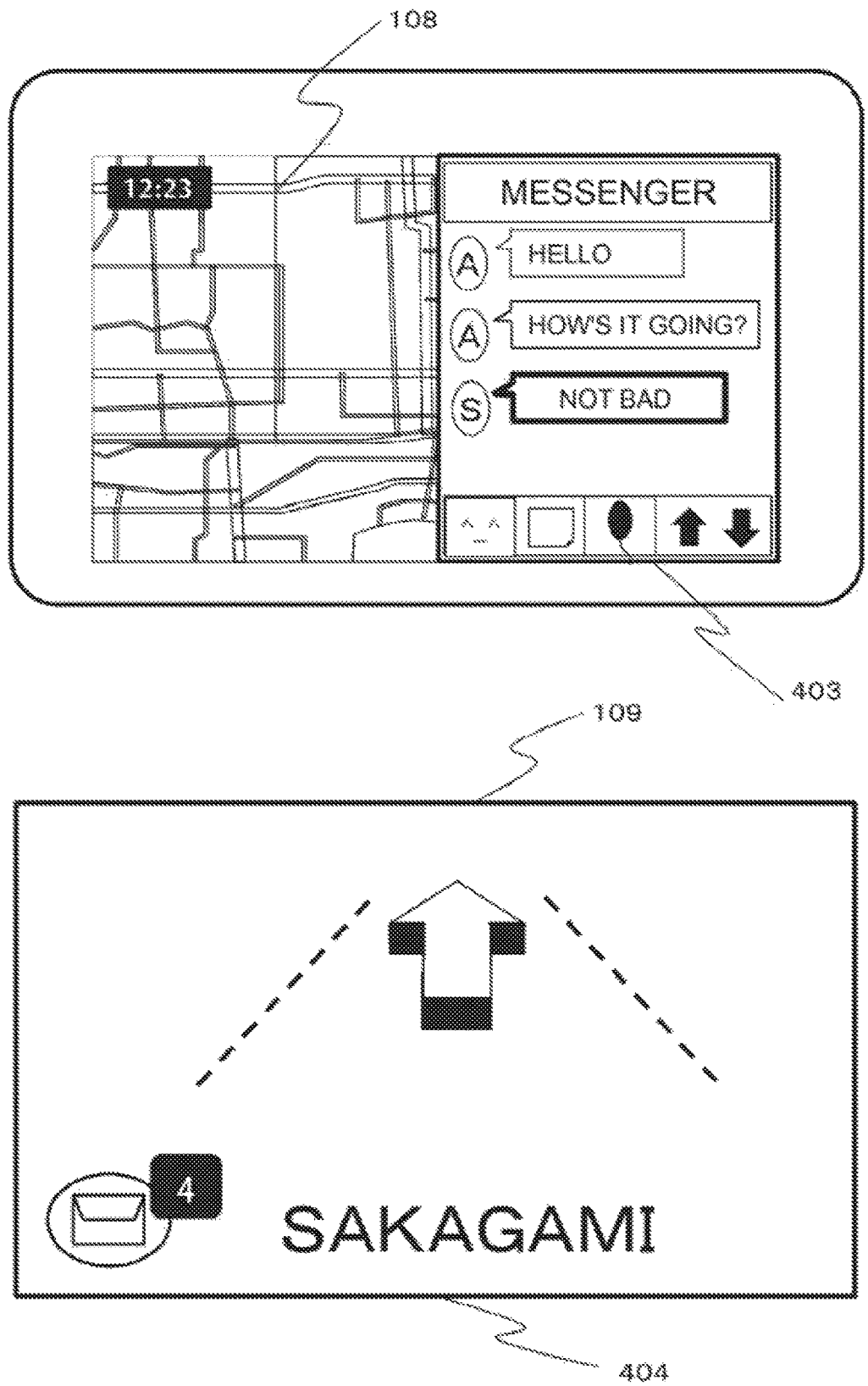
FIG. 4(c) shows a display example of a display unit and an external display unit.

Foremost, the operation of the in-vehicle device 1 is started when the engine of the vehicle is started. The operation of the output information control unit 114 displays a navigation screen and an icon 401 of the messenger application 113 on the display unit 108 (center display in this example) as shown in FIG. 4(*a*) when the operation is started. The messenger application 113 is executed in the background by the in-vehicle device control unit 102 together with the activation of the in-vehicle device 101 and is activated by the output information control unit 114 when the touch operation unit 108 detects a touch operation of touching the icon 401, or the gesture detection unit 104 detects the user's predetermined gesture operation (for instance, hand waving in the leftward direction in front of the sensor).

Moreover, the output information control unit 114 displays a navigation screen and a screen related to the messenger application 113 on the external display unit 109 (HUD in this example) when the operation is started. When a message is received from the outside via the communication unit 107 (S301), the messenger application 113 outputs a sound affect to notify an incoming message, displays the total number of received messages on the external display unit 109 as shown with an icon 402 of FIG. 4(*b*), and notifies the user that the number of unread messages has increased.

When the gesture detection unit 104, the voice recognition unit 118, the switch operation unit 105, the external switch operation unit 117, or the touch operation unit 108 subsequently detects that the user performed an operation for activating the messenger application 113 (S303), the output information control unit 114 switches the display to a screen for using the application by activating the messenger application 113 as shown in FIG. 4(*c*) (S304). The messenger application 113 thereafter outputs voice information which reads the received messages in order from the oldest message (S305). FIG. 4(*c*) is a display example when using the half screen of the display unit 108 as the screen of the messenger application 113.

When the touch operation unit 106 detects that the user touched a region of an icon 403 on FIG. 4(*c*), the messenger application 113 causes the display unit 106 to display a screen for performing the respective operations of stamp reply, fixed phrase reply, free speech reply, and message return/forward from the left side of the region of the icon 403.

Moreover, while the voice information of S305 is being output, the messenger application 113 causes the external display unit 109 to display the current number of unread messages as with an icon 404 in the lower diagram of FIG. 4(*c*), and the name of the sender of the message that is being read. When the gesture detection unit 104 detects that the user performed a predetermined gesture operation (for instance, hand waving motion in an upward or downward direction) while the message is being read (S308: Yes), the messenger application 113 causes the speaker 111 to output voice information so that the latest message among the spread messages is read (S308).

Figure 5A:
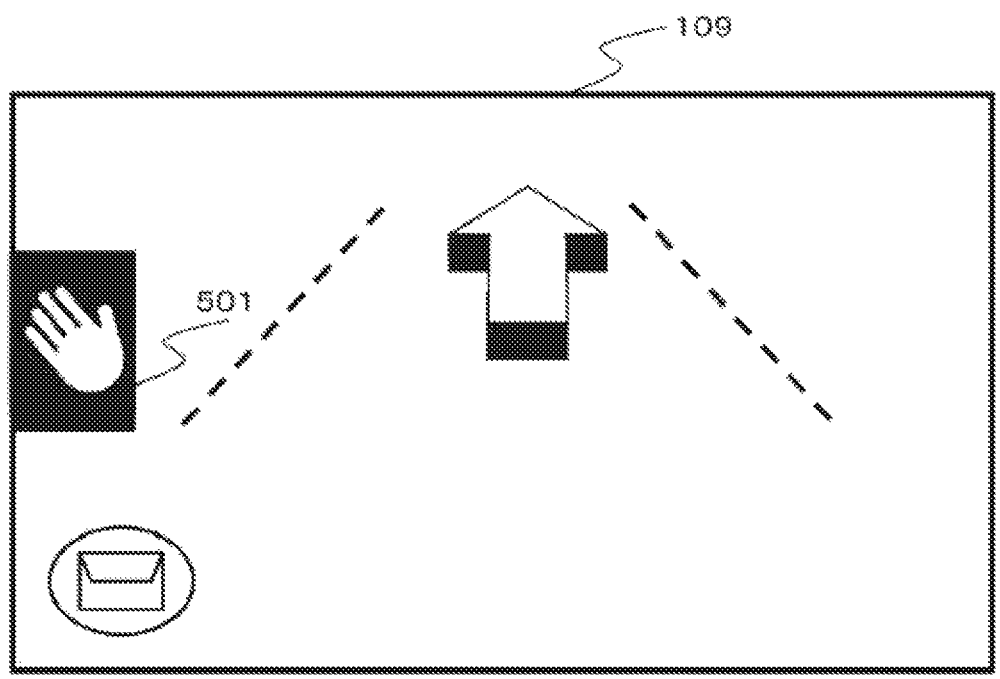
FIG. 5(a) shows a display example of an external display unit.

When no such gesture operation is detected, the messenger application 113 continues to output the voice information so that the unread messages are read in order from the oldest message (S307), and, when the reading of the latest message is finished, enters a reply operation standby state while causing the display unit 108 and the external display unit 109 to continue displaying the last sender as shown in FIG. 4(*d*) (S309). In the reply operation standby state, the messenger application 113 displays an icon 501, which indicates that a gesture-based reply operation can be performed, on the external display unit 109 as shown in FIG. 5(a).

When a given length of time (for instance, 0.5 seconds) has elapsed in a state where the user's hand is placed in the region 202 of FIG. 2(a) (S310: Yes), it is determined that, the conditions for starting the operation have been satisfied, and the external display unit 109 switches its screen such that the menu as the operation guide of the reply operation will be displayed in a manner of sliding from the right side of the screen, and a sound effect to notify the appearance of the menu is also output (S311). Note that, when the user's hand is detected in the region 202, the messenger application 113 may also output a sound effect for allowing the user to aurally recognize such detection, and move the icon 501 to the right side or change the color of the icon as shown in FIG. 5(b) for allowing the user to also visually recognize such detection. Moreover, when the user's hand is defected in the region 201 and not in the region 202 and a given length of time (for instance, 0.3 seconds) has elapsed, the messenger application 113 outputs a sound effect to notify the user that the hand placement position is erroneous. Upon placing one's hand, the user can perform hand placement operations while looking ahead without having to shift one's line of sight to his/her hand.

FIG. 2(b) and FIG. 2(c) are diagrams showing in detail the relation of the detection state of the user's hand and the output of sound effects. FIG. 2(b) and FIG. 2(c) respectively represent the time axis and the sensor value of the sensing unit 103, and show the boundary for determining whether the sensor value falls within the region 201 or the region 202.

FIG. 2(b) shows an example where the user stretches one's hand toward the region 202, and places one's hand in the region 202 for a given length of time. When the gesture detection unit 104 detects that the user's hand entered the region 201, the gesture detection unit 104 outputs a sound effect 1. Next, when the gesture detection unit 104 detects that the user's hand entered the region 202, the gesture detection unit 104 outputs a sound effect 2. When the gesture detection unit 104 continues to detect that the user's hand is in the region 202 for a time T1 or longer (for instance, for 0.6 seconds or longer), the gesture detection unit 104 outputs a sound effect 3, and switches the screen of the external display unit 109 as explained with reference to S311.

FIG. 2(c) shows an example where the user continues to place one's hand in the reason 201. The gesture detection unit 104 outputs the sound effect 1 upon detecting that the user's hand entered the region 201, and outputs a sound effect 4 upon detecting that the user's hand is in the region 201 for a time 12 or longer (for instance, for 0.3 seconds or longer). If the user's hand is subsequently detected in the region 202, the same process as the example of FIG. 2(b) is performed in the ensuing explanation, the operation of placing one's hand in the region 202 for the time T1 or longer is sometimes simply referred to as "hand placement".

Figure 5C:
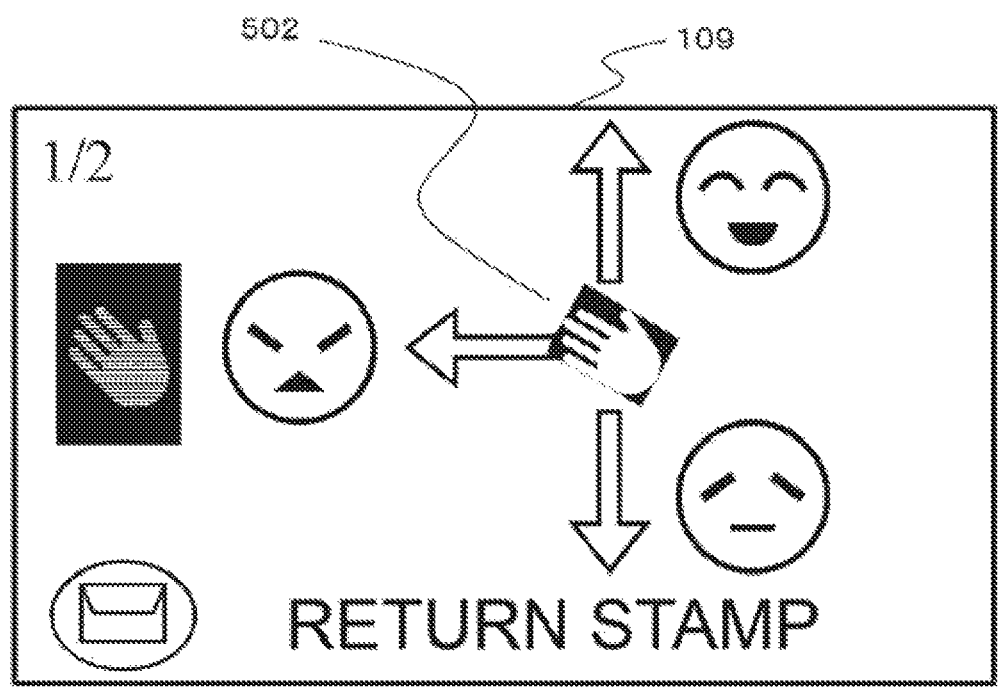
FIG. 5(c) shows a display example of an external display unit.

FIG. 5(c) shows an example of a case where an operation menu, which enables the user to perform a stamp reply, is displayed. The icon 502 is an operation guide which means that, when the user performs a gesture in the upward, leftward or downward direction while placing one's hand over the icon 502, the corresponding stamp can be selected. Moreover, the display of ½ at the upper left corner refers to the total number of pages of the displayed stamp candidates, and the current page. When a gesture in the upward, leftward or downward direction is detected in this state (S312: Yes), the messenger application 113 selects the stamp corresponding to that direction and sends a reply (S313), and then once again makes a transition to the reply operation standby state S309.

Figure 5D:
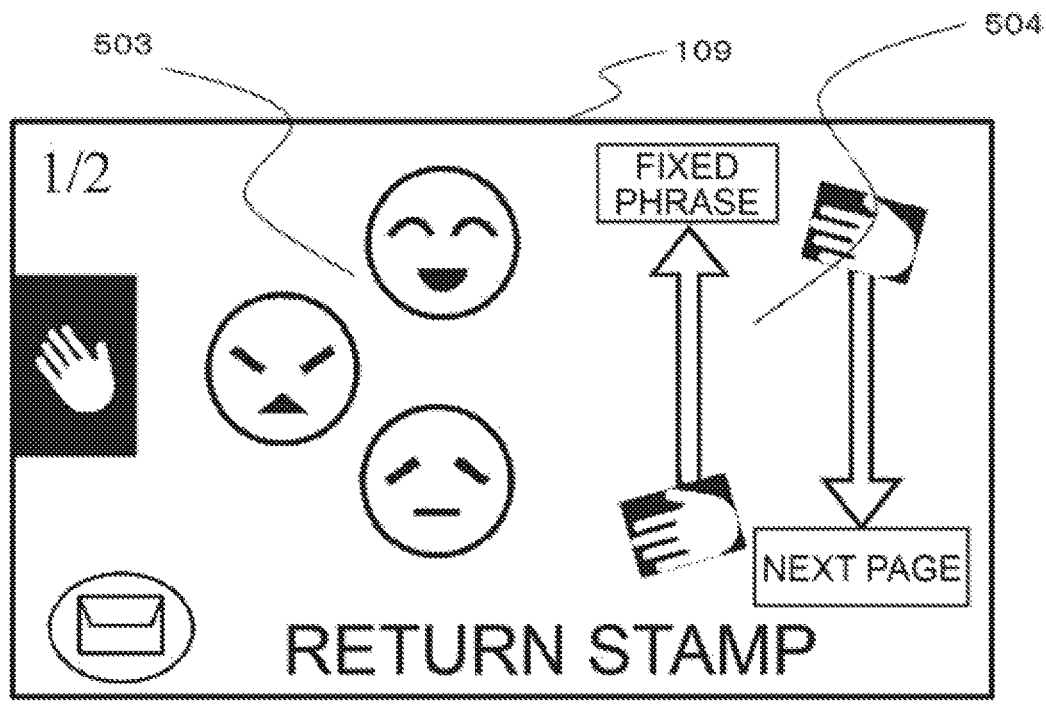
FIG. 5(d) shows a display example of an external display unit.

When no gesture detected and the user's hand leaves the region 202 (S312: No. S314: Yes), the displayed contents of the external display unit 109 are switched to the displayed contents shown in FIG. 5(d) (S315). The icon 503 represents the stamp candidates that can currently be selected. The icon 504 represents that the corresponding operation will be performed when the gesture operation corresponding to the displayed direction (upward hand waving or downward hand waving) is performed. Moreover, the display of "fixed phrase" means switching the reply method to a fixed phrase reply, and the display of "next page" means switching the stamp candidates from those displayed with the icon 503 to the next candidate group. If numerous options are displayed at once, the user will spend too much time selecting the option despite the user driving a vehicle, and may lead to the user's lack of concentration in driving the vehicle. Thus, in the first embodiment, only the 3 options positioned at the top, left and bottom are provided, and, by providing gestures for increasing the options of the stamp to be sent more than 3 options can be provided to the user. When a corresponding gesture operation is detected (S316: Yes), a corresponding operation is executed (S317). When a gesture is not detected (S316: No) and the placement of the user's hand in the region 202 is detected (S318: Yes), the messenger application 113 makes a transition to the state of S311, and once again enters the stamp selection state.

When the user's hand is not detected and a given period of time (for instance, 10 seconds) elapses in that state (S318: No, S319: Yes), the messenger application 113 erases the operation guide from the screen of the external display unit 109, and makes a transition to the reply operation standby state of S309 (S320). When a reply is sent, as shown in FIG. 8, the messenger application 113 displays the contents of the reply operation result (selected stamp in this example) on the display unit 108, displays the name of the user who sent the reply on the external display unit 109, and reads the reply message.

Note that, this operation flow is an explanation of a representative example of the operation of the in-vehicle device 101 of the present invention, and the operation, display, and sound effect are not limited to this example. For example, while the foregoing explanation was provided by assuming the sending of a reply when using the messenger application 113, the present invention is not limited thereto, and can be applied to the overall operation of the in-vehicle device control unit 102 of selecting a plurality of options. FIG. 3(b) shows a simplified version of the operation flow. The basic operation is as explained above, and, while the explanation of the operation in each step is the same as those with the same step number of FIG. 3(a), S316 of FIG. 3(b) does not have to be limited to vertical hand waving, and may also accept various operations, such as the operation using a steering switch.

Moreover, when a message is received from the outside, the configuration may also be such that the message is read at the same time that the message is received, or the contents of the received message may be displayed on the external display unit 109. Consequently, it will be easier for the user to comprehend the message. Moreover, the configuration may also be such that the reply operation standby can be accepted at any time without waiting for the reading of the latest message to be finished. Consequently, the user may send a reply at any time. Moreover, with regard to the region 202 where the user's hand is to be placed, the configuration may be such that the tactile sensation is presented in midair in such region by the tactile IF unit 112.

For example, the configuration may be such that the pressure points of an ultrasonic device array appear on the boundary of the areas, or a tactile sensation is given on the vertical line of the region using an air blower. Consequently, the user can place one's hand in the region while looking straight ahead, and can send a reply safely even though such operation is performed while driving. Moreover, while the transition is made to the stamp reply operation after the user's hand placement is detected in this example, the configuration may also be such that the transition is made to the reply method selection state (stamp, fixed phrase, free speech or the like) before the foregoing transition. Consequently, the user can select one's preferred reply method at the time that the reply operation is started.

Moreover, while the user's gesture is accepted after the user's hand placement is detected and the operation guide is displayed on the external display unit 109 in this example, the user's gesture may also be accepted from a given length of time before (for instance, 0.2 seconds before) displaying the operation guide. Consequently, once the user becomes familiar with the operation and learns which gesture corresponds to which operation, the operation can be performed without having to display unnecessary screens on the external display unit 109, and the operation time can also be shortened.

Moreover, in S319, while the lapse of a given length of time was measured, the configuration may also be such that the process proceeds to S320 upon detecting a predetermined operation (for instance, hand waving motion in the left direction, switch operation, or the like) prior to satisfying the foregoing condition. Consequently, the user can switch the display of the external display unit 109 to a navigation screen at one's desired timing.

Figure 7A:
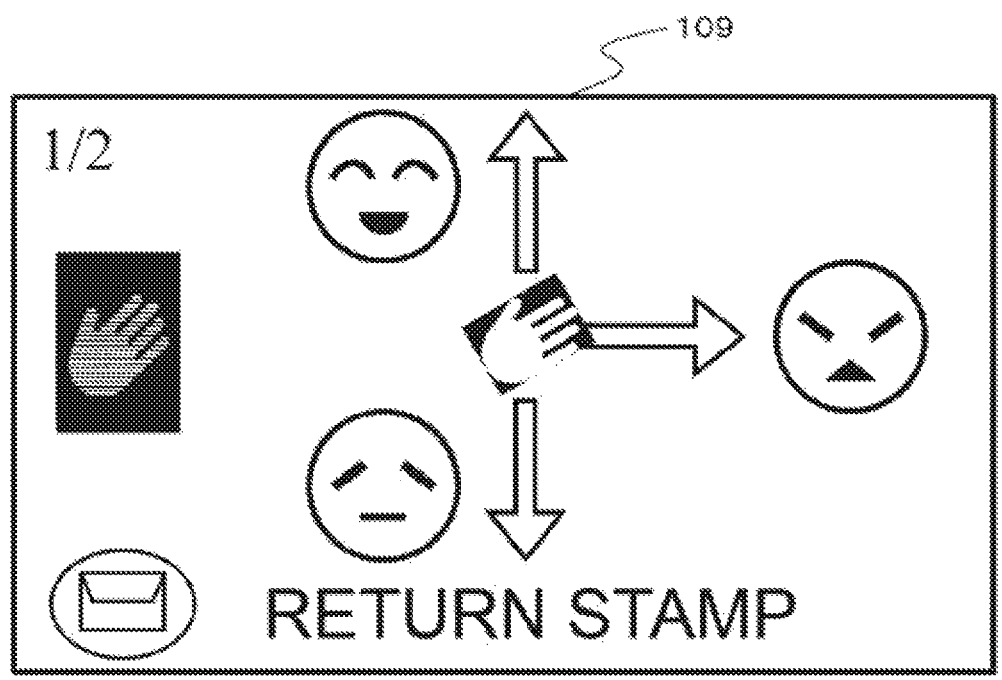
FIG. 7(b) shows a display example of an external display unit.
Figure 7B:
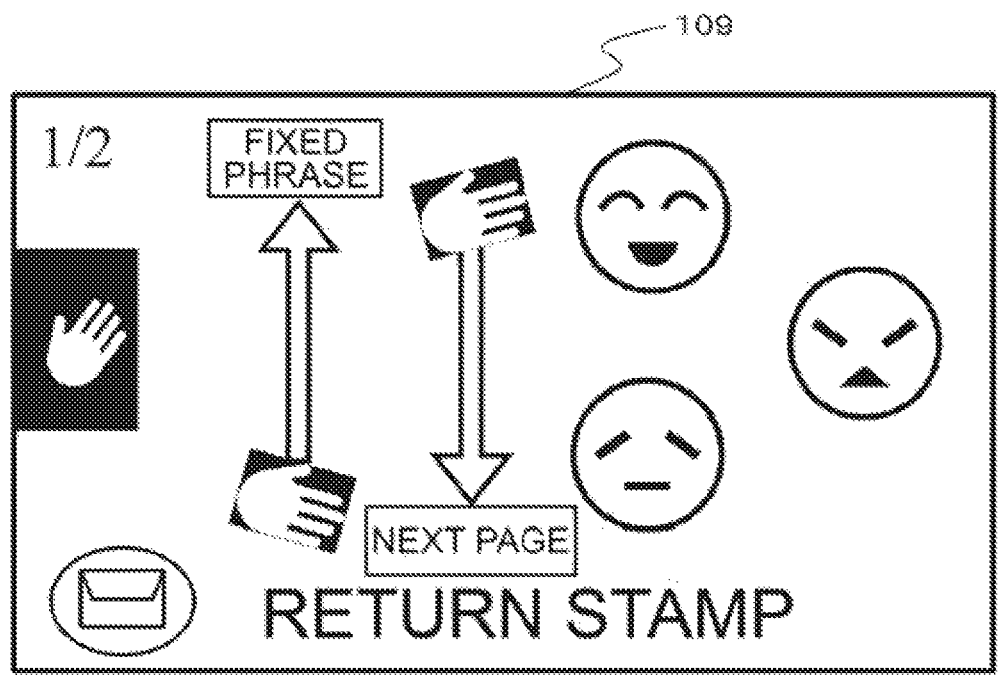

Moreover, the operation guide displayed on the external display unit 109 and the gesture direction are not limited to 3 directions, and arbitrary directions and number of directions may be used. Here, directions in which the gesture operation can be easily performed white sitting in the driver's seat may be set. For example, if the user's gesture is made in the direction of the steering wheel, the user's hand may hit the steering wheel while driving the vehicle and, therefore, a gesture in such direction is excluded as an option. Thus, the configuration may be such that whether the steering wheel of the vehicle to be driven is a right-side steering wheel or a left-side steering wheel can be set in advance using the setting screen and, when the steering wheel is a left-side steering wheel the operation guide displayed on the external display unit 109 indicates the 3 directions of upward, downward and rightward as shown in FIG. 7(*a*) and FIG. 7(*b*). Note that FIG. 7(*a*) and FIG. 7(*b*) correspond to FIG. 5(*c*) and FIG. 5(*d*), respectively.

Moreover, because the hand to be used for the gesture will change depending on the location where the steering wheel is mounted, the display and direction of the icons are also changed. Furthermore, because the visibility of the various icons will change depending on the position of the steering wheel, the use may also individually change the setting. Consequently, the user can perform operations based on gestures that, can be easily performed according to the steering wheel installation position for each vehicle model, and the user can effortlessly perform various operations based on gestures while sitting in the driver's seat.

Moreover, the configuration may also be such that the placement of the user's hand can be performed at a plurality of locations, without liming the hand placement position to one location as in this example. For example, as shown in FIG. 8(*a*), three sensors are installed at three locations. Here, the reply method may be decided depending on which sensor defected the user's hand placement. As shown in FIG. 8(*b*) a stamp reply is sent when the sensor 103A detects the user's hand placement a fixed phrase reply is sent when the sensor 103B detects the user's hand placement, and a free speech reply is sent when the sensor 103C detects the user's hand placement. Consequently, the user can quickly select the reply method and perform the reply operation. The user may also designate in advance which sensor corresponds to which method.

Moreover, the configuration may also be such that a camera is used for the sensing unit 103 as shown in FIG. 9 to detect the approach and gesture of the user's hand. The images of predetermined hand shapes are learned in advance, and the user's hand placement is detected from the pattern recognition of the learned data, irrespective of the distance and position of the user's hand. Here, a plurality of hand shapes may be detected during the user's hand placement (901A to 903C), and the reply method may thereby be selected. Consequently, the user will be able to start the reply operation by reaching out one's hand in front of the sensing unit 103 without having to perform any gesture operation.

Figure 10A:
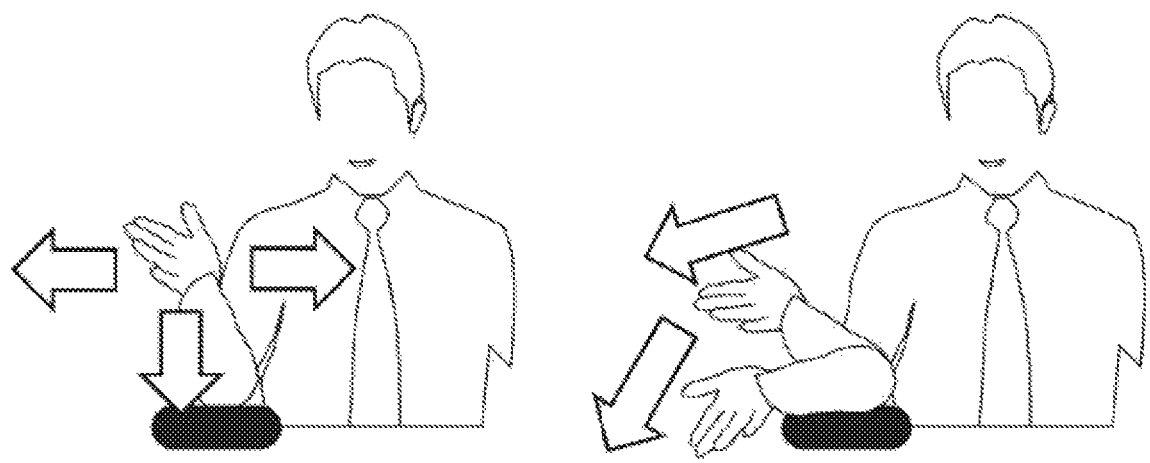
FIG. 10(a) shows examples of the manner of waving a user's hand.
Figure 10B:
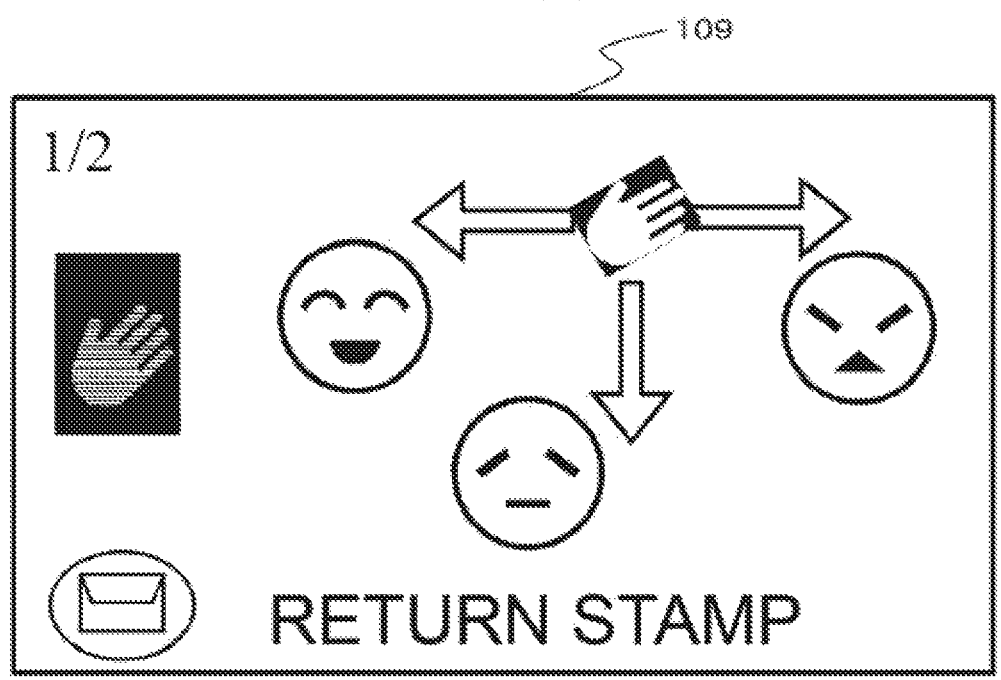
FIG. 10(b) shows a display example of an external display unit.

Furthermore, the configuration may also be such that the direction and number of gestures to be accepted are changed according to the position and posture of the user's hand upon detecting the users hand placement. For example, as shown in FIG. 10(*a*), in a state where the user's placing one's elbow on an elbow rest and raising one's hand, when the user's hand placement is detected, gestures in the leftward, downward and rightward directions are recognized as shown in FIG. 10(*b*). This is because, in the user's posture described above, it would be difficult for the user to make a gesture in the upward direction and, therefore, gestures in the 3 directions of leftward, downward and rightward are recognized. Furthermore, the configuration may also be such that the user can set in advance which gestures am to be recognized. Consequently, the user can perform gesture operations based on unrestricted postures.

Figure 11A:
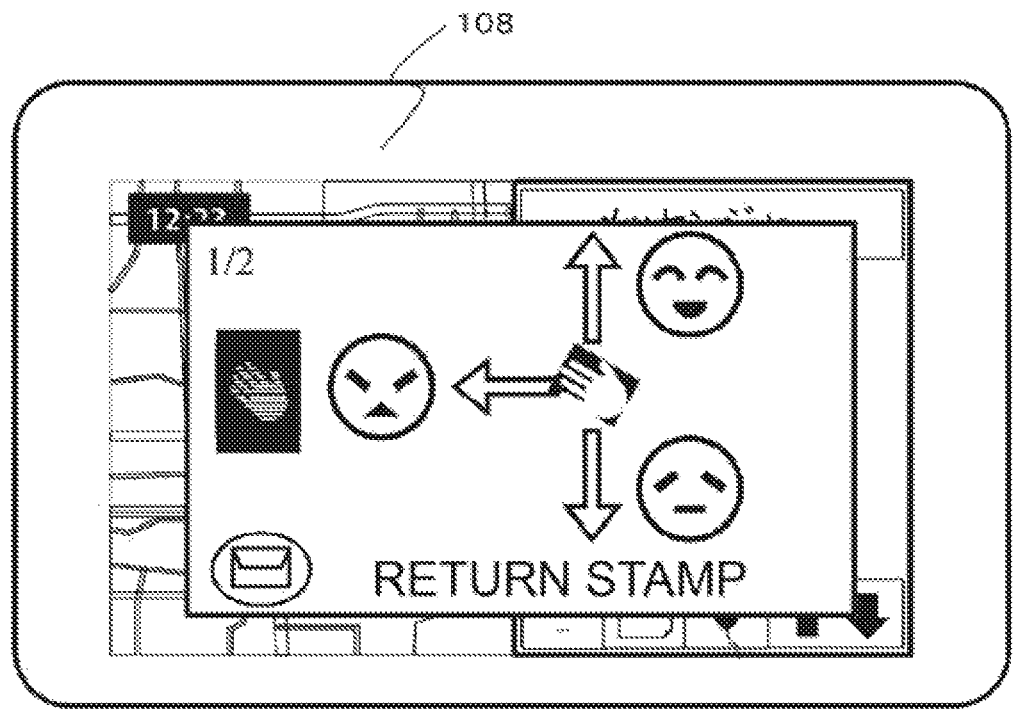
FIG. 11(a) shows a display example of a display unit.

Moreover, while the operation menu of the reply operation is displayed on the external display unit 109 in this example, the configuration may also be such that the location of display and the displayed contents are changed according to the connection status or the installation position of the various devices. For example, when the HUD is not connected, the gesture operation guide is displayed at the center of the screen as shown in FIG. 11(*a*). Here, as shown in FIG. 11(*b*), the processing of managing the installation position and the connection status of a plurality of displays and deciding the priority is performed. While the basic rule is to display the operation guide on the display with the highest priority, in cases where the HUD cannot be used due to a malfunction or other reasons, the operation guide is displayed on the display of the next highest priority. Here, the time of displaying the guide may be shortened or the amount of information to be displayed may be reduced according to the priority. The priority may be set based on various methods; for instance, the priority may be set at the time of factory shipment or time of sales, set by the user with a setting semen (not shown), or programmed in the in-vehicle terminal so that the priority is determined from the characteristics of the display that is connected to the in-vehicle terminal.

Furthermore, when a carry-in external device (smartphone or the like) is connected to the in-vehicle device 101 as shown in FIG. 11(c), the configuration may also be such that the priority is increased according to the installation position. Consequently, when a device such as the HUD to display the operation guide cannot be used, the operation guide can be displayed on a substitute device to enable the user to perform operations.

Figure 3B:
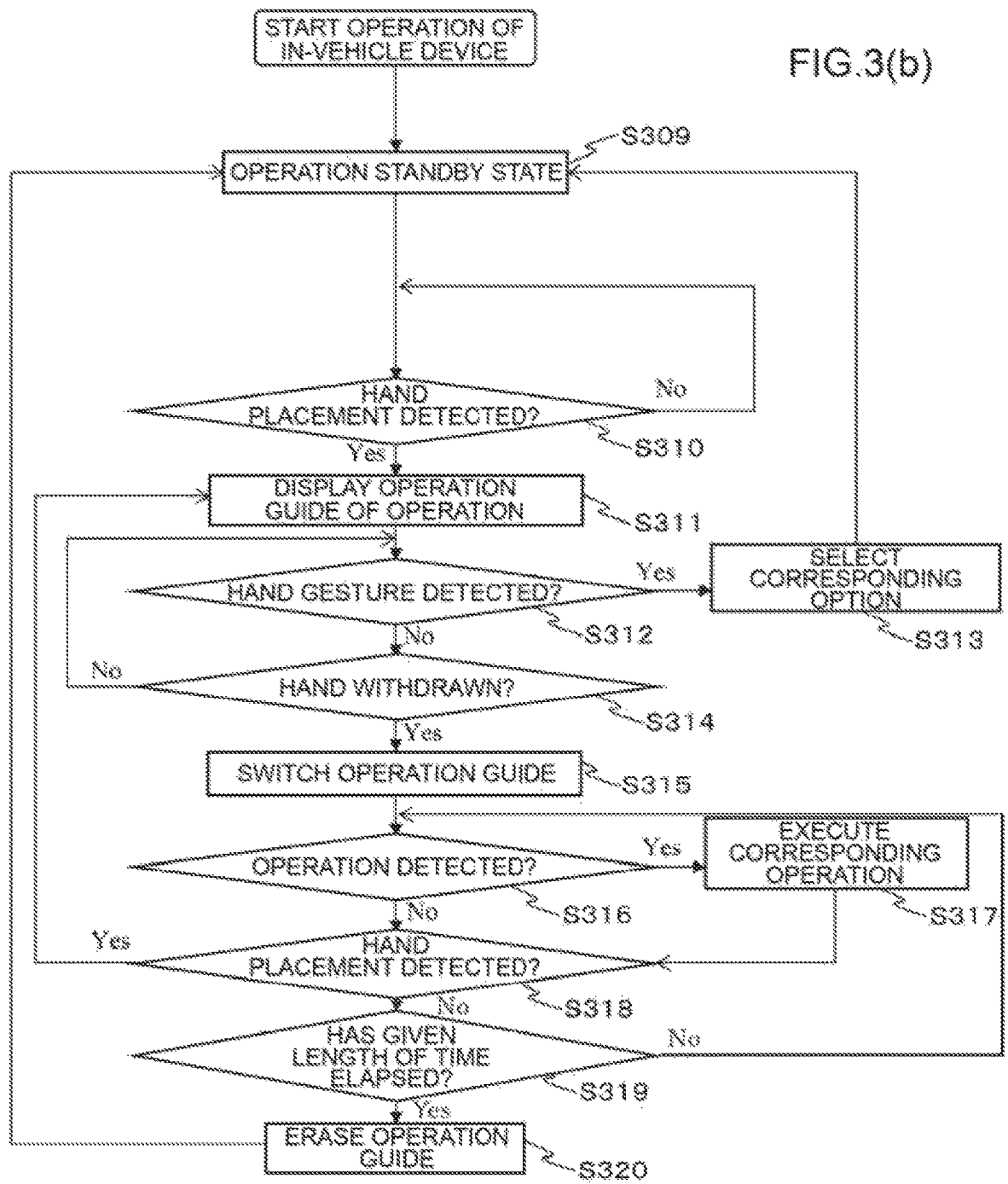
FIG. 3(b) shows an example of an operation flow in the first embodiment.
Figure 12A:
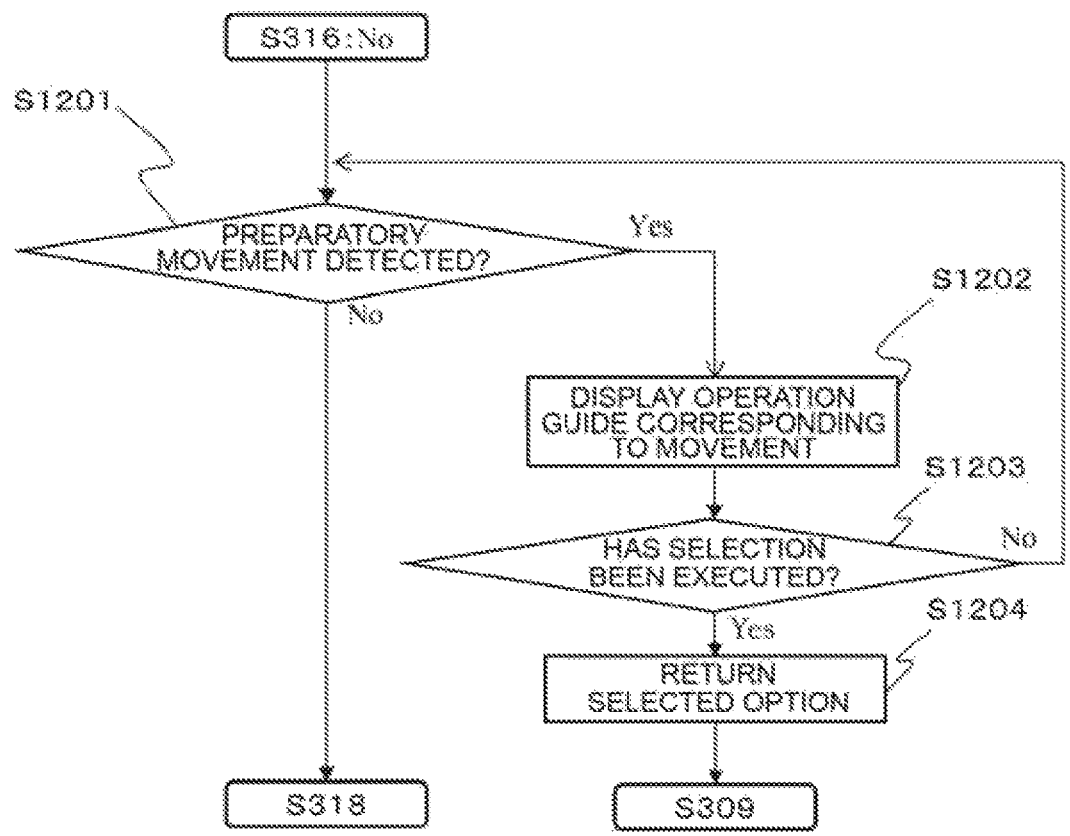
FIG. 12(a) shows an example of an operation flow.
Figure 12B:
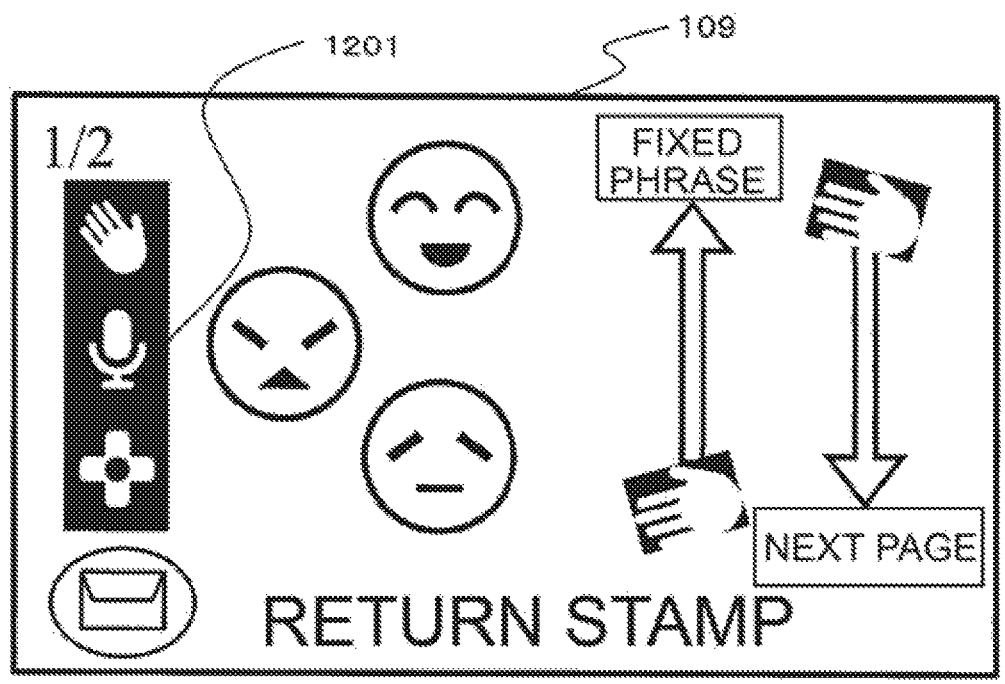
FIG. 12(b) shows a display example of an external display unit.

Moreover, in the reply operation of S311 onward in FIG. 3(a) or FIG. 3(b), the configuration may also be such that other operation means (voice recognition operation, switch operation or the like) capable of operating the in-vehicle device 101 may also be used without limitation to the gesture operation. FIG. 12(a) shows the operation flow in the foregoing case. After the step of S318, when a preparatory movement of the user attempting to perform certain operation means is detected (S1201: Yes), the operation guide corresponding to such operation is displayed on the external display unit 109 (S1202). Subsequently, when the selected operations executed (S1203: Yes), a reply based on the selected option is performed (S1204). Specifically, upon making a transition to the state of S315, the operation guide as shown in FIG. 12(b) is displayed on the external display unit 108. An icon 1201 shows that the upper icon can be used for selecting the option of gesture, the middle icon can be used for selecting the option of voice recognition, and the lower icon can be used for selecting the option of switch, respectively.

Figure 12C:
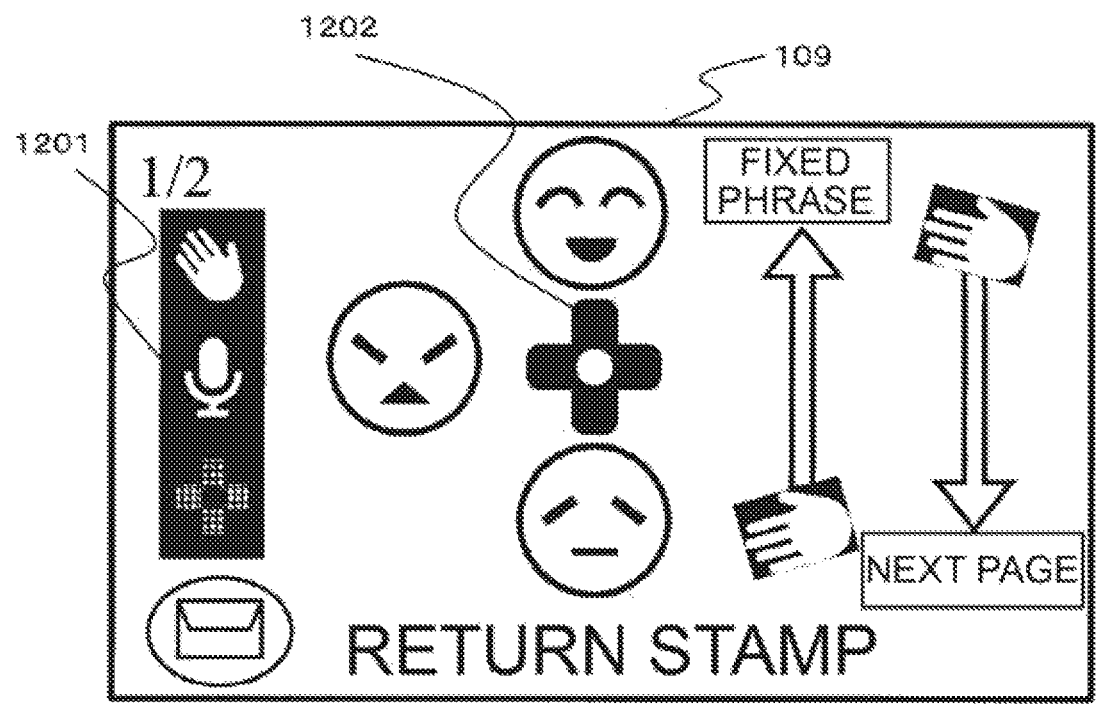
FIG. 12(c) shows a display example of an external display unit.

When it is detected that the user will perform a steering controller operation (for instance, an arbitrary button of the steering switch is pressed once, or a contact sensor is mounted on the switch surface and a response thereof is obtained), the display switches to the screen as shown in FIG. 12(c). The icon 1201 notifies the user that the steering controller operation is active by changing the color of the icon. The display 1202 shows the candidates of stamps corresponding to the respective buttons of the steering controller. A reply operation based on the corresponding stamp is performed according to the pressed button of the steering controller. Note that the display returns to the screen of FIG. 12(b) when a given length of time elapses, or the contact sensor of the steering controller is no longer responding.

Figure 12D:
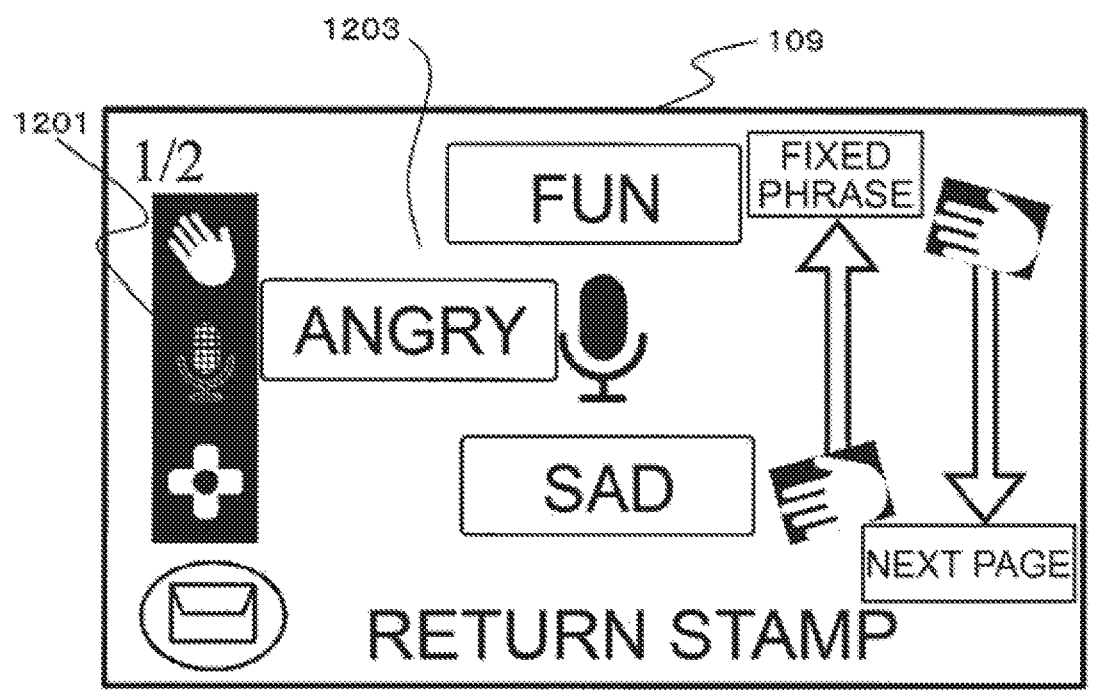
FIG. 12(d) shows a display example of an external display unit.

Meanwhile, when it is detected that the user will perform voice recognition (for instance, a voice recognition start switch is pressed), the display switches to the screen as shown in FIG. 12(d). The icon 1201 shows that the voice recognition is in a standby state, and the display 1203 shows that, by speaking words corresponding to the respective messages, the corresponding stamp can be selected. When the result of voice recognition coincides with one of the options, a reply operation of the corresponding stamp is performed. In the example of FIG. 12(d), while only messages such as "I'm having fun" corresponding to the icon are displayed, the icon to be sent may also be displayed alongside the message so that user can know, at a glance, which icon will be sent. When voice recognition is used, because the user can select the stamp to be sent without removing one's hand from the steering wheel this will further contribute to safe driving.

Note that the three types of operation means can be switched even midway during their operations if a start trigger of the respective operations is detected. Moreover, in an operation state based on switch operation and voice recognition, a gesture operation based on a vertical hand waving in such state is also accepted. Consequently, when the user is to send a reply, the user is not limited to a single operation means, and may freely select the operation means for performing the reply operation according to the driving status, or according to the user's preference. Moreover, upon switching the respective operation means, by presenting to the user which operation means is currently operable and how to perform such operation, the user can quickly perform the operation intuitively without any hesitation.

Figure 12E:
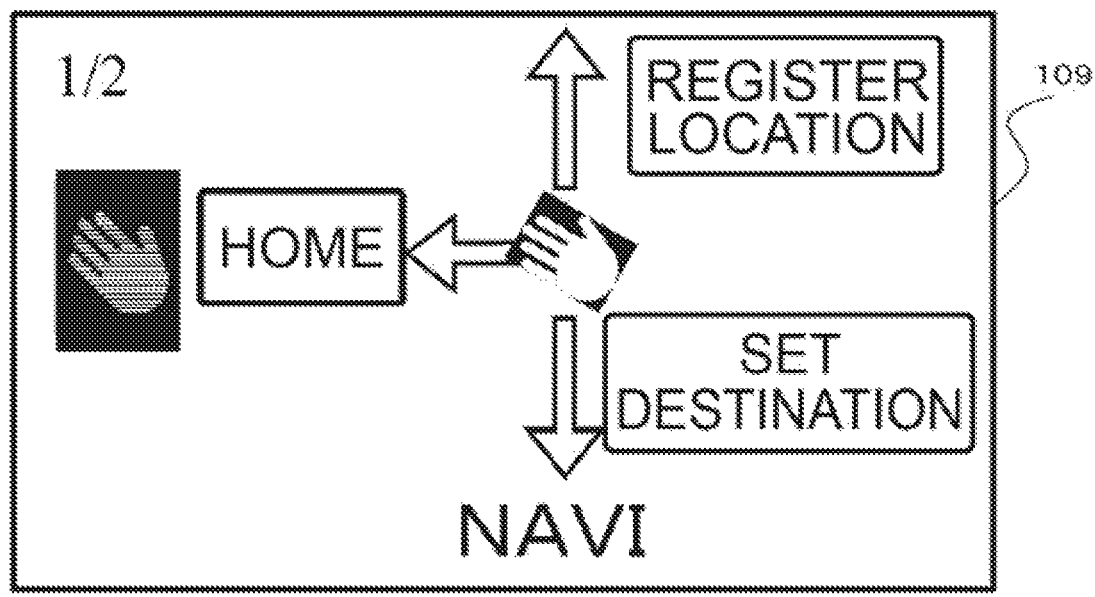
FIG. 12(e) shows a display example of an external display unit.
Figure 12F:
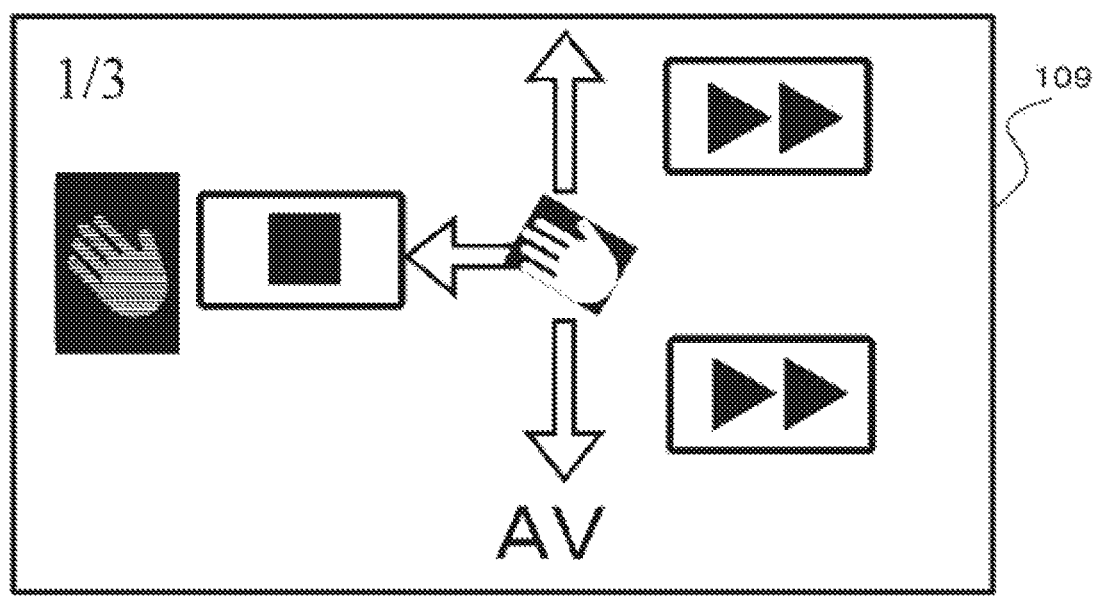
FIG. 12(f) shows a display example of an external display unit.

Moreover, the configuration may also be such that the operation contents that can be pet-formed when the user places one's hand are changed according to the operation status of the application being controlled by the in-vehicle device 101. FIG. 12(e) shows an example of presenting, as navigation-related operations as the available choices, the route setting to the user's home, registration of the current location, and voice-based setting of the destination, when the application running in the background is only a navigation application FIG. 12(f) shows an example of presenting, as available choices, the operation of stopping the music, skipping to the next song, or skipping to the previous song when the user places one's hand during music playback. FIG. 12(g) shows an example of presenting, as available choices, the operation of listening to the details of traffic jam information, rerouting to the destination, or changing the destination when the user places one's hand upon receiving traffic jam information or the like. Consequently, the user can quickly select various operations according to the status of application being controlled by the in-vehicle device 101 while the user is driving the vehicle.

Based on the in-vehicle device 101 according to the first embodiment of the present invention described above, the user can, intuitively and quickly, perform operations while looking straight ahead even while diving the vehicle. Specifically, the user can quickly switch the display of the messenger application and perform the operation of skipping message while looking straight ahead. Moreover, in cases of operations of selecting a plurality of options, the user can select one's intended option while looking straight ahead and confirming the contents of the available choices. Furthermore, once the user becomes familiar with the operations, the user will be able to select the options without having to view the display, and the user will be able to perform operations more safely and quickly.

Second Embodiment

<<Explanation of Configurations>>

Figure 13:
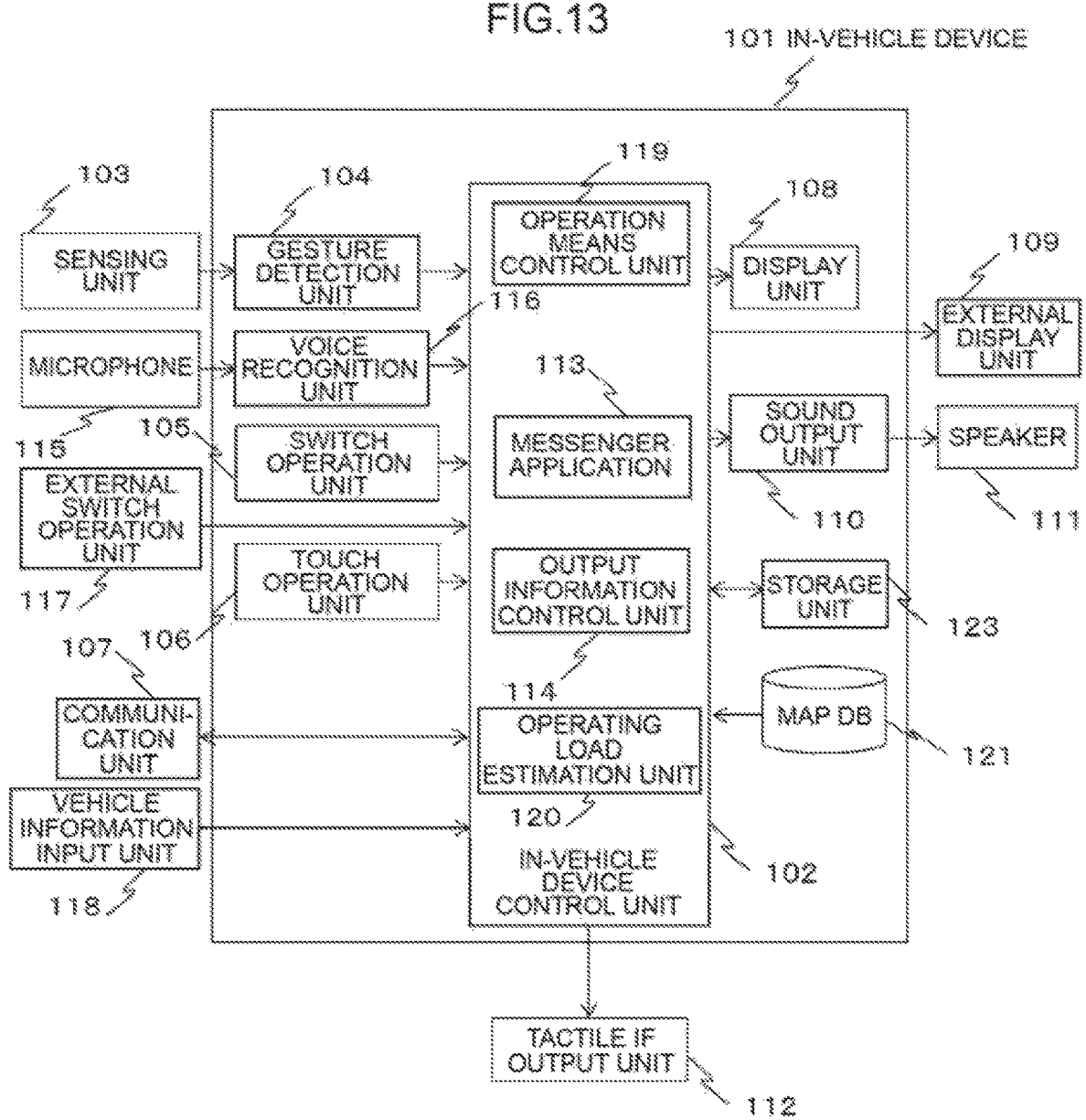
FIG. 13 shows a configuration diagram of an in-vehicle device in the second embodiment.

FIG. 13 is a configuration diagram of the in-vehicle device 101 in this embodiment. In comparison to the configuration diagram of FIG. 1, a vehicle information input unit 118, an operation means control unit 119, a driving load estimation unit 120, and a map DB (database) 121 have been added. The vehicle information input unit 118, the operation means control unit 119, and the driving load estimation unit 120 exhibit the functions as the vehicle information input unit 118, the operation means control unit 119, and the driving load estimation unit 120 as a result of the in-vehicle device control unit 102 performing operations according to the programs stored in the storage unit 123.

The vehicle information input unit 118 is the part that acquires information related to the vehicle that is being driven, and, for instance, is connected to the vehicle via a CAN (Control Area Network), and acquires information related to vehicle speed, accelerator position, brake position, turn signal, and steering angle.

The operation means control unit 119 controls to which operation the operation input from the gesture detection unit 104 or the voice recognition unit 118, or the various switch operation units should be reflected.

The driving load estimation unit 120 estimates the user's driving load in the driving operation. For example, in addition to the various input signals from the vehicle information input unit 118 described above, the driving load estimation unit 120 integrates information input from the communication unit 107 (map information, type of road that the vehicle is traveling on, distance to preceding vehicle, and so on), and defines the driving load level as four stages (None, Low, Medium, High). "None" is a state where the vehicle is wasting at a traffic light or the vehicle is on autopilot and being driven based on ACC (Adaptive Cruise Control) or the like where the driver is not required to perform any special operation, "Low" is a state where the vehicle is being driven on a straight road with no obstacles in the periphery, "Medium" is a state where the vehicle is being driven at a certain speed or faster and a steering wheel operation is constantly required, or a state of making a turn at an intersection, and "High" is a state where the user is required to perform an important driving operation to avoid an accident.

The map DB 121 is a database which stores map information.

<<Explanation of Operation>>

The operation of the in-vehicle device 101 of the second embodiment is now explained in detail. The basic operation is the same as the operation explained in the first embodiment, but the second embodiment is unique in that the operation is controlled according to the output of the driving load estimation unit 120. The in-vehicle device control unit 102 has defined in advance the driving load level output from the driving load estimation unit 120 and the displayed contents that can be presented as the operation means that can be operated at the respective driving load levels. FIG. 14(a) to FIG. 14(d) show the foregoing definitions.

FIG. 14(a) shows whether or not the respective operation means can be used in the respective driving load levels. When the driving load level is "None" or "Low", all operation means described in the first embodiment can be used for sending a reply. Meanwhile, when the driving load level is "High", all operations are prohibited. When the driving load is "Medium", the display of the hand placement operation guide and the subsequent selection of options based on a gesture operation are prohibited. Because a hand placement, operation is an operation means that forces the user to perform one-handed driving, this operation is prohibited in circumstances where the user should concentrate on the driving operation.

Figure 15A:
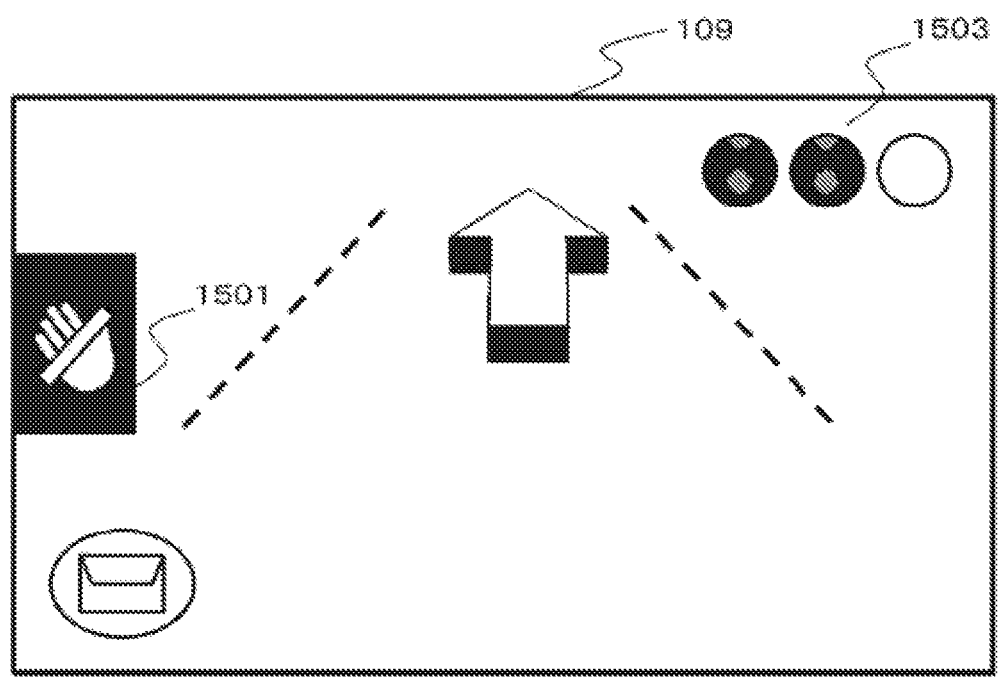
FIG. 15(a) shows a display example of an external display unit.

The external display unit 109 of the second embodiment displays the current driving load level as shown with the icon 1503 of FIG. 15(a). FIG. 15(a) shows that the driving load level is "Medium", and a display showing that the hand placement operation is prohibited, as shown with the icon 1501, is indicated to notify the user that an operation using one's hand cannot be performed. Moreover, then the user's hand placement is detected in this state, the display or color of the icon 1501 is changed, and a warning sound or warning message is output, to emphases the fact that no hand placement operation may be performed, and to urge the user to immediately stop his/her hand placement. By performing the foregoing control the user can comprehend the current driving load status, and it is possible to prevent, as much as possible, the user from removing one's hand from the steering wheel for a long time as a result of attempting to display the operation guide even though the user is required to perform the steering wheel operation. Meanwhile, free speech reply based on voice recognition that does not require the use of a hand and a direct gesture that can be completed with an instant operation can be used even when the driving load level is "Medium".

Figure 15B:
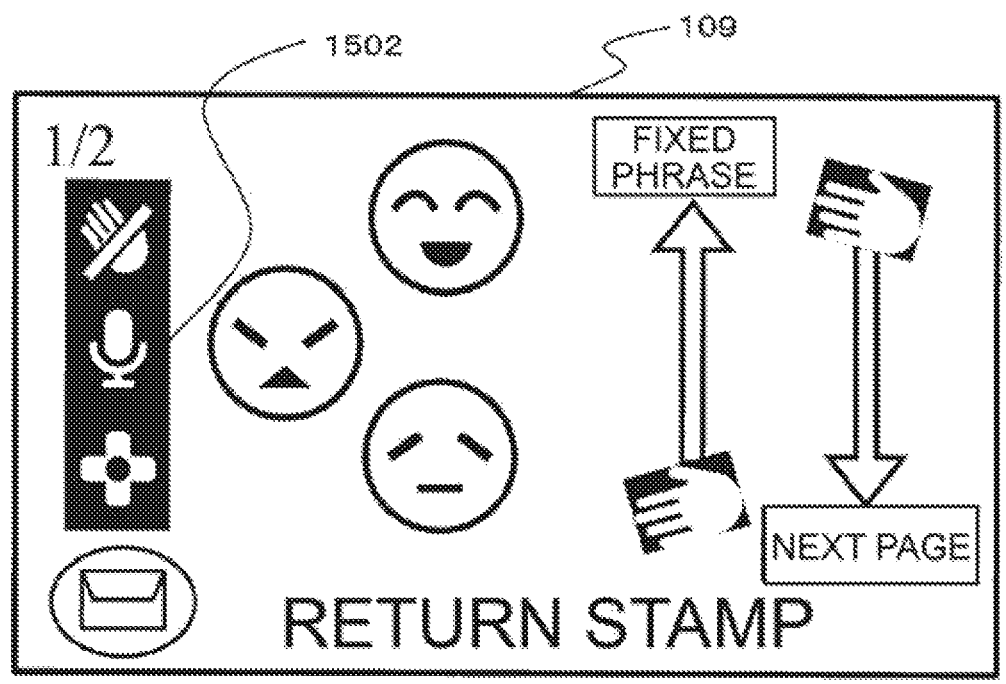
FIG. 15(b) shows a display example of an external display unit.

Furthermore, in cases where the reply operation after the user's hand placement in a state where the driving load level is "None" or "Low" is still being performed, if the driving load level switches to "Medium", the selected operation of options based on switch operation and voice recognition is permitted only for the foregoing reply operation that is still being performed. Here, FIG. 15(b) shows that, among the icons of the three types of operation means, the selected operation based on hand placement and gesture is prohibited.

FIG. 14(b) shows the definitions related to the driving load level and the output contents of the center display. Foremost, when the driving load level is "None", the messenger application 113 displays the entire text of the message. Moreover, when the user is sending a reply based on basic operations such as touching the operation icon on the screen, all options such as the stamp candidates are also displayed. When the driving load is "Low" or "Medium", the text of the message is not displayed, and only the name of the sender of the message is displayed. Moreover, the operation system using a touch operation is also not displayed.

Figure 16A:
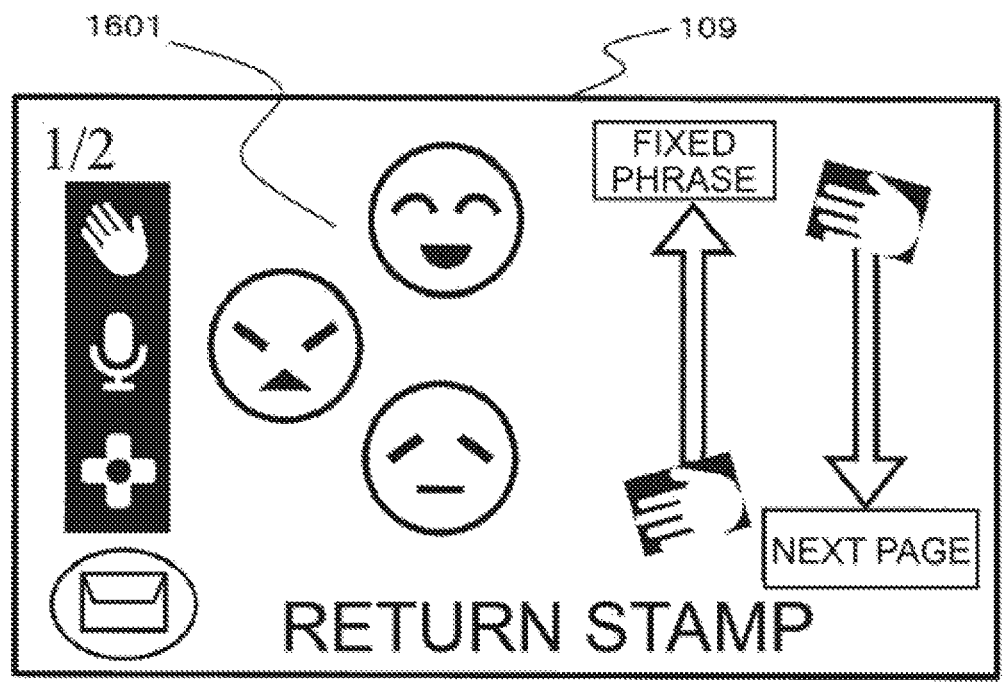
FIG. 16(a) shows a display example of a display unit.
Figure 16B:
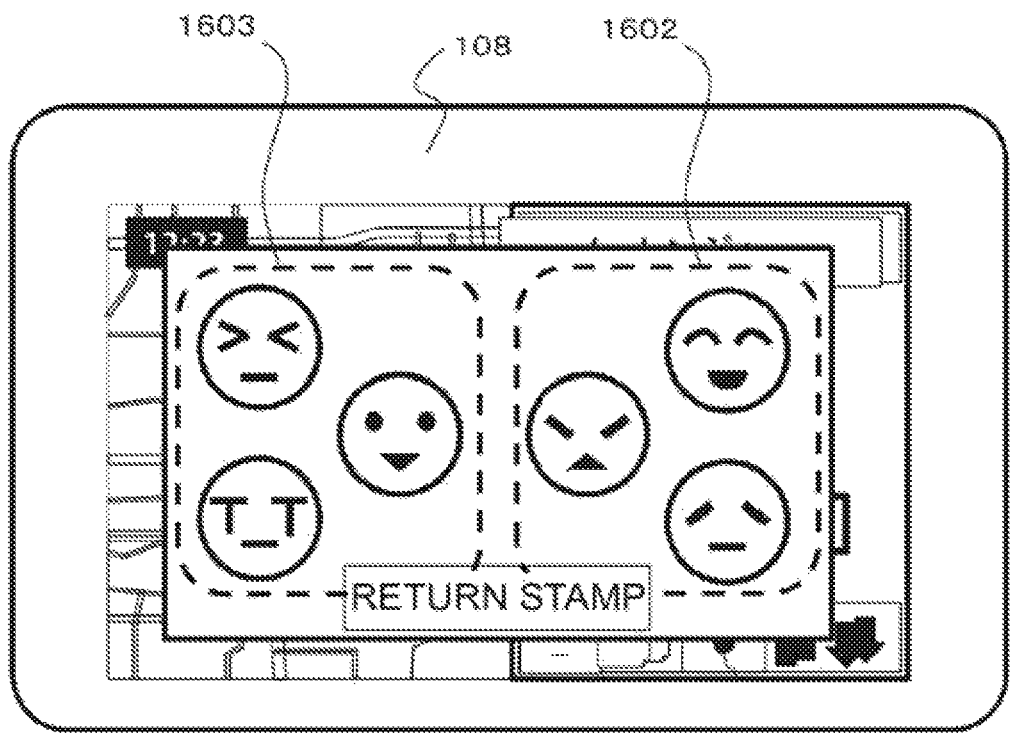
FIG. 16(b) shows a display example of an external display unit.

Furthermore, when the driving load is "High", the screen of the messenger application 113 is also turned off and a warning message corresponding to the situation (for instance, "Keep distance") is displayed. Note that, in cases where the driving load is "Low" or "Medium" and the user is sending a reply based on hand placement, if the driving load level switches to "None" midway during the foregoing operation, the user may also perform such operation based on a touch operation on the center display in consideration of the status of the operation guide displayed on the HUD. For example, as shown in FIG. 16(a), in a state where the user is performing a stamp reply on the HUD, information of the contents and arrangement of the stamp candidates is maintained and additionally displayed on the center display as shown in FIG. 16(b).

Specifically, in a state where the contents of the stamp candidates 1601 and the arrangement thereof on the screen of the HUD are maintained, the stamp candidates are displayed on the center display as shown with reference numeral 1602. Furthermore, the contents of 1602 are arranged on the driver's side so that it would be easier for the driver to perform operations, and select the stamp to be sent based on a touch operation. Moreover, the remaining stamp candidates are arranged on the screen at a position that is far from the driver's side as shown with 1803. Contrarily, in cases where the user is performing operations on the center display while the vehicle is stopped, if the driving load switches to "Low" or "Medium" as a result of the user starting the vehicle, the display of options and the selected operation on the center display are discontinued, and, while maintaining the reply method that was still being operated, the process proceeds to the step of S315 of FIG. 3(a), and the operation is succeeded as is.

FIG. 14(c) shows the definitions related to the driving load level and the output contents of the HUD. Foremost, when the driving load level is "None" or "Low", the name of the sender is displayed when the message is being read, and the operation guide when sending a reply is displayed. When the driving load level is "Medium", a message to the effect that a hand placement operation is prohibited is displayed, or the screen of the operation is maintained and displayed only when the driving load level changes from "Low" to "Medium". When the driving load level is "High", a warning message corresponding to the situation (for instance, "Keep distance!") is displayed.

FIG. 14(d) shows the definitions related to the driving load level and the sound output from the speaker. When the driving load level is "None" to "Medium", the operation sound or the reading voice at such time is output. When the driving load level is "High", only a warning sound is output. Note that, even when a message is being read, the output thereof is stopped. The stopped message that was being read is resumed and once again read from the beginning once the driving load level becomes lower.

Note that the configuration may also be such that the user's hand placement detection algorithm and the feedback method are changed according to the driving load level. For example, when the driving load level is "Low" and the hand placement is detected when the user places one's hand for 0.6 seconds or longer, in cases where the driving load level is "None", the setting is changed such that the hand placement is detected when the user places one's hand for 2 seconds or longer. Furthermore, when the driving load level is "None", the feedback of hand placement based on a sound output is discontinued. Consequently, the hand placement detection algorithm which was devised so that the user can perform operations quickly and while looking straight ahead while driving can prevent erroneous detection based on operations other than hand placement operations, such as touch operations, by giving consideration to the fact that touch operations and taking one's eyes off the road are permitted while the vehicle is stopped.

As described above, based on the in-vehicle device 101 according to the second embodiment of the present invention, in addition to the user being able to intuitively and quickly perform operations while looking straight ahead even white driving the vehicle, the user can perform operations based on various means and receive more information when the user has much leeway such as when the vehicle is stopped, and the user can perform safe driving by preventing the user from focusing on other operations other than the driving operation in situations where the user should be concentrating on the driving operation.

Note that, while all of the embodiments explain the case of applying the present invention to an in-vehicle device, the present invention is not limited thereto, and may also be applied to devices such as a personal computer, digital signage, construction machinery, aircraft, or monitoring operator device that comprise a display unit and an operation means.

Third Embodiment

<<Explanation of Configuration>>

Figure 17:
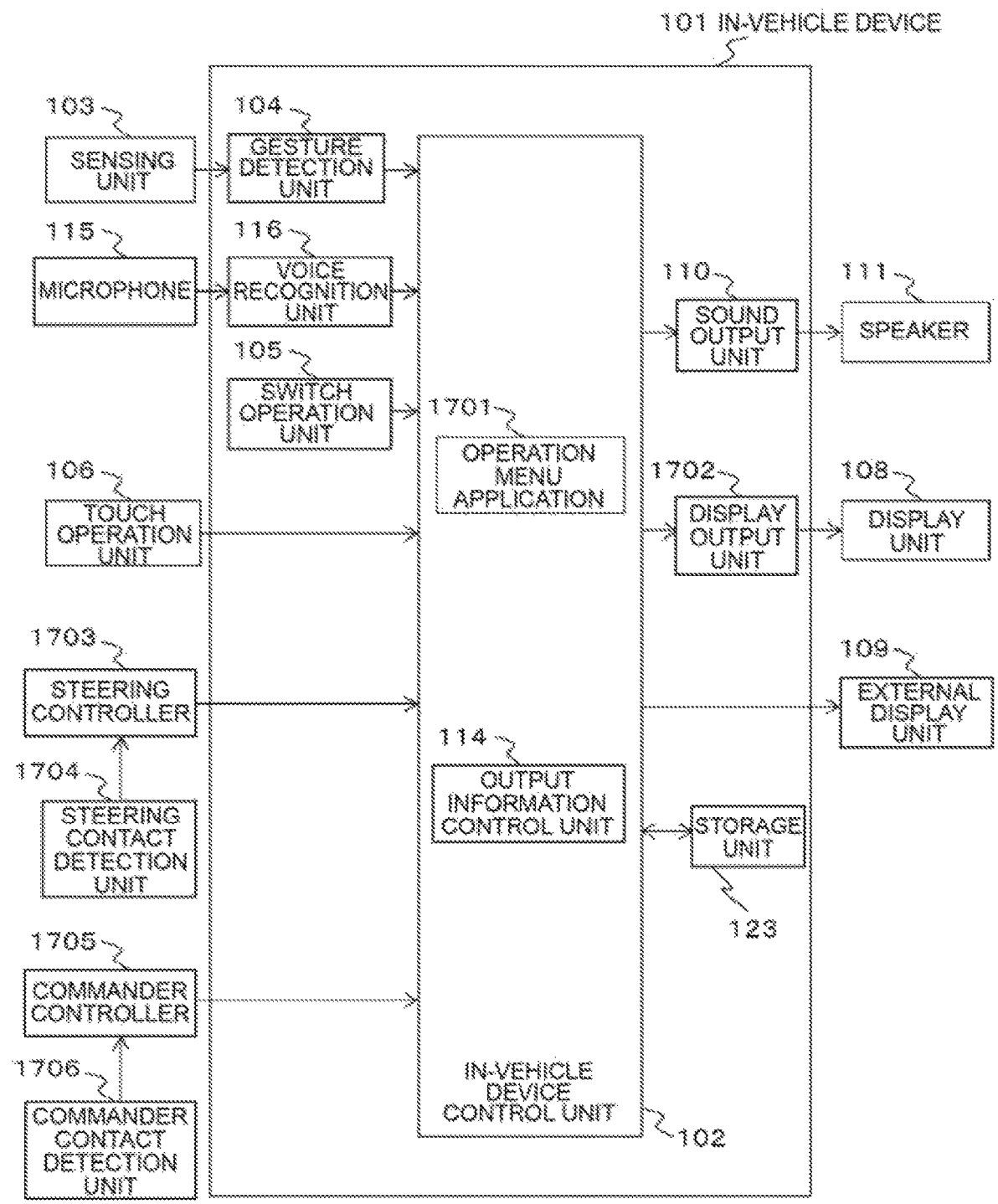
FIG. 17 shows a configuration diagram of an in-vehicle device in the third embodiment of the present invention.

FIG. 17 is a configuration diagram of the in-vehicle device 101 in the third embodiment. In comparison to the configuration diagram of FIG. 1, an operation menu application 1701, a display output unit 1702, a steering controller 1703, a steering contact detection unit 1704, a commander controller 1705, and a commander contact detection unit 1706 have been added.

The operation menu application 1701 is software for displaying an operation menu on the display unit 108 and the external display unit 109 according to the programs stored in the storage unit 123.

The display output unit 1702 has a function of outputting video signals to the display unit 108 in cases where a display device that is not built into the in-vehicle device 101 is used as the display unit 108.

The steering controller 1703 is a switch part that is mounted on the steering wheel, and is used by the user for inputting operations. Moreover, the steering contact detection unit 1704 detects whether the user's hand has come into contact with the switch pad of the steering controller 1703.

The commander controller 1705 is a switch part that is mounted on the in-vehicle instrument panel or center console, and is used by the user for inputting operations. Moreover, the commander contact detection unit 1706 detects whether the user's hand has come into contact with the switch part, of the commander controller 1705.

Figure 18:
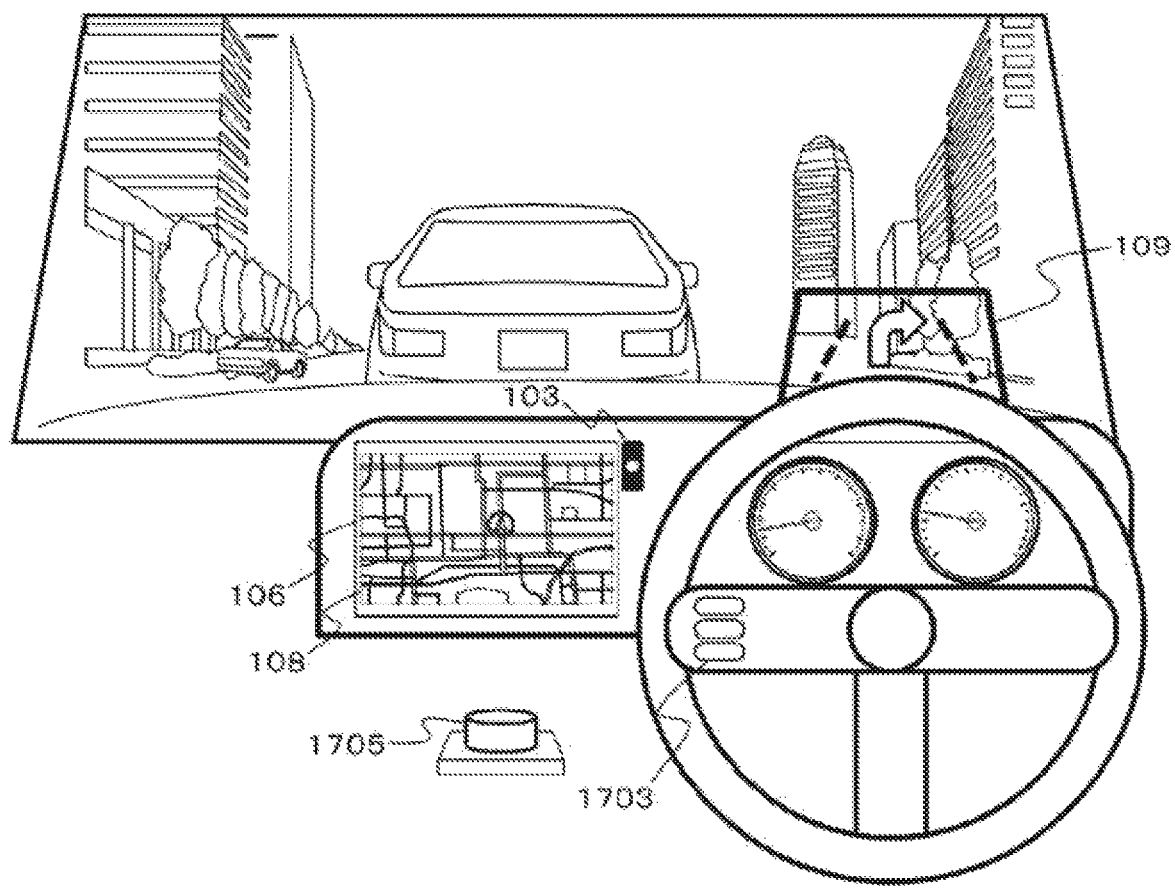
FIG. 18 shows an appearance example of a cockpit.

FIG. 18 shows the appearance of a cockpit in the third embodiment. The display unit 108 is mounted at the center of the instrument panel, and touch operations can be performed with the touch operation unit 108. Moreover, a sensing unit 103 for detecting gestures is provided at the upper right part of the display unit 108. The external display unit 109 is configured from an HUD, and can display various types of information while allowing the scenery ahead of the driver (user) to pass therethrough. The steering controller 1703 is provided in the steering wheel. Moreover, the commander controller 1705 is provided on the center console.

<<Explanation of Operation>>

The operation of the in-vehicle device 101 of the third embodiment is now explained. The basic operation is the same as the operation explained in the first embodiment, but the third embodiment is unique in that the displayed contents of the display unit 103 and the external display unit 109 are changed based on the hand waving in the upward direction and the downward direction relative to the sensing unit 103, and that the shape of the operation menu and operation guide displayed on the external display unit 109 is changed according to the hand motion that is detected by the sensing unit 103.

Figure 19:
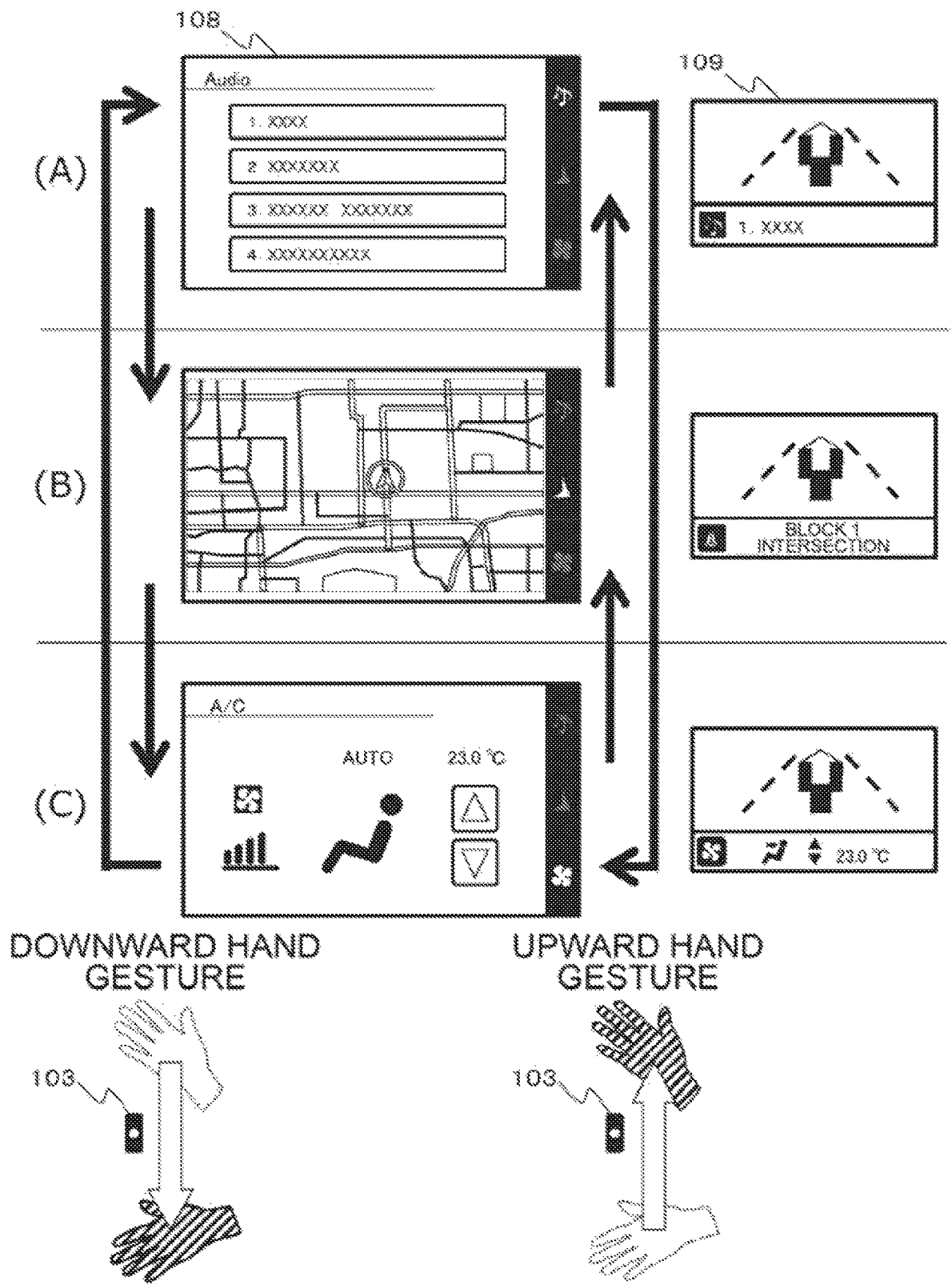
FIG. 19 shows a display example of a display unit and an external display unit.

FIG. 19 shows a state where the displayed contents of the display unit 108 and the external display unit 109 are changed based on the hand waving in the upward direction and the downward direction relative to the sensing unit 103. The respective screens of (A), (B) and (C) of FIG. 19 represent the display in the screen mode controlled by the operation menu application 1701, and (A) shows an audio operation mode, (B) shows a navigation operation mode, and (C) shows an air-conditioning operation mode. Each time the user wave's one hand in the upward direction once, the screen of the display unit 108 and the external display unit 109 switches from (A) to (B), from (B) to (C) and from (C) to (A) of FIG. 19.

Figure 20:
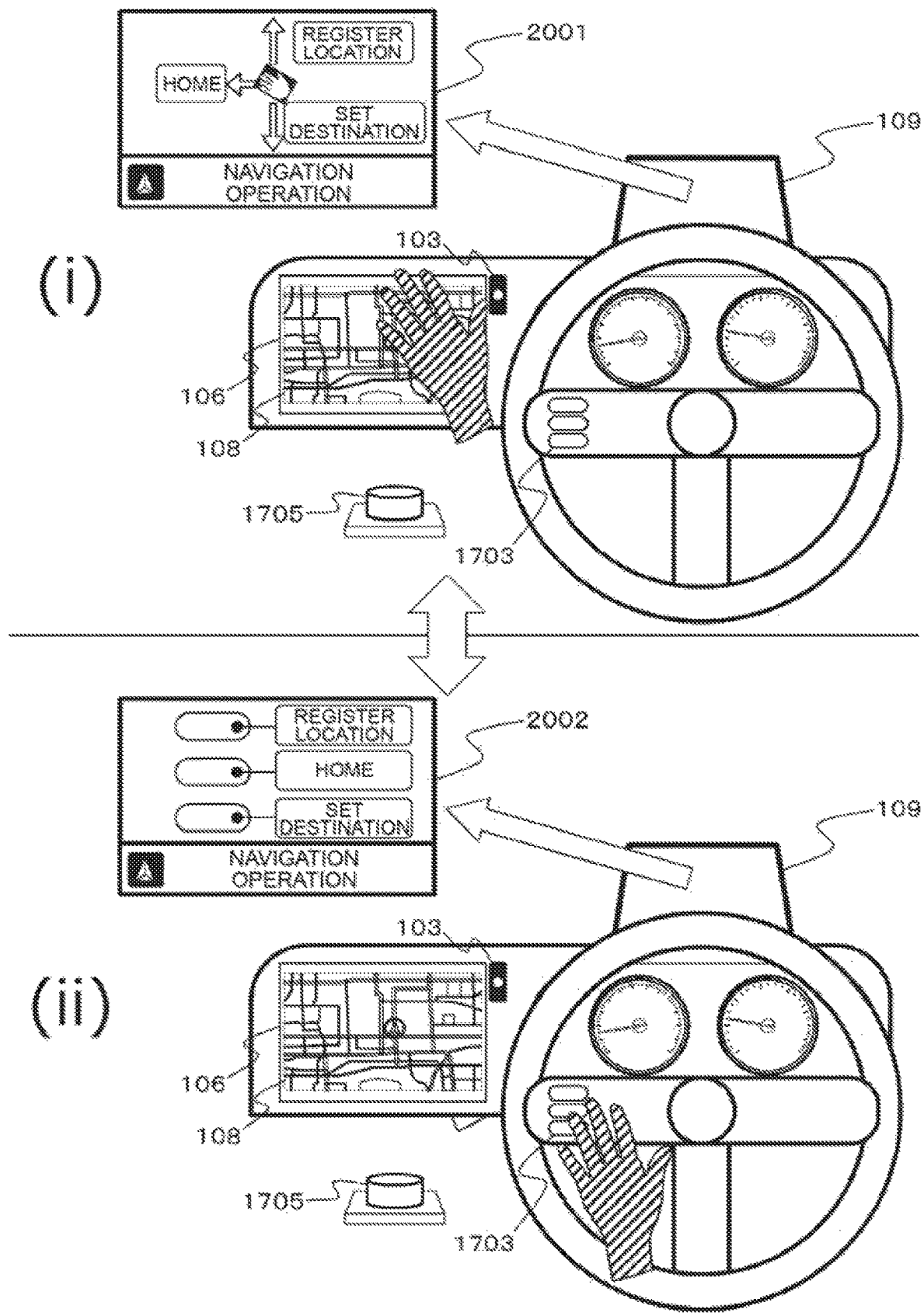
FIG. 20 an example of an operation method based on gestures and a steering controller.

FIG. 20 shows a state where the user is performing operations based on gestures and the steering controller 1703 in the (B) navigation operation mode. As shown in (i) of FIG. 20, when the user place's one hand over the sensing unit 103, the gesture operation menu 2001 is displayed on the external display unit 109, and, by moving one's hand in one direction among upward, downward and leftward from the hand placement position, the user can select the item corresponding to that direction. Meanwhile, in (i) of FIG. 20, when the user returns one's hand to the steering wheel from the state of hand placement, the steering controller operation menu 2002 is displayed as shown in (ii) of FIG. 20. In the state shown in (ii) of FIG. 20, by pressing one switch among the top switch, middle switch and bottom switch of the steering controller 1703, the user can select the item corresponding to the pressed switch. Note that, in the state shown in (ii) of FIG. 20, if the user once again places one's hand over the sensing unit 103 without pressing any switch, the screen returns to the stat shown in (i) of FIG. 20.

Figure 21:
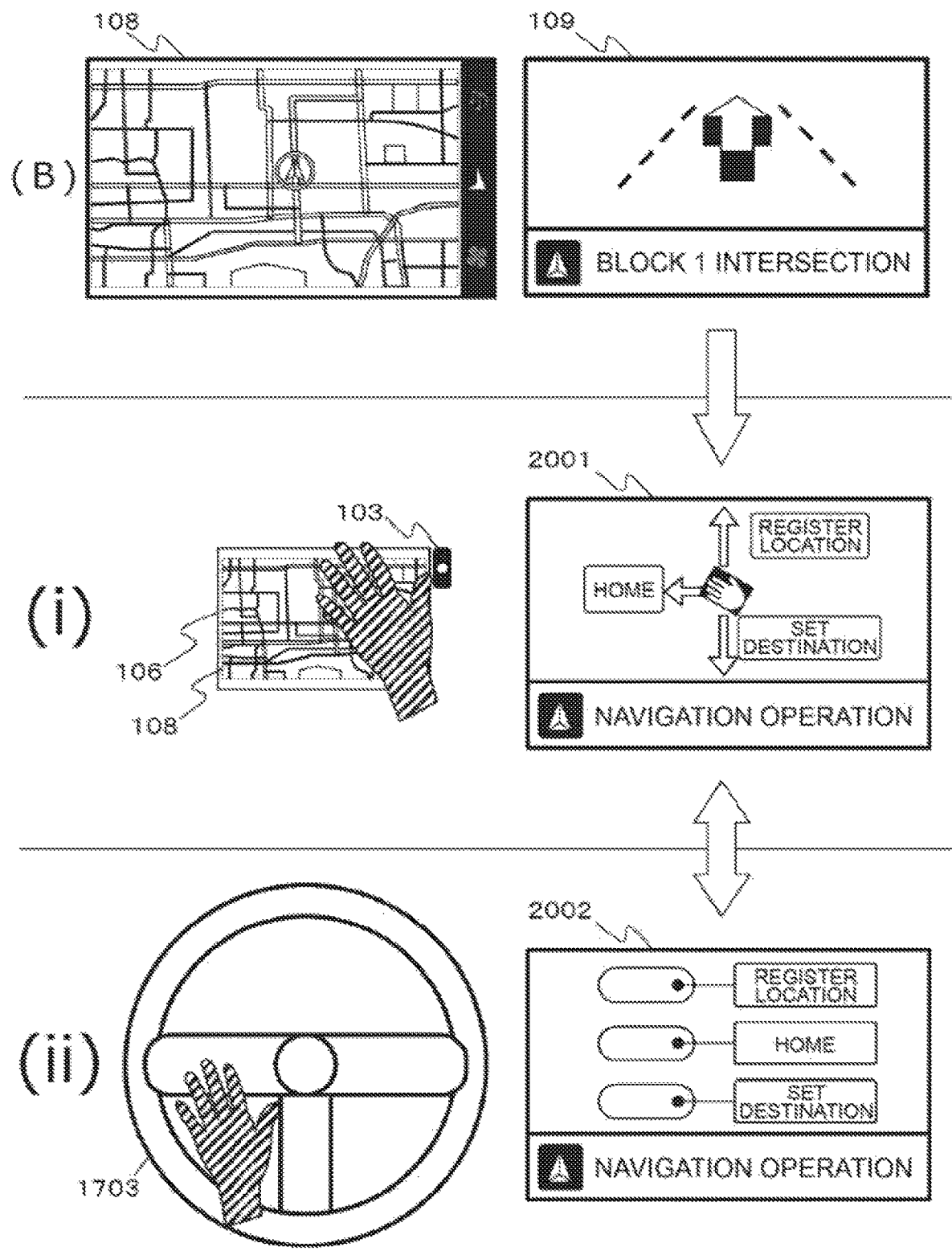
FIG. 21 shows a display example of an external display unit.
Figure 22:
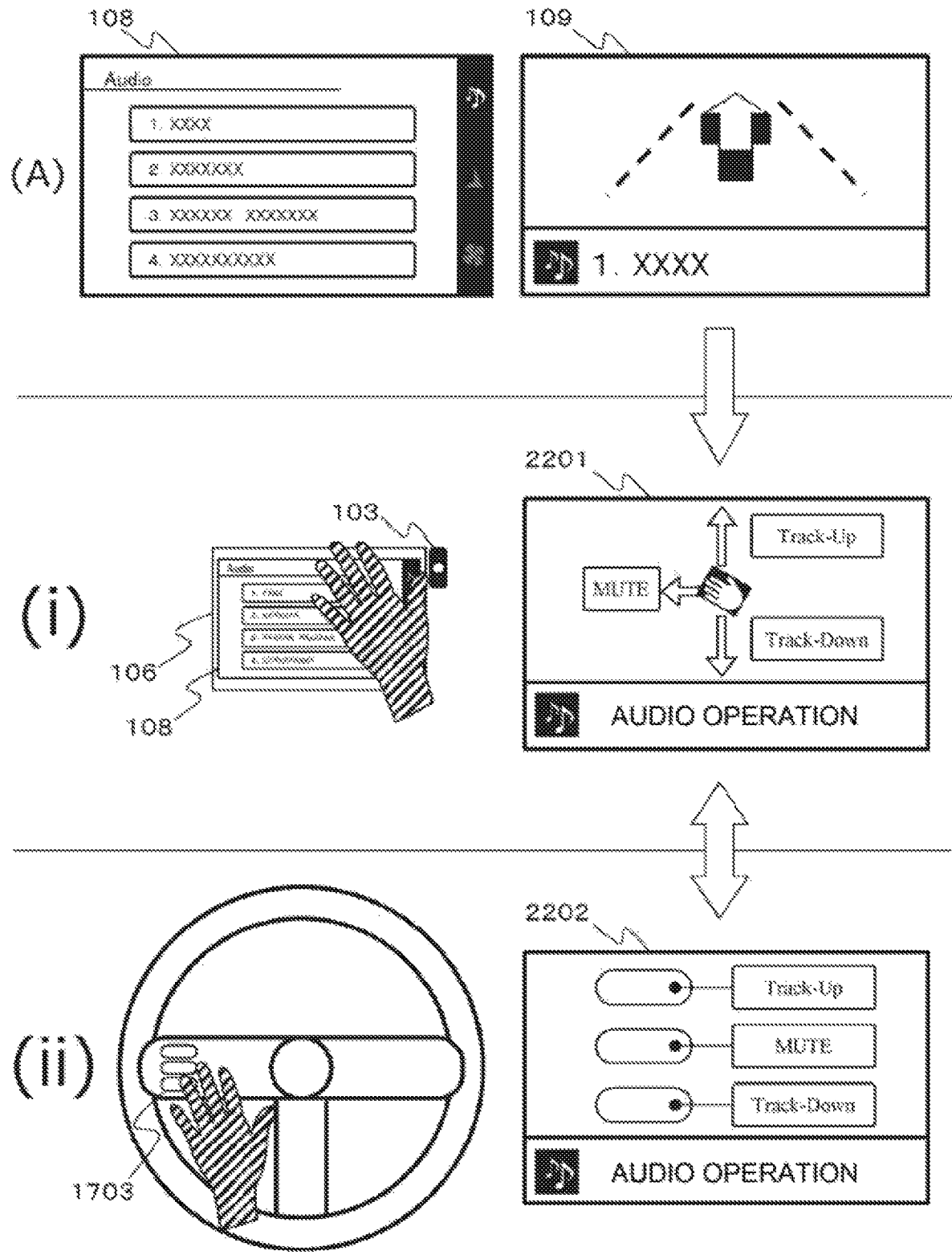
FIG. 22 shows a display example of an external display unit.
Figure 23:
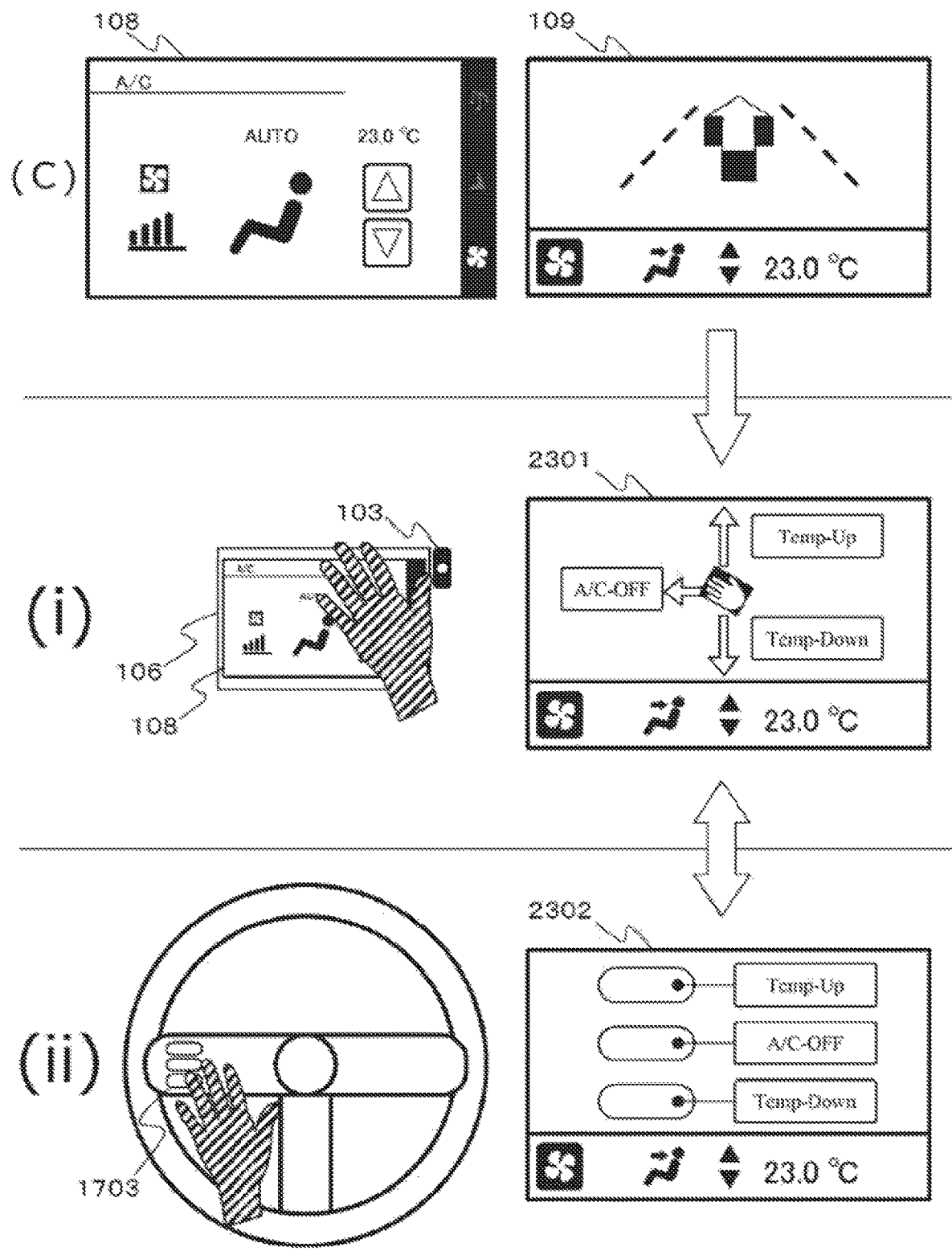
FIG. 23 shows a display example of an external display unit.

FIG. 21, FIG. 22, and FIG. 23 show the screen transition of the external display unit 109 in the series of operations explained with reference to FIG. 19 and FIG. 20. FIG. 21 shows the screen transition of the (B) navigation operation mode, FIG. 22 shows the screen transition of the (A) audio operation mode, and FIG. 23 shows the screen transition of the (C) air-conditioning operation mode.

Figure 24:
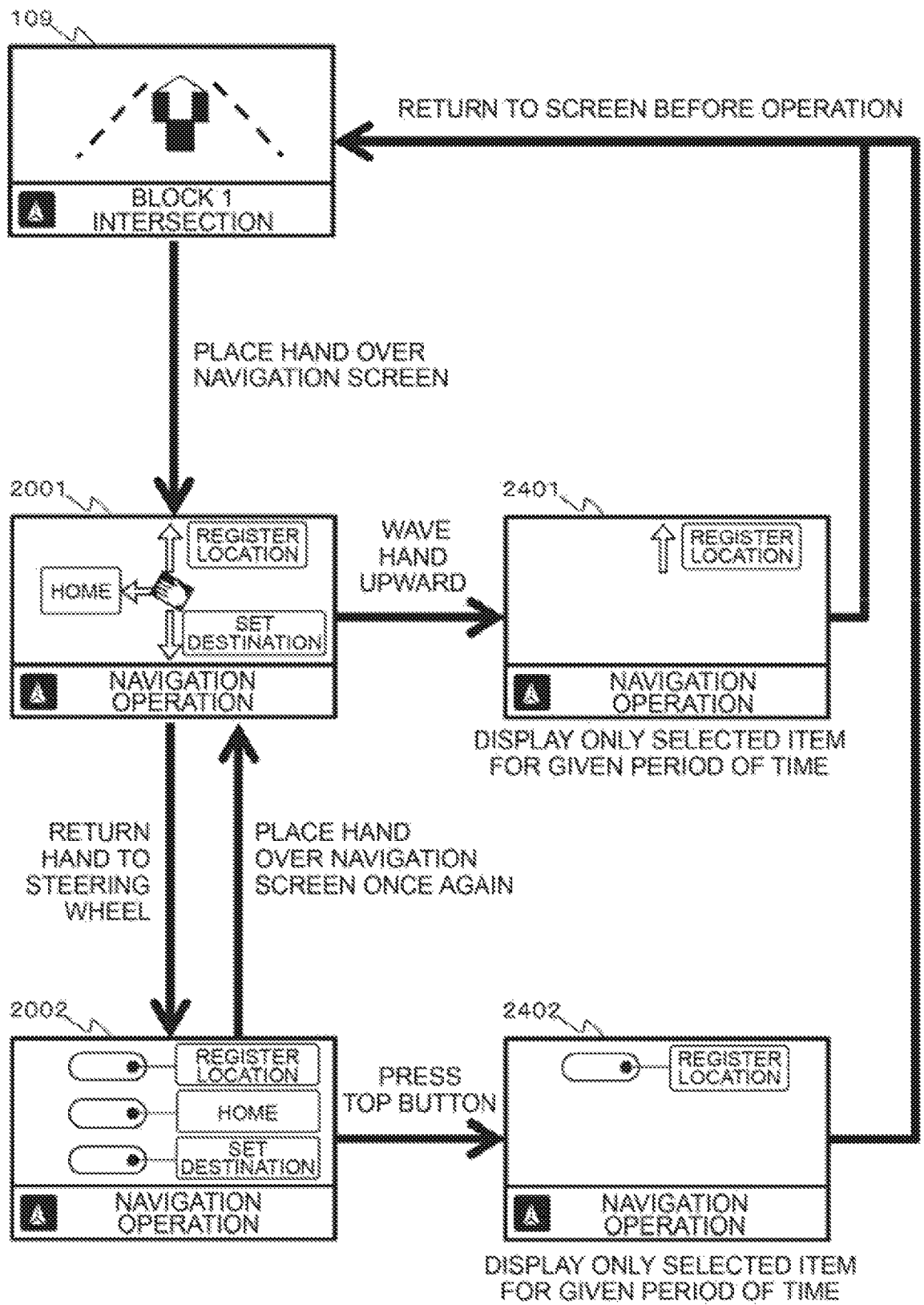
FIG. 24 shows an example of an operation flow.

FIG. 24 shows the detailed movement in the screen of the external display unit 109 in the (B) navigation operation mode. As described above, when the user place's one's hand over the sensing unit 103 in the (B) navigation operation mode, the gesture operation menu 2001 is displayed on the external display unit 109. Here, when the user moves one's hand in the upward direction from the hand placement position, as shown in 2401 of FIG. 24, only the item corresponding to the upward direction is displayed for a predetermined time, and based on this display, the user can confirm that the intended item has been selected. Moreover, when a predetermined time elapses from the display of 2401, the display of the external display unit 109 returns to the state before the user's hand placement. Note that the movement is the same for the steering controller operation menu 2002.

FIG. 28(a) is a table showing the correspondence of the gesture detection status and the operation device in the in-vehicle device 101 of the third embodiment. Moreover, FIG. 28(c) is a table showing the correspondence of the operation device and the display device according to a state where the vehicle is moving and a state where the vehicle is stopped. The output information control unit 114 of the third embodiment determines the operation device and the display device to be used in the operation of a predetermined menu accenting to FIG. 26(a) and FIG. 26(c).

As shown in FIG. 26(a), when the user's hand is near the sensing unit 103, the output information control unit 114 determines that the user is attempting to perform an operation with a gesture. Moreover, when the user's hand is removed from the sensing unit 103, the output information control unit 114 determines that the user is attempting to perform an operation with the steering controller 1703. Note that, for vehicles that are not equipped with the steering controller 1703, the output information control unit 114 may determine that the user is attempting to perform an operation with another operation device such as a commander controller 1705 that is equipped in the vehicle. Based on the foregoing determination, the output information control unit 114 instructs the operation menu application 1701 to output a predetermined screen. It is thereby possible to display the operation menu and operation guide that are suitable for the operation device to be operated by the user, and an effect is yielded in that the user can smoothly perform operations using the intended operation device.

Moreover, as shown in FIG. 26(c), when the output information control unit 114 determines that the user is attempting to perform operations by using gestures, the steering controller 1703 and the commander controller 1705 while the vehicle is moving, the output information control unit 114 displays the operation menu on the external display unit 109 (HUD). Consequently, because the user can visually confirm the operation menu with minimal line of sight movement from the state of visually recognizing the forward view of the vehicle, an effect is yielded in that the influence on the driving operation caused by the operation of the operation menu can be suppressed.

Note that, while the vehicle is stopped, operations based on a touch panel with high operability which enables detailed operations with the user's fingertips may also be permitted. For example, as shown in FIG. 25, in a state where the steering controller operation menu 2002 is being displayed on the external display unit 109, when the user moves one's hand close to the sensing unit 103 while the vehicle is stopped, a detailed menu as shown in 2501 of FIG. 25 may be displayed on the display unit 108, and operations may be performed based on touch operation. Furthermore, when the vehicle starts moving again, the display of the display unit 106 may be turned off, and the steering controller operation menu 2002 may be displayed once again on the external display unit 109. Consequently, an effect, is yielded in that the user can switch to a touch panel operation and perform operations efficiently based on a touch operation in circumstances where the driving operation will not be hindered, such as when the vehicle is stopped.

Figure 27:
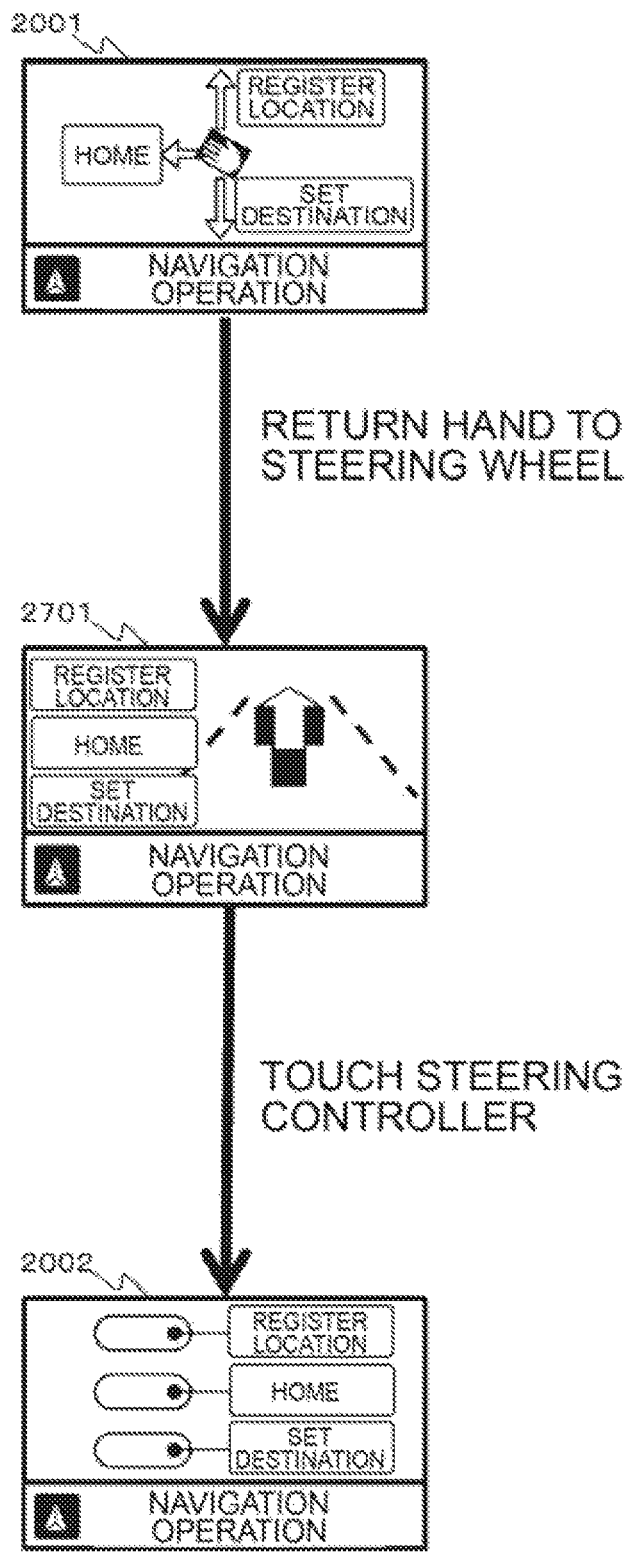
FIG. 27 shows an example of an operation flow.

In the third embodiment, while the steering controller operation menu 2002 is displayed on the external display unit 109 when the user returns one's hand to the steering wheel, the display of the steering controller operation menu 2002 may feel bothersome when the user wishes to perform the driving operation with the hand that was returned to the steering. Thus, as shown in FIG. 27, when the user returns one's hand to the steering wheel, a simplified menu in which the part where the menu is to be displayed in the external display unit 109 is reduced in size as shown in 2701 of FIG. 27 may be displayed, and the steering controller operation menu 2002 may be displayed when the steering contact detection unit 1704 detects that the user has touched the switch of the steering controller 1703. Consequently, because the steering controller operation menu 2002 is not displayed right up until the user operates the steering controller 1703, it is possible to reduce the botheration of the menu display, and also yield the effect of effectively using the display of the external display unit 109 for displaying other information required for driving.

Fourth Embodiment

<<Explanation of Configurations>>

FIG. 28 shows the appearance of the operation of the in-vehicle device 101 in the fourth embodiment. In comparison to the external view of FIG. 20, a screen where the commander operation menu 2801 is displayed on the external display unit 109 when the user places one's hand near the commander controller 1705 has been added. Moreover, in the fourth embodiment, a camera is used as the sensing unit 103 as shown in FIG. 9. The sensing unit 103 of the fourth embodiment detects in which direction the user's hand is moving in the periphery of the sensing unit 103. Note that, so as long as it is possible to detect in which direction the user's hand is moving, the sensing unit 103 may be a sensing device other than a camera.

<<Explanation of Operation>>

The operation of the in-vehicle device 101 of the fourth embodiment is now explained. The basic operation is the same as the operation explained in the third embodiment, but the fourth embodiment is unique in that the displayed contents of the display unit 108 and the external display unit 109 to be displayed on the external display unit 109 are changed based on detecting in which direction the user's hand is moving in the periphery of the sensing unit 103.

FIG. 28 shows a state where the user is performing operations based on gestures, the steering controller 1703 and the commander controller 1705 in the (B) navigation operation mode. As shown in (i) of FIG. 28, when the user moves one's hand in the direction of the steering while from a state of placing one's hand over the sensing unit 103, the steering controller operation menu 2002 is displayed as shown in (i) of FIG. 28. Meanwhile, when the user moves one's hand in the direction of the commander controller 1705 from a state of placing one's hand over the sensing unit 103 as shown in (ii) of FIG. 28, operation menu 2801 is displayed on the commander controller 1705 as shown (ii) of FIG. 28. In the state shown in (ii) of FIG. 28, by rotating the rotary controller once, the user can select one item in correspondence with the rotary controlled equipped in the commander controller 1705.

FIG. 28(b) is a table showing the selection of the operation device according to the position and moving direction of the hand in the in-vehicle device 101 of the fourth embodiment. The output information control unit 114 of the fourth embodiment decides the operation device to be used for the operation of a predetermined menu according to FIG. 28(b).

As shown in FIG. 26(b), when the user's hand is near the sensing unit 103, the output information control unit 114 determines that the user is attempting to perform an operation with a gesture. Moreover, when the user's hand moves from the sensing unit 103 in the direction or to the position of the steering controller 1703, the output information control unit 114 determines that the user is attempting to perform the operation with the steering controller 1703. Furthermore, when the user's hand moves from the sensing unit 103 in the direction or to the position of the commander controller 1705, the output information control unit 114 determines that the user is attempting to perform the operation with the commander controller 1705. Note that the steering controller 1703 and the commander controller 1706 may be other operation devices equipped in the vehicle. Based on the foregoing determination, the output information control unit 114 instructs the operation menu application 1701 to output a predetermined screen. It is thereby possible to display the operation menu and operation guide that are suitable for the operation device to be operated by the user, and an effect is yielded in that the user can smoothly perform operations using the intended operation device.

Figure 29:
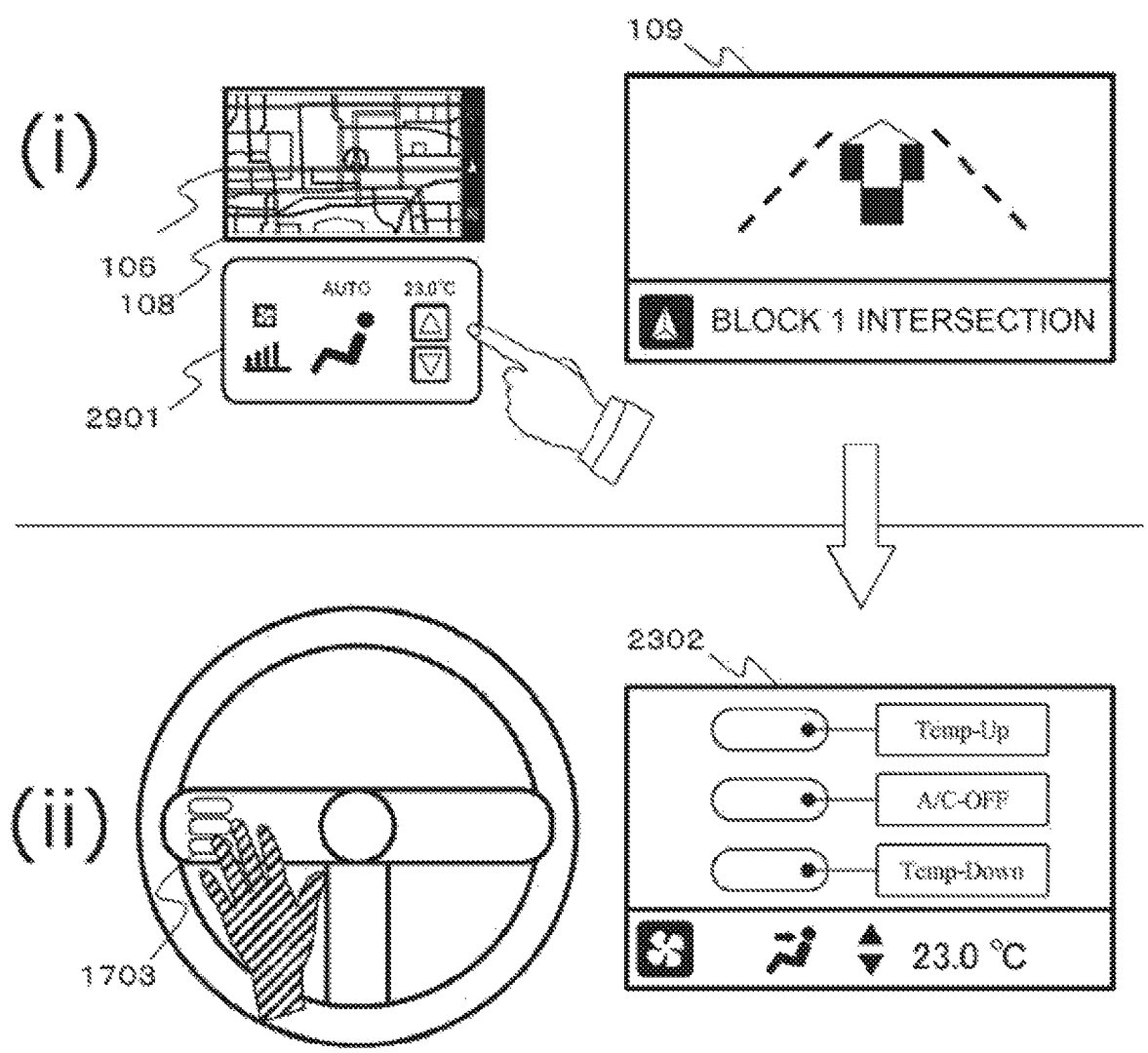
FIG. 29 stows an example of an operation method based on a gesture and a steering controller.

Mote that, upon displaying the operation menu, the determination may also be made based on the user's finger-pointing direction detected by the sensing unit 103 rather than based on the direction or position that the user's hand moved from the sensing unit 103. For example, as shown in FIG. 29, the sensing unit 103 may detect that the user pointed one's finger to the air-conditioning operation panel 2901 in the state shown in (i) of FIG. 29, and the steering controller operation menu 2302 for air-conditioning operation may be displayed on the external display unit 109 based on the foregoing detection. Consequently, an effect is yielded in that the intended operation menu can be displayed even more smoothly without the user having to place one's hand over the sensing unit 103 even once.

Fifth Embodiment

<<Configuration>>

Figure 30:
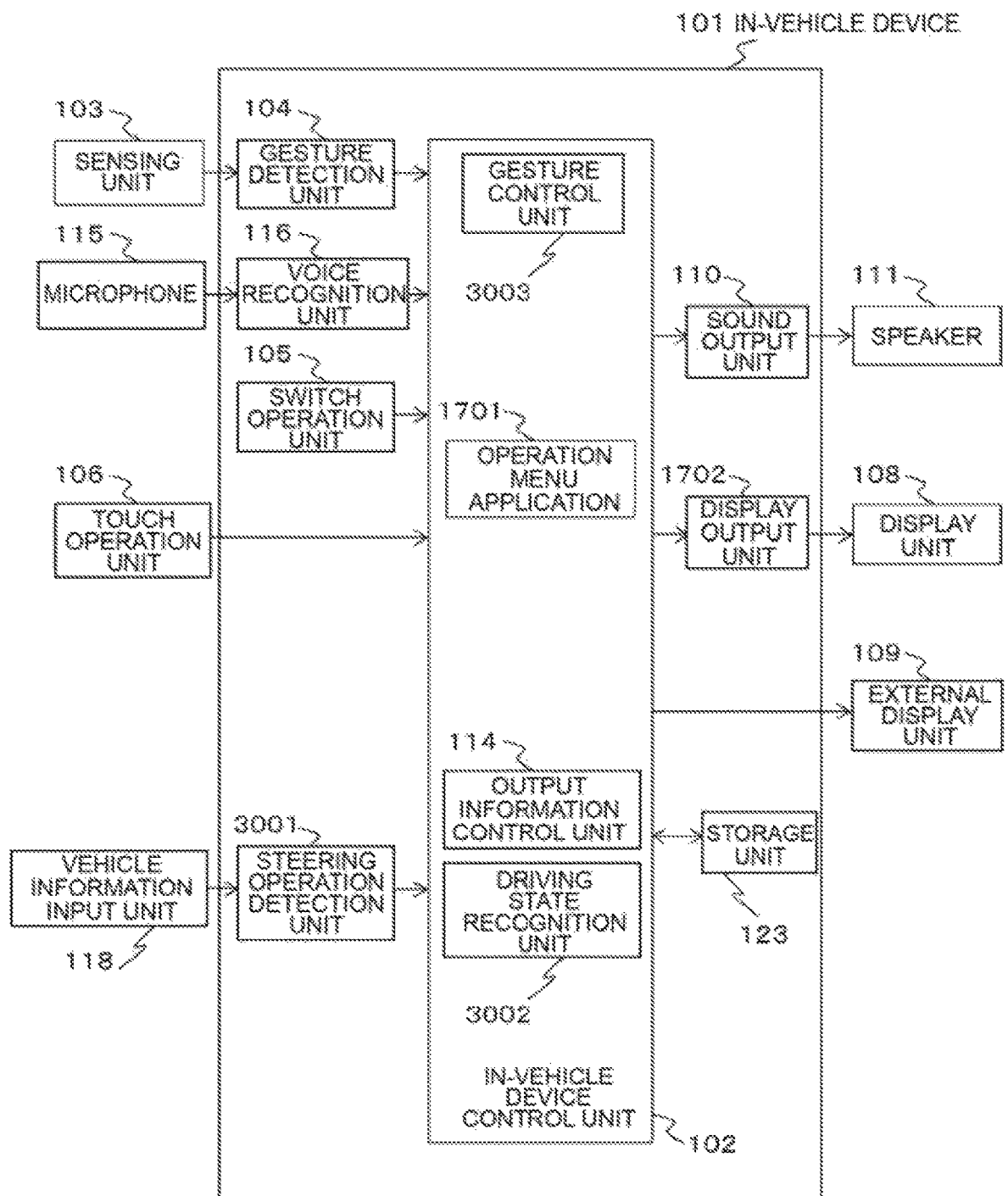
FIG. 30 shows a configuration diagram of an in-vehicle device in the fifth embodiment of the present invention.

FIG. 30 is a configuration diagram of the in-vehicle device 101 in the fifth embodiment. In comparison to the configuration diagrams of FIG. 13 and FIG. 17, a steering operation detection unit 3001, a driving state recognition unit 3002, and a gesture control unit 3003 have been added.

The driving state recognition unit 3002 and the gesture control unit. 3003 express, as functional blocks, the functions that are realized by the programs stored in the storage unit 123 being executed by the in-vehicle device control unit 102.

The steering operation detection unit 3001 detects the user's operation state of the steering wheel based on information of the steering angle acquired by the vehicle information input unit 118, and outputs the detected result to the driving state recognition unit 3002.

The driving state recognition unit 3002 detects the driving state of the vehicle based on the output of the steering operation detection unit 3001. When the driving state recognition unit 3002 determines that the driving state of the vehicle is in the predetermined state described later, the driving state recognition unit 3002 outputs a gesture operation disablement instruction to the gesture control unit 3003.

The gesture control unit 3003 normally outputs an input from the gesture detection unit 104 to the operation menu application 1701, and causes operations based on the gesture to be in an enabled state. Meanwhile, when the driving state recognition unit 3002 outputs a disablement instruction, the gesture control unit 3003 cancels and disables the input from the gesture detection unit 104, and causes operations based on the gesture to be in a disabled state. However, when the driving state recognition unit 3002 outputs a disablement instruction, the gesture control unit 3003 may also stop the operation of the gesture detection unit 104; that is, stop the detection of gestures by the gesture detection unit 104.

Figure 31:
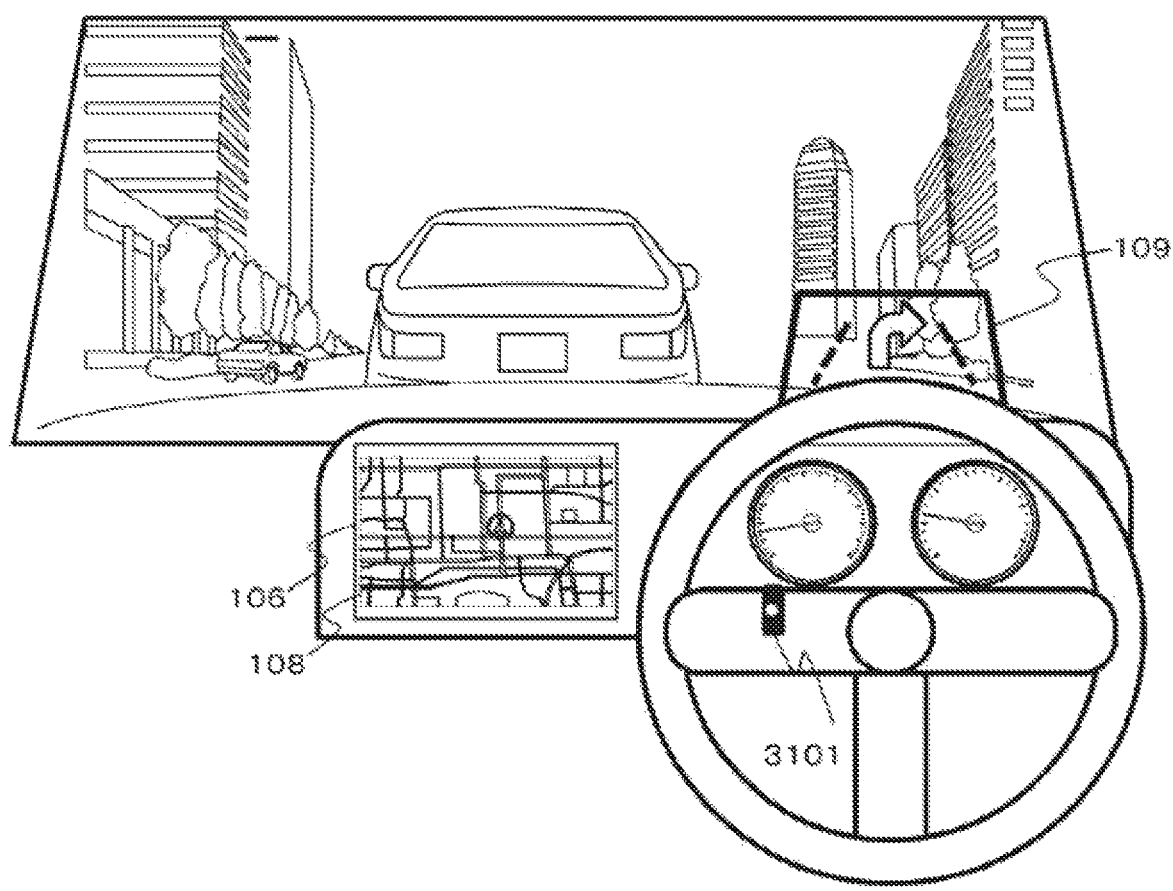
FIG. 31 shows an exterior example of the cockpit.

FIG. 31 shows an appearance of the cockpit in this embodiment. A sensing unit 3101 for detecting gestures is provided on the left side of the steering wheel in a right-side steering wheel vehicle. As with the sensing unit 103 explained in the first to fourth embodiments, the sensing unit 3101 is the part that detects the distance between the user's hand and a sensor, and detects the waving of the user's hand. The external display unit 103 is configured as an HUD, and can display various types of information while allowing the scenery ahead of the driver (user) to pass therethrough. Moreover, the display unit 108 is mounted at the center of the instrument panel, and touch operations can be performed with the touch operation unit 106.

The display unit 108 or the external display unit 109 displays contents corresponding to the gesture operation detected by the sensing unit 3101. Here, as a result of the output information control unit 114 shown in FIG. 30 instructing the operation menu application 1701 to output a predetermined screen, an operation menu related to the gesture operation is displayed on the display unit 108 or the external display unit 109. The operation menu application 1701 is software that displays an operation menu on the display unit 108 and the external display unit 109 according to the programs stored in the storage unit 123.

<<Operation>>

The operation of the in-vehicle device 101 of this embodiment is now explained. The basic operation is the same as the operation explained in the first embodiment. In the fifth embodiment, the mounting position of the sensing unit 3101 has been changed from the sensing unit 103 shown in FIG. 2 and other diagrams, and the gesture detection region that was near the display unit 108 in the first embodiment has been changed to a position that is near the left side of the steering wheel.

The fifth embodiment is unique in that the displayed contents of the display unit 108 or the external display unit 108 are changed according to the user's hand waving in the upward direction or downward direction near the left side of the steering wheel, and whether to change the operation menu and the operation guide to be displayed on the display unit 108 or the external display unit 109; that is, whether the users gesture operation should be accepted as being enabled, is controlled according to the steering angle detected by the steering operation detection unit 3001.

The user is thereby able to perform the gesture operation based on a small movement near the steering wheel without having to separate one's hand far away from the steering wheel even while driving, and at the same time enablement/disablement of the gesture operation is switched according to the steering angle, confusion between the driving operation and gesture operation performed near the steering wheel can be prevented, and user-friendliness in inputting commands can be improved.

While a case was explained where the steering operation detection unit 3001 defects the operation state of the steering wheel based on information such as the steering angle acquired by the vehicle information input unit 118, the present invention is not limited thereto, and the configuration may also be such that the user's steering operation, such as the steering angle or the like, is detected using a camera or a sensor.

FIG. 32 and FIG. 33 are diagrams showing the gesture detection region, and the motion of the user's hand in the gesture detection region.

The gesture detection region 3201 in FIG. 32 and FIG. 33 is a visualization of the region where the sensing unit 3101 detects the motion of the user's hand. As described above, in this embodiment, the gesture detection region 3201 is set near the left, side of the steering wheel, and the user performs the gesture operation using one's left hand.

FIG. 32(*i*) shows the hand waving gesture operation of passing one's hand across the gesture detection region 3201 from top down without stopping one's hand in the gesture detection region 3201. FIG. 32(*ii*) shows the hand waving gesture operation of passing one's hand across the gesture detection region 3201 from bottom up without stopping one's hand in the gesture detection region 3201. In this embodiment, these two gesture operations are collectively referred to as the "direct gesture".

FIG. 33 shows a method of the gesture operation of moving one's hand after hand placement, in which the motion of one's hand is temporarily stopped in the gesture detection region 3201. In this embodiment, this operation is referred to as the "hand placement gesture".

When the user places one's hand in the gesture detection region 3201, for instance, the gesture operation menu 2001 shown in FIG. 20(*e*) is displayed on the external display unit 109. As shown in FIG. 33(*i*) to FIG. 33(*iii*), by the user moving one's hand in any one of the directions of up, down and left from the hand placement position, the user can select the item corresponding to that direction. For example, when the user moves one s hand downward in a state where the gesture operation menu 2001 shown in FIG. 20(*i*) is displayed on the external display unit 109, "Set destination" is selected.

FIG. 34 is a diagram showing an operation example using the direct gesture of FIG. 32, and shows that the processing to be performed in response to the gesture operation is changed according to the angle of the steering wheel.

FIG. 34(*i*) shows a state where the steering operation detection unit 3001 has detected that the steering wheel has hardly been turned; that is, a state where the angle 3410 is approximately zero in this state, when hand waving in the downward direction in the gesture detection region 3201 is detected, the displayed contents of the display unit 108 are changed from the audio operation mode to the air-conditioner operation mode based on the operation of the operation menu application 1701 according to the control of the output information control unit 114.

FIG. 34(*ii*) shows a state where the angle 3411 is net zero; that is, a state where the steering wheel has been turned. When the angle of the steering wheel is a certain value or higher, the gesture control unit 3003 performs control for disabling the user's gesture operation detected by the gesture detection unit 104. Here, because the gesture operation has been disabled, the output information control unit 114 does not execute control of displaying the operation menu related to the gesture operation on the display unit 108 or the external display unit 109 as described above even when hand waving in the downward direction in the gesture detection region 3201 is detected. The displayed contents of the display unit 108 shown at the lower right of FIG. 34(*ii*) remain in the audio operation mode, and this indicates that the gesture operation has been disabled.

(Flowchart)

The operation of the in-vehicle device 101 is now explained with reference to a flowchart.

FIG. 35 is a flowchart showing the operation of the in-vehicle device 101. The in-vehicle device 101 executes the program which yields the operation depicted in FIG. 35.

In step S3501, the gesture detection unit 104 starts to stand by for an input from the user, and then proceeds to step S3502.

In step S3502, whether the gesture detection unit 104 has detected a gesture operation is determined. The routine proceeds to step S3503 when it is determined that a gesture operation has been detected, and remains at step S3502 when it is determined that a gesture operation has not been detected. Note that the term "gesture operation" used in this step refers to the direct gesture or the hand placement gesture described above.

In step S3503, the driving state recognition unit 3002 determines whether the steering angle is equal to or less than a predetermined threshold based on information from the steering operation detection unit 3001. Note that this threshold is stored in the storage unit 123. The routine proceeds to step S3504 when it is determined that the steering angle is equal to or less than the threshold, and proceeds to step S3505 when it is determined that the steering angle is greater than the threshold.

In step S3504, the output information control unit 114 or the operation menu application 1701 executes processing corresponding to the gesture operation detected in step S3502, and ends the program which yields the operation depicted in FIG. 35. Processing corresponding to the gesture operation is, for instance, transition of the display unit 108 or the external display unit 109 shown in FIG. 34(*i*), or execution of the selected operation.

In step S3505, the driving state recognition unit 3002 outputs a disablement instruction to the gesture control unit 3003 to disable the gesture operation, in response to this disablement instruction, the gesture control unit 3003 disables the gesture operation by disabling inputs from the gesture detection unit 104 or stopping the operation of the gesture detection unit 104 as described above. The routine thereafter returns to step S3501.

For example, when the user is to perform a hand placement gesture, because the gesture operation is enabled when the steering angle is equal to or less than the threshold, the user's hand placement in the gesture detection region 3201 is foremost detected, and step S3504 is executed the first, time. Here, the output information control unit 114 uses the operation menu application 1701 and displays, on the display unit 108 or the external display unit 109, the gesture operation menu showing candidates of the gesture operation corresponding to the user's hand movement after hand placement. Consequently, for instance, the gesture operation menu 2001 shown in FIG. 20(i) is displayed on the external display unit 109. When the placed hand is subsequently moved, the gesture is once again detected (S3502: YES) and step S3504 is once again executed, whereby the operation corresponding to the hand waving is executed according to the gesture operation menu displayed on the display unit 108 or the external display unit 109.

Meanwhile, when the steering angle is greater than the threshold and the users hand placement in the gesture detection region 3201 is detected, step S3505 is executed and the gesture operation is disabled. Here, because step S3504 is not executed, the output information control unit 114 does not display the foregoing gesture operation menu on the display unit 108 or the external display unit 109. In other words, in the foregoing case, even when the user's hand is positioned in the gesture detection region 3201, the output information control unit 114 does not change the displayed contents of the display unit 108 or the external display unit 109. Even when the user thereafter makes a hand waving motion of moving one's placed hand, the gesture operation according to the hand waving motion is not executed.

Note that, in FIG. 35, after hand waving is detected in step S3502, the gesture operation is disabled by ignoring the gesture that was previously detected in step S3505 and not reflecting the gesture recognition result in the functional operation. Nevertheless, when the steering angle is exceeding the threshold, the gesture operation may also be disabled by disabling the gesture recognition function itself without detecting hand waving with the gesture detection unit 104.

The following effects are yielded according to the fifth embodiment explained above.

(1) An in-vehicle device 101 comprises a gesture detection unit 104 which recognizes a user's hand position located within a predetermined gesture detection region 3201, a driving state recognition unit 3002 which detects a driving state of a vehicle, and a gesture control unit 3003 which controls a state of a gesture operation based on a recognition result of the hand position by the gesture detection unit 104. The gesture control unit 3003 disables the gesture operation when the driving state of the vehicle detected by the driving state recognition unit 3002 is in a disabling state.

Because the in-vehicle device 101 is configured as described above, the gesture operation is disabled based on the driving state of the vehicle, and it is possible to improve the safety and operability of the operation of in-vehicle equipment by a driver who is driving a vehicle.

(2) The in-vehicle device 101 further comprises a steering operation detection unit 3001 which defects a steering operation for diving the vehicle, and an output information control unit 114 which controls displayed contents of a display unit 108 or an external display unit 109 connected to the in-vehicle device 101. The driving state recognition unit 3002 detects a driving slate of the vehicle based on the steering operation. The disabling state is a state where a users steering operation amount, or a steering angle, detected by the steering operation detection unit 3001 exceeds a predetermined threshold, or a predetermined operation amount. When the gesture operation has been disabled, the output information control unit 114 does not change the display of the display unit 108 or the external display unit 109 even when the user's hand position is within the gesture detection region 3201.

Consequently, when the steering operation amount exceeds a predetermined operation amount, the display of the display unit 108 or the external display unit 109 is not changed even when a direct gesture is performed and, therefore, the driver can visually recognize that the screen display has not been changed, and the driver's concentration will not be disturbed.

(3) When the gesture operation has not been disabled, the output information control unit 114 displays, on the display unit 108 or the external display unit 109, a gesture operation menu 2001 shown in FIG. 20(i) indicating candidates of the gesture operation corresponding to the users hand movement in step S3504 when the gesture detection unit 104 detects that the users hand has been placed within the gesture detection region 3201. Meanwhile, when the gesture operation has been disabled in step S3505, the output information control unit 114 does not display the gesture operation menu 2001 on the display unit 108 or the external display unit 109. Consequently, when the steering operation amount exceeds a predetermined operation amount, the gesture operation menu is not displayed on the display unit 108 or the external display unit 109 even when a hand placement gesture is performed and, therefore, it is possible to cause the user to recognize that gesture operations are not accepted.

(4) The in-vehicle device 101 further comprises a steering operation detection unit 3001 which detects a steering operation for driving the vehicle. The disabling state is a state where a user's steering operation amount detected by the steering operation detection unit 3001 exceeds a predetermined operation amount, or a predetermined operation amount. The gesture control unit 3003 disables the gesture operation by stopping operation of the gesture detection unit. 104 or disabling inputs from the gesture detection unit 104.

In cases where the steering angle is exceeding the threshold, it is possible to consider that the user is turning the steering wheel to perform a driving operation. In other words, it is likely that the user is moving one s hand near the steering wheel to perform a driving operation. In the foregoing case, if gesture recognition is performed near the steering wheel the users hand motion for driving the vehicle is likely to be falsely recognized as a gesture operation. Thus, by eliminating the possibility of such false recognition, it is possible to perform appropriate gesture recognition that is more in line with actual movements.

(5) The steering operation amount is an angle of a steering wheel operated by a user.

First Modified Example of Fifth Embodiment

In the fifth embodiment described above, the driving state recognition unit 3002 evaluated the angle of the steering wheel, or the steering angle, based on the output of the steering operation detection unit 3001. Nevertheless, the operation speed of the steering wheel or the steering angle velocity, may also be evaluated. In other words, in step S3303 of FIG. 35, whether the steering angle velocity, or the operation speed of the steering wheel, is equal to or less than a predetermined threshold may be determined.

According to this modified example, the following effects are yielded in addition to the effects of the fifth embodiment.

(1) The steering operation amount is an operation speed of a steering wheel operated by a user.

For instance, a state where the steering angle velocity is approximately zero is a state where the steering angle remains at a certain value, and it is possible to consider that, while the user is turning the steering wheel a certain amount to perform a driving operation, the operation amount of the steering wheel is small, such as in a case where the vehicle is slowly rounding a curve having a large curvature. In the foregoing case, because it is possible to consider that the user can afford to perform operations other than the driving operation irrespective of the size of the steering angle, the user can perform more gesture operations by enabling the gesture operation, and the user-friendliness can thereby be improved.

Second Modified Example of Fifth Embodiment

In the fifth embodiment described above, all gesture operations are uniformly disabled, or not accepted, when the steering operation amount is a predetermined threshold or higher. Nevertheless, it is also possible refrain from accepting only specific gesture operations according to the steering operation amount.

Figure 38A:
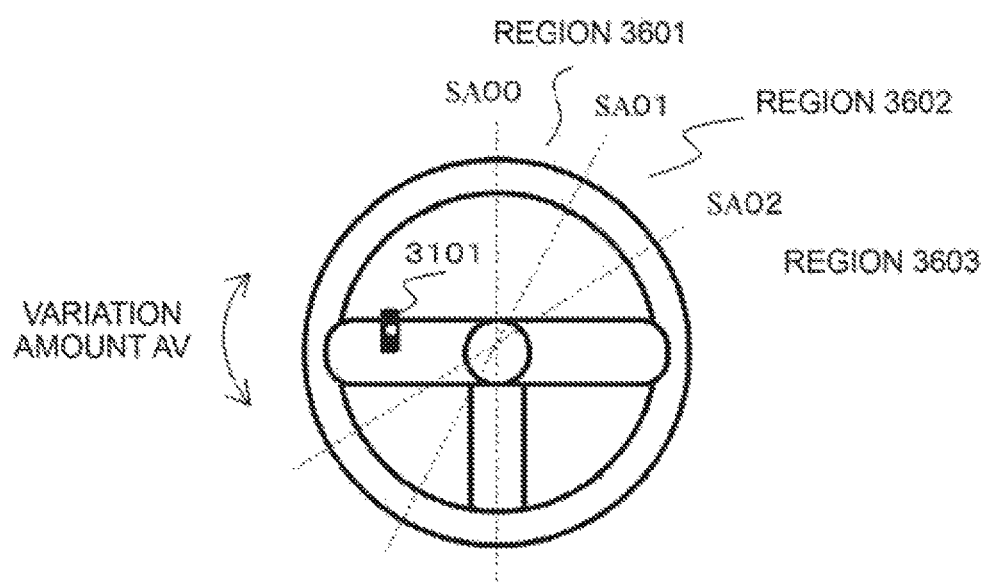
FIG. 38(b) shows an example of the enablement/disablement determination of the gesture operation according to the steering amount.

FIG. 38(a) a diagram showing an example of defining the angle in the steering operation as a plurality of regions. The region between angle SA00 and angle SA01 is defined as a region 3801 as a state where the steering wheel is being fumed slightly, the region between angle SA01 and angle SA02 is defined as a region 3602; and a state in which the steering wheel is being turned greater than angle SA02 is defined as a region 3603. Note that the division of regions is not limited to the foregoing example, and the configuration may also be such that the regions are further subdivided.

Figure 36A:
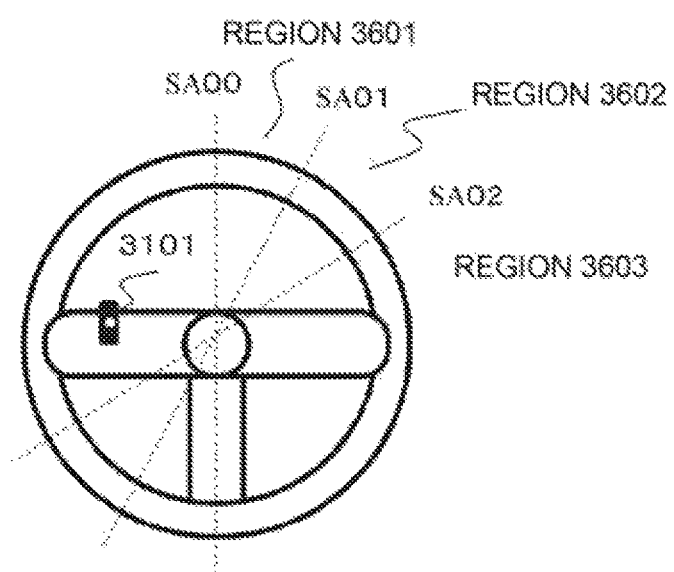
FIG. 36(a) shows an example of steering angles in the steering operation.

FIG. 36(b) is a diagram showing the correspondence of the size of the steering angle and the enablement/disablement of the gesture operation. The gesture control unit 3003 in this modified example determines, pursuant, to FIG. 38(b), the types of gesture operations to be enabled among a plurality of gesture operations in accordance with the steering angle.

For example, when the steering angle is in the region 3801, the gesture control unit 3003 enables both the direct gesture shown in FIG. 32 and the hand placement gesture shown in FIG. 33. This is because, since the steering angle is small, it is possible to consider that the steering operation for driving the vehicle is not being performed much, and the hand motion made in the gesture detection region 3201 near the steering wheel is most likely being performed by the user as a gesture operation.

When the steering angle is in the region 3603, the gesture control unit 3003 disables both the direct gesture and the hand placement gesture. This is because, since the steering angle is great, it is possible to consider that the user is concentrating on the steering operation for driving the vehicle, and, because it is unlikely that the user will perform a gesture operation, this disablement is intended to prevent the false recognition of a steering operation, which is being performed by the user for driving the vehicle, as a gesture operation.

When the steering angle is in the region 3802, the gesture control unit 3003 enables only the direct gesture, and disables the hand placement gesture. This is a result of giving consideration to the characteristics of the hand motion in a direct gesture and a hand placement gesture. While a direct gesture is a hand waving motion that ends in a short time, a hand placement gesture requires the placement of the hand in the gesture detection region 3201 for a given period of time in order to perform the operation, and is suitably performed when not much steering operation is required for driving the vehicle and the user can afford to operate the equipment. Thus, consideration is given to the work rate required for the steering operation to drive the vehicle, and, when the work rate is high, it is determined that the performance of a hand placement gesture by the user is unlikely, and the hand placement gesture is disabled, it is thereby possible to prevent the equipment from being unintentionally operated based on a gesture operation, and this will lead to improved user-friendliness.

Note that the control is not limited to the example described above, and, for instance, the configuration may be such that the determination is made only based on the region 3601 and the region 3603, or the regions made be subdivided into four or more regions.

According to this modified example, the following effects are yielded in addition to the effects of the fifth embodiment.

(1) The gesture control unit 3003 disables only a specific gesture operation among a plurality of gesture operations performed by a user based on the steering operation amount.

Thus, it is possible to limit the gesture operations to be accepted according to the steering operation amount.

(2) The driving state recognition unit 3002 increases the gesture operations to be disabled when the steering operation amount increases.

Thus, it is possible to reduce the gesture operations to be accepted as the possibility that the user will perform a gesture operation is low and the possibility of falsely recognizing a steering operation for driving the vehicle as a gesture operation is high. Moreover, by integrally using the steering operation amounts recognized by the driving state recognition unit 3002 and determining whether to enable and accept the users gesture operation, it is possible to perform detailed gesture recognition processing with minimal false recognition.

Sixth Embodiment

<<Configuration>>

The configuration of the in-vehicle device 101 in the sixth embodiment is the same as the fifth embodiment. However, the operation of the in-vehicle device control unit 102 differs from the fifth embodiment.

In addition to the steering operation state output by the steering operation detection unit 3001, the driving state recognition unit 3002 recognizes the driving state based on information such as the vehicle speed and accelerator position acquired by the vehicle information input unit 118, and the turn signal based on the operation of the direction indicator. The driving state to be recognized is, for instance, a state in which the turn signal has bean turned ON and the vehicle speed is zero; that is, a state where the vehicle has stopped, or a state in which the steering wheel has been turned rightward while driving.

<<Explanation of Operation>>

The operation of the in-vehicle device 101 in the sixth embodiment is now explained. The basic operation is the same as the operation explained in the fifth embodiment, and the sixth embodiment is unique in that whether to enable and accept the user's gesture operation is determined according to the user's operation speed of the steering wheel (for instance, angular velocity), ON/OFF of the turn signal (direction indicator), vehicle speed and other information recognized by the driving state recognition unit 3002 in addition to the steering angle detected by the steering operation detection unit 3001.

Figure 37:
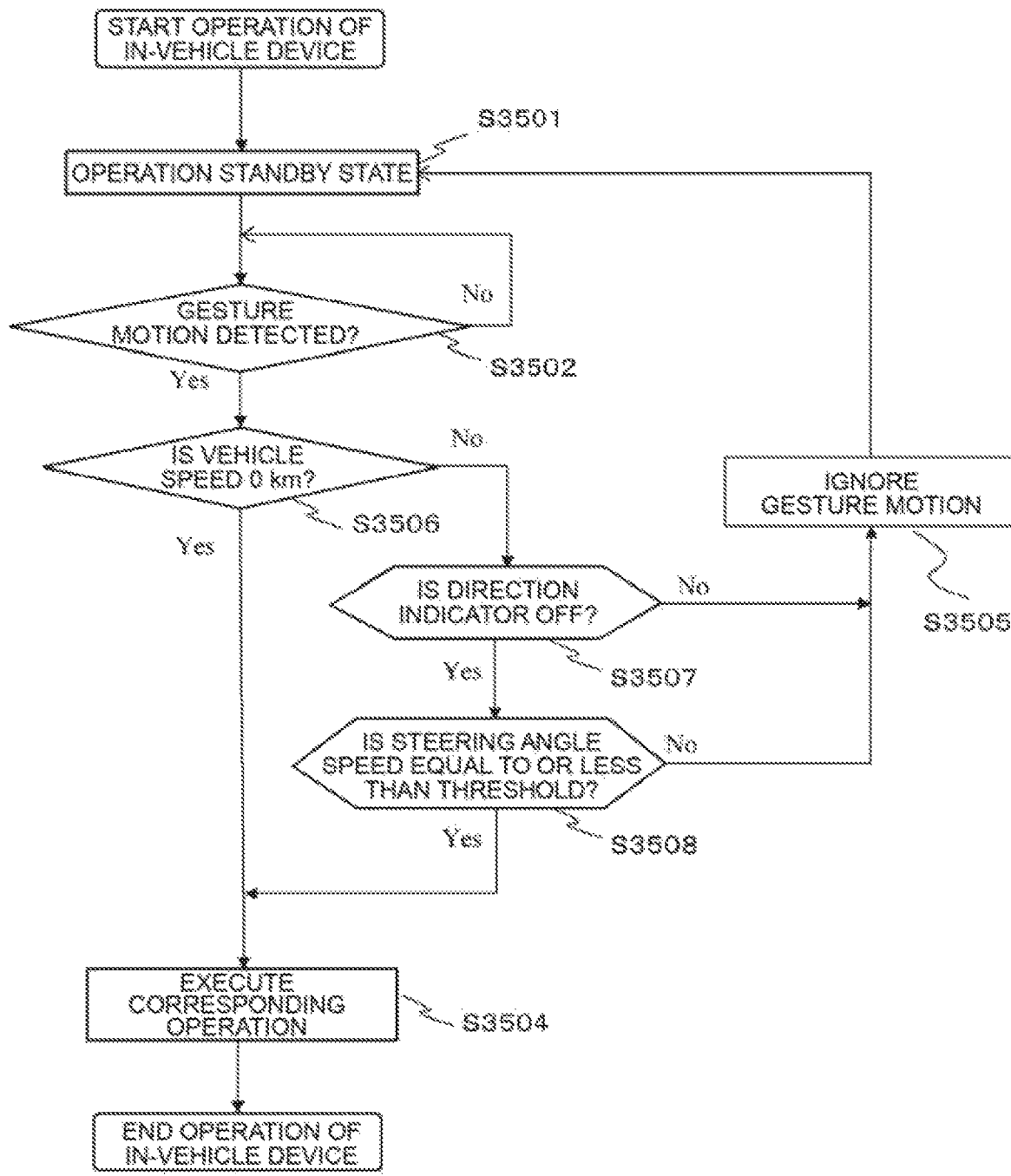
FIG. 37 shows an example of the operational flow.

FIG. 37 is a flowchart showing the operation of the in-vehicle device 101 in the sixth embodiment. However, the same processing as FIG. 35 in the fifth embodiment is given the same step number and the explanation thereof is omitted.

In step S3501, the gesture detection unit 104 starts to stand by for an input from the user, and then proceeds to step S3502.

In step S3502, whether the gesture detection unit 104 has detected a gesture operation is determined. The routine proceeds to step S506 when it is determined that a gesture operation has been detected, and remains at step S3502 when it is determined that a gesture operation has not been detected.

In step S3508, the driving state recognition unit 3002 determines whether the vehicle speed is zero; that is, whether the vehicle has stopped or is moving. The routine proceeds to step S3504 when if is determined that the vehicle speed is zero, and proceeds to step S3507 when it is determined that the vehicle speed is not zero.

In step S3507, the driving state recognition unit 3002 determines whether the direction indicator is OFF; that is, whether the turn signal is OFF. Whether it is likely that the user is performing a steering operation for driving the vehicle is determined based on the ON/OFF of the direction indicator. The routine proceeds to step S3508 when it is determined that the direction indicator is OFF, and proceeds to step S3505 when it is determined that the direction indicator is ON.

In step S3508, the driving state recognition unit 3002 determines whether the operation speed of the steering wheel or the angular velocity, is equal to or less than a predetermined threshold. The routine proceeds to step S3504 when it is determined that the angular velocity is equal to or less than the threshold, and proceeds to step S3505 when it is determined that the angular velocity is greater than the threshold.

In step S3505 that is executed when the vehicle speed is not zero and the direction indicator is ON or the steering angle velocity is greater than the threshold, the driving state recognition unit 3002 ignores the signals of the gesture motion detected in step S3502, and returns to step S3501.

In step S3504, the operation menu application 1701 executes the operation corresponding to the gesture motion detected in step S3502, and ends the program which yields the operation depicted in FIG. 37.

The following effects are yielded according to the sixth embodiment explained above.

(1) The disabling state in which the gesture operation is disabled is a state where, at least, the vehicle speed is not zero.

Thus, it is possible to predict that the user may be performing a steering operation on grounds that the vehicle is moving, and it is thereby possible to prevent the false recognition of the users hand motion that, was made for performing a steering operation.

(2) The Disabling state in which the gesture operation is disabled further includes a slate where the vehicle's direction indicator has been turned ON in addition to a state where the steering angle velocity has exceeded the threshold.

Thus, it is possible to predict that the user may be performing a steering operation on grounds that the direction indicator is ON, and it is thereby possible to prevent the false recognition of the user's hand motion that was made for performing a steering operation.

First Modified Example of Sixth Embodiment

In the sixth embodiment described above, the enablement/disablement of all gesture operations was uniformly controlled based on the vehicle speed, direction indicator, and steering angle velocity. Nevertheless, it is also possible to evaluate the busyness of the driving operation of the steering wheel based on a combination of the steering angle and the steering angle velocity, and determine the types of gesture operations to be enabled among a plurality of gesture operations.

FIG. 38(a) is a diagram showing the definition of regions indicating the angle in the steering operation, and the definition of the angular velocity AV. Angles are defined in the same manner as FIG. 38(a); that is, the region between angle SA00 and angle SA01 is defined as a region 3801 as a state where the steering wheel is being turned slightly, the region between angle SA01 and angle SA02 is defined as a region 3602, and a state in which the steering wheel is being turned greater than angle SA02 is defined as a region 3603. The angular velocity AV takes on a positive value irrespective of the rotating direction of the steering wheel.

FIG. 38(b) is a diagram showing the steering amount as a combination of angle and angular velocity, and the types of gesture operations to be enabled among a plurality of gesture operations for each steering amount. In FIG. 38(b), a state where the angular velocity AV is approximately zero is, for example, a state where the angular velocity is 5 degrees of less per second, and the threshold is, for example, an angular velocity of 15 degrees per second.

When the steering angle is in the region 3801 and the steering angle velocity AV is approximately zero, the gesture control unit 3003 determines that the hand motion detected in the gesture detection region 3201 was made by the user for performing a gesture operation. Thus, both the direct gesture and the hand placement gesture are enabled. Meanwhile, even in the region 3601, when the steering angle velocity AV is greater than the threshold, it is determined that the steering motion is being busily performed and preference is given to the driving operation, and both gesture operations of direct gesture and hand placement gesture are disabled.

When the steering angle is in the region 3802 and the steering angle velocity AV is approximately zero, both the direct gesture and the hand placement gesture are enabled, and, when the steering angle velocity AV is greater than the threshold, both the direct gesture and the hand placement gesture are disabled. Moreover, when the steering angle velocity AV is not zero but smaller than the threshold, only the direct gesture is enabled, and the hand placement gesture is disabled.

When the steering angle is in the region 3803, preference is given to the driving operation as the steering angle is great, and both the direct gesture and the hand placement gesture are disable irrespective of the size of the steering angle velocity AV.

The following effects are yielded according to the first modified example of the sixth embodiment explained above.

(1) The steering operation amount is a combination of an angle of a steering wheel operated by a user and an operation speed of a steering wheel operated by a user, and the output information control unit 114 changes the displayed contents of the display unit 108 or the external display unit 109 according to the combination of the angle of the steering wheel and the operation speed of the steering wheel. In other words, the gesture control unit 3003 determines the types of gesture operations to be enabled among a plurality of gesture operations according to the combination of the steering angle and the steering angle velocity AV. Consequently, for any gesture operation that was enabled, the output information control unit 114 changes the display of the display unit 108 or the external display unit 109 according to the corresponding gesture operation. Meanwhile, for any gesture operation that was disabled, the output information control unit 114 does not change the display of the display unit 108 or the external display unit 109.

As a result of determining the enablement/disablement of the gesture operation by combining the steering angle and the steering angle velocity, for instance, in cases where there is a certain amount of steering angle but hardly any driving operation is being performed to the steering wheel such as when the vehicle is stably rounding a curve, the user is able to perform a gesture operation to the target equipment, and it is possible to yield the effect of improving the user-friendliness while suppressing the false recognition ratio of gesture operations.

Second Modified Example of Sixth Embodiment

In the sixth embodiment described above, all gesture operations are uniformly disabled upon corresponding to predetermined conditions. Nevertheless, it is also possible to disable only specific gesture operations according to the rotating direction of the steering wheel.

FIG. 39 and FIG. 40 are diagrams showing an example of controlling the gesture operation according to the rotating direction of the steering wheel.

FIG. 39(i) shows an operation example of the direct gesture in cases of turning the steering wheel to the right; that is, when the vehicle rounds a right curve, turns right, or makes a lane change to a right lane. FIG. 39(ii) shows an example in cases of turning the steering to the left.

FIG. 40 is a diagram showing whether to enable the hand waving in a downward direction or the hand waving in an upward direction of the direct gesture operation in the respective steering operations of turning the steering wheel to the right and turning the steering wheel to the left.

In the case of FIG. 39(i) in which the steering wheel is being turned to the right, it is assumed that, by placing the hand on the steering wheel and turning the steering wheel to the right, the hand will pass through the gesture detection region 3201 from left to right. Thus, the hand waving in the upward direction of the direct gesture, which can be easily confused with the driving operation, is disabled, and not recognized as a gesture motion.

In the case of FIG. 39(ii) in which the steering wheel is being turned to the left, counter to FIG. 39(i), it is assumed that, by placing the hand on the steering wheel and turning the steering wheel to the left, the hand will pass through the gesture detection region 3201 from right to left. Thus, the hand waving in the downward direction of the direct gesture, which can be easily confused with the driving operation, is disabled, and not, recognized as a gesture motion.

Moreover, the same applies to the hand placement gesture, and a gesture operation direction which is easily confused with a steering rotating direction is disabled. (Flowchart)

Figure 41:
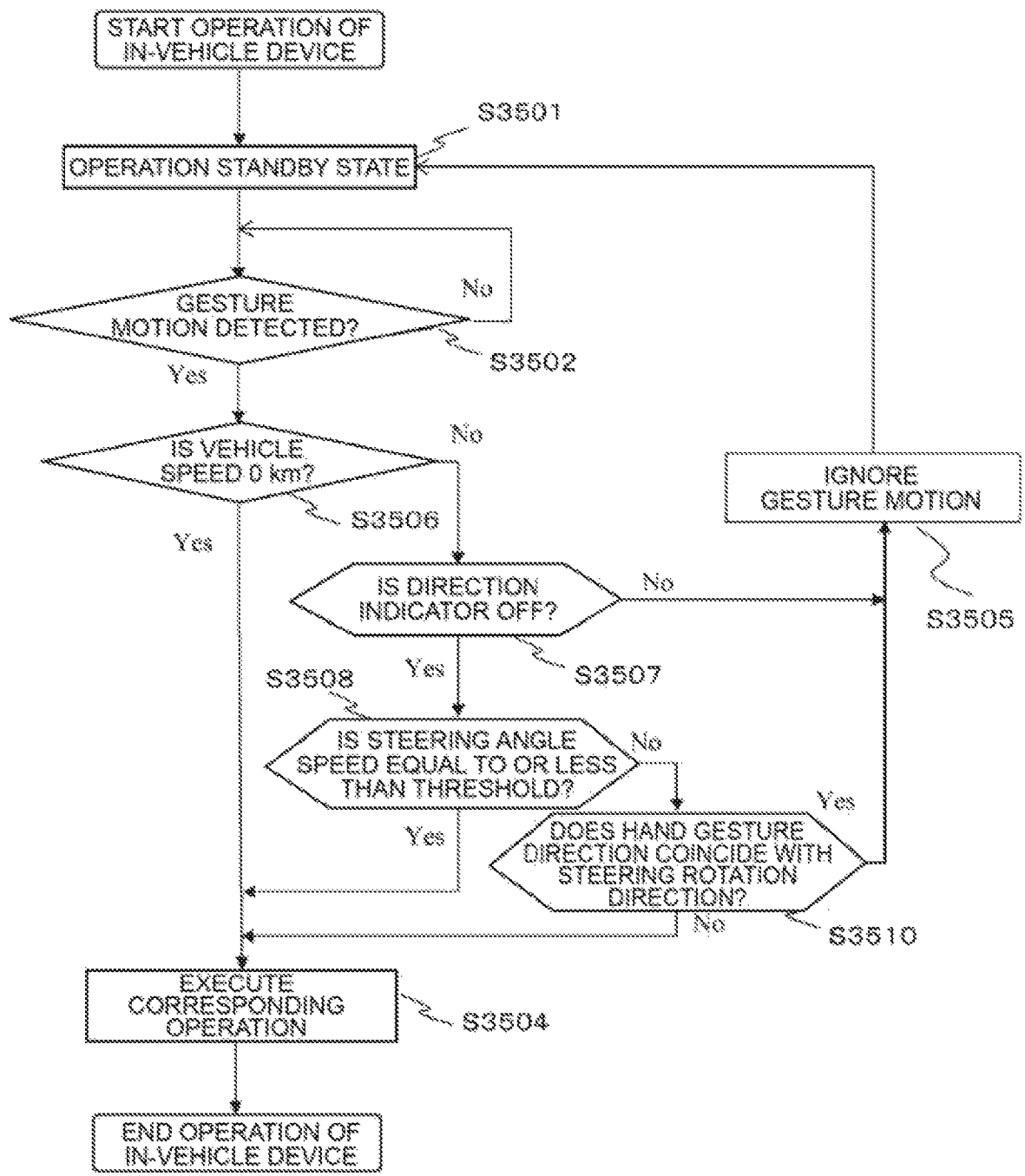
FIG. 41 shows an example of the operational flow.

FIG. 41 is a flowchart showing the operation of the in-vehicle device 101 in the second modified example of the sixth embodiment. However, the same processing as FIG. 37 in the sixth embodiment is given the same step number and the explanation thereof is omitted. The difference in comparison to the flowchart shown in FIG. 37 is that step S3510 has been added.

In step S3510 which is executed when a negative determination is obtained in step S3508, the driving state recognition unit 3002 determines whether the operation direction of the hand waving motion detected in step S3502 matches the rotating direction of the steering wheel detected in step S3508. A match in this step means the hand waving in the upward direction when the steering wheel is turned to the right and the hand waving in the downward direction when the steering is turned to the left. The routine proceeds to step S3505 when it is determined that the result is a match, and proceeds to step S3504 when it is determined that the result is not a match.

The following effects are yielded according to the second modified example of the sixth embodiment explained above.

(1) Disablement of the gesture operation is not accepting the gesture operation of moving one's hand in the same direction as the users steering operation direction detected by the steering operation detection unit 3001.

By changing the enablement/disablement of the hand waving in the downward direction and the hand waving in the upward direction in the direct gesture according to the rotating direction of the steering wheel as described above, it is possible to eliminate the gesture operations that, are easily confused with the rotating direction of the steering wheel, and yield the effect of improving the accuracy of gesture recognition.

Specifically, it is possible to yield the effect of being able to properly differentiate the steering operation for driving the vehicle and the hand motion for performing a gesture operation.

Third Modified Example of Sixth Embodiment

In the fifth and sixth embodiments, the sensing unit 3101 was provided on the steering wheel but the sensing unit 3101 may also be provided near the steering. To put if differently, while the gesture detection region 3201 moved together with the steering wheel in the fifth and sixth embodiments, the configuration may also be such that the gesture detection region 3201 does not move even when the steering wheel is turned.

FIG. 42 is a diagram showing the relationship of the steering wheel and the gesture detection region.

FIG. 42(i) shows an example of mounting the sensing unit 4001 not on the steering wheel, but on a sensor installation site 4002 such as a base that does not rotate together with the steering wheel.

FIG. 42(ii) shows an example of mounting the sensing unit 3101 on the steering wheel, and, when the steering is turned to the right, the gesture detection region 3201 moves in a right upper direction together with the steering wheel.

FIG. 42(iii) shows an example of turning the steering wheel to the right from the state shown in FIG. 42(i). In the foregoing case, the gesture detection region 3201 will not move even when the steering wheel is turned, and the gesture defection region 3201 will constantly be positioned at the same location.

In all of the configurations described above, the user can perform a gesture operation near the steering wheel while driving the vehicle without having to separate one's hand far away from the steering wheel, and it is possible to yield an effect of realizing user-friendly device operations.

The disclosure of the following priority application is incorporated herein by reference Japanese Patent Application No. 2015-249369 (filed on Dec. 22, 2015)

REFERENCE SIGNS LIST 101 in-vehicle device
102 in-vehicle device control unit
103 sensing unit
104 gesture detection unit
105 switch operation unit
106 touch operation unit 107 communication unit
108 display unit
109 external display unit
110 sound output unit
111 speaker
112 tactile IF output unit
113 messenger application
114 output information control unit
115 microphone
116 voice recognition unit
117 external switch operation unit
118 vehicle information input unit
119 operation means control unit
120 driving load estimation unit
121 map DB
1701 operation menu application
1702 display output unit
1703 steering controller
1704 steering contact detection unit
1705 commander controller
1706 command contact detection unit
2001 gesture operation menu
2002 steering operation menu
2201 gesture operation menu
2202 steering operation menu
2301 gesture operation menu
2302 steering operation menu
2401 item selection state
2402 item selection state
2501 detailed menu
2701 simplified menu
2801 commander controller operation menu
3001 steering operation detection unit
3002 driving state recognition unit
3003 gesture control unit
3101 sensing unit
3201 gesture detection region
3410 steering angle
3411 steering angle
4001 sensing unit
4002 sensor installation site

The invention claimed is:

1. An in-vehicle device, comprising:
a gesture detection unit which recognizes a user's hand position located within a predetermined range;
a driving state recognition unit which detects a driving state of a vehicle;
a gesture control unit which controls a state of a gesture operation based on a recognition result of the hand position by the gesture detection unit;
a steering operation detection unit which detects a steering operation for driving the vehicle; and
an output information control unit which controls displayed contents of a display unit connected to the in-vehicle device;
wherein the gesture control unit disables the gesture operation when the driving state of the vehicle detected by the driving state recognition unit is in a predetermined disabling state;
wherein the driving state recognition unit detects a driving state of the vehicle based on the steering operation, wherein the disabling state is a state where a user's steering operation amount detected by the steering operation detection unit exceeds a predetermined operation amount, and
wherein, when the gesture operation has been disabled, the output information control unit does not change the display of the display unit even when the hand position is within the predetermined range.

2. The in-vehicle device according to claim 1,
wherein, when the gesture operation has not been disabled, the output information control unit displays, on the display unit, a gesture operation menu indicating candidates of the gesture operation corresponding to the hand movement when the gesture detection unit detects that the user's hand has been placed within the predetermined range, and
wherein, when the gesture operation has been disabled, the output information control unit does not display the gesture operation menu on the display unit.

3. The in-vehicle device according to claim 1, further comprising:
a steering operation detection unit which detects a steering operation for driving the vehicle,
wherein the disabling state is a state where a user's steering operation amount detected by the steering operation detection unit exceeds a predetermined operation amount, and
wherein the gesture control unit disables the gesture operation by stopping operation of the gesture detection unit or disabling inputs from the gesture detection unit.

4. The in-vehicle device according to claim 1,
wherein the steering operation amount is an angle of a steering wheel operated by a user.

5. The in-vehicle device according to claim 1,
wherein the steering operation amount is an operation speed of a steering wheel operated by a user.

6. The in-vehicle device according to claim 1,
wherein the steering operation amount is a combination of an angle of a steering wheel operated by a user and an operation speed of the steering wheel operated by a user, and
wherein the output information control unit changes the displayed contents of the display unit according to the combination of the angle of the steering wheel and the operation speed of the steering wheel.

7. The in-vehicle device according to claim 1,
wherein the gesture control unit disables only a specific gesture operation among a plurality of gesture operations performed by a user based on the steering operation amount.

8. The in-vehicle device according to claim 1,
wherein the gesture control unit disables a gesture operation of moving a hand in a same direction as a user's steering operation direction detected by the steering operation detection unit.

9. The in-vehicle device according to claim 1,
wherein the disabling state is a state where, at least, a vehicle speed of the vehicle is not zero.

10. The in-vehicle device according to claim 9,
wherein the disabling state further includes a state where the vehicle's direction indicator has been turned ON.

* * * * *